US011790809B2

(12) United States Patent
Sobolev

(10) Patent No.: US 11,790,809 B2
(45) Date of Patent: Oct. 17, 2023

(54) GLASS-INCLUSIVE SAMPLE VIEWER, AND/OR ASSOCIATED METHODS

(71) Applicant: GUARDIAN GLASS, LLC, Auburn Hills, MI (US)

(72) Inventor: Alexander Sobolev, Auburn Hills, MI (US)

(73) Assignee: GUARDIAN GLASS, LLC, Auburn Hills, MI (US)

( * ) Notice: Subject to any disclaimer, the term of this patent is extended or adjusted under 35 U.S.C. 154(b) by 570 days.

(21) Appl. No.: 16/822,374

(22) Filed: Mar. 18, 2020

(65) Prior Publication Data

US 2020/0302830 A1    Sep. 24, 2020

Related U.S. Application Data

(63) Continuation of application No. 29/706,216, filed on Sep. 18, 2019, now Pat. No. Des. 944,081.

(Continued)

(51) Int. Cl.
*G09F 5/02* (2006.01)
*G02B 30/29* (2020.01)
(Continued)

(52) U.S. Cl.
CPC ............. *G09F 5/02* (2013.01); *G01N 21/29* (2013.01); *G02B 27/028* (2013.01); *G02B 30/29* (2020.01);
(Continued)

(58) Field of Classification Search
CPC ........ G09F 5/02; G01N 21/29; G02B 27/028; A47F 7/0042; B65D 85/48; B65D 85/30;
(Continued)

(56) References Cited

U.S. PATENT DOCUMENTS

| 193,340 A | 7/1877 | Lothrop |
| 2,058,734 A * | 10/1936 | Sperti ................... H01J 61/96 315/48 |

(Continued)

FOREIGN PATENT DOCUMENTS

| CN | 208570000 U | 3/2019 |
| DE | 2745855 A1 | 4/1979 |

(Continued)

OTHER PUBLICATIONS

Jan. 28, 2020 Office Action in Brazil Patent Application No. 302019004427-7.

(Continued)

*Primary Examiner* — Cassandra Davis

(57) ABSTRACT

Certain example embodiments relate to a box or other viewer that accommodates one or more glass-inclusive samples and that is usable in a plurality of different configurations to facilitate evaluation of the sample(s) from indoor and outdoor viewing perspectives. The sample viewer is "convertible" between a transportation configuration and the indoor and outdoor viewing perspective configurations. For example, certain example embodiments may be used as glass-inclusive sample shipping and storage containers that transform into miniature mockup walls with little manual effort and with little risk of human viewers looking at glass the wrong way (e.g., a manner that would lead to a false impression of the visual aesthetic of the sample(s) therein). The glass-inclusive sample(s) may include one or more uncoated or coated glass sheets, insulated glass (IG) units, vacuum insulated glass (VIG) units, laminated products, and/or the like.

22 Claims, 51 Drawing Sheets

Related U.S. Application Data

(60) Provisional application No. 62/820,502, filed on Mar. 19, 2019.

(51) Int. Cl.
| | |
|---|---|
| *G02B 30/37* | (2020.01) |
| *G02B 27/02* | (2006.01) |
| *G01N 21/29* | (2006.01) |
| *G02B 30/20* | (2020.01) |
| *A47F 7/00* | (2006.01) |

(52) U.S. Cl.
CPC ............ *G02B 30/37* (2020.01); *A47F 7/0042* (2013.01); *G02B 30/20* (2020.01)

(58) Field of Classification Search
CPC .... B65D 73/0042; B65D 5/52; B65D 5/5206; B65D 5/5213; B65D 5/5253; B65D 5/5273; B65D 5/38
USPC ......... 434/72–80; 206/449–456, 45.24, 45.2, 206/45.21, 759, 760, 769; 359/811; 229/122, 913
See application file for complete search history.

(56) References Cited

U.S. PATENT DOCUMENTS

| | | | |
|---|---|---|---|
| 2,233,799 A | 3/1941 | Seifer | |
| 2,239,145 A * | 4/1941 | Doner | G09F 5/042 206/232 |
| 2,646,143 A * | 7/1953 | Daleo | G09F 5/02 206/45.25 |
| 2,795,367 A | 6/1957 | Irving | |
| 2,981,458 A | 4/1961 | Thibault | |
| 4,524,852 A * | 6/1985 | Hess | A45C 3/02 190/16 |
| 4,651,872 A | 3/1987 | Joyce | |
| 5,611,433 A * | 3/1997 | Levy | B01L 3/5055 206/569 |
| 5,626,926 A * | 5/1997 | Roberts | G09F 15/0068 40/733 |
| D415,419 S | 10/1999 | Abiteboul | |
| 6,020,995 A * | 2/2000 | Dreyer | G02B 21/34 359/398 |
| 6,186,327 B1 * | 2/2001 | Hadden | G09F 5/04 206/472 |
| 6,253,922 B1 * | 7/2001 | Hadden | G09F 5/04 206/472 |
| D644,096 S | 8/2011 | Yadegaran | |
| 8,474,619 B1 * | 7/2013 | Chrisman | B65D 5/5213 206/757 |
| D690,592 S | 10/2013 | Ding | |
| D692,754 S | 11/2013 | Akana | |
| 9,265,361 B1 | 2/2016 | Streich | |
| D772,559 S | 11/2016 | Binder | |
| D811,005 S | 2/2018 | Fath | |
| D814,925 S | 4/2018 | Davidson | |
| D823,391 S | 7/2018 | Nichols | |
| D825,328 S | 8/2018 | Simpson | |
| D831,480 S | 10/2018 | Arazi | |
| D833,734 S | 11/2018 | Binder | |
| D843,724 S | 3/2019 | Drendel | |
| D868,580 S | 12/2019 | Martin | |
| D876,219 S | 2/2020 | Martin | |
| D904,759 S | 12/2020 | Girard-Tremblay | |
| D908,794 S | 1/2021 | Houle | |
| 10,882,661 B1 | 1/2021 | Seidler | |
| 2004/0245134 A1 | 12/2004 | Alcouloumre | |
| 2009/0085343 A1 | 4/2009 | Burch | |
| 2017/0143099 A1 | 5/2017 | Carraro | |
| 2018/0008063 A1 | 1/2018 | Roan | |
| 2018/0189904 A1 | 7/2018 | Palmer | |
| 2018/0312320 A1 | 11/2018 | Awity | |
| 2019/0276182 A1 | 9/2019 | Zhou | |
| 2019/0322421 A1 | 10/2019 | Nunez | |

FOREIGN PATENT DOCUMENTS

| | | |
|---|---|---|
| EM | 006889648-0001 | 9/2019 |
| EM | 006889648-0002 | 9/2019 |
| EM | 006889648-0003 | 9/2019 |
| EM | 006889648-0004 | 9/2019 |
| EM | 006889648-0005 | 9/2019 |
| EM | 006889648-0006 | 9/2019 |
| EM | 006889648-0007 | 9/2019 |
| EM | 006889648-0008 | 9/2019 |
| EM | 006889648-0009 | 9/2019 |
| EM | 006889648-0010 | 9/2019 |
| EM | 006889648-0011 | 9/2019 |
| EM | 006889648-0012 | 9/2019 |
| EM | 006889648-0013 | 9/2019 |
| EM | 006889648-0014 | 9/2019 |
| FR | 2450584 A1 | 10/1980 |
| KR | 3020200001541 | 10/2020 |
| KR | 3020200001542 | 10/2020 |
| KR | 3020200001543 | 10/2020 |

OTHER PUBLICATIONS

Jan. 28, 2020 Office Action in Brazil Patent Application No. 302019004428-5.

Jan. 28, 2020 Office Action in Brazil Patent Application No. 302019004433-1.

Unpublished Brazilian Application No. BR302019004427-7 filed Sep. 19, 2019.

Unpublished Brazilian Application No. BR302019004428-5 filed Sep. 19, 2019.

Unpublished Brazilian Application No. BR302019004433-1 filed Sep. 19, 2019.

Unpublished U.S. Appl. No. 29/706,216, filed Sep. 18, 2019.

International Search Report and written opinion for International Application No. PCT/IB2020/052475, dated May 27, 2020, p. 15.

"Vitro Architectural Glass introduces ACUITY Glass sample kit", accessed at https://www.glassonweb.com/news/vitro-architectural-glass-introduces-acuity-glass-sample-kit, Oct. 2, 2018, 15 pages.

Lin, D., "Architecture glass packaging for Guardian Glass on Packaging of the World—Creative Package Design Callery", accessed at https://www.packagingoftheworld.com/2018/11/architecture-glass-packaging-for.html, Nov. 16, 2018, 10 pages.

\* cited by examiner

GLASS-INCLUSIVE SAMPLE VIEWER, AND/OR ASSOCIATED METHODS

CROSS-REFERENCE TO RELATED APPLICATIONS

This application claims the benefit of U.S. Application Ser. No. 62/820,502 filed on Mar. 19, 2019 and U.S. application Ser. No. 29/706,216 filed on Sep. 18, 2019, the entire contents of each of which are hereby incorporated herein by reference.

TECHNICAL FIELD

Certain example embodiments relate to a viewer for one or more glass-inclusive samples, and/or associated methods. More particularly, certain example embodiments relate to a box or other viewer that accommodates one or more glass-inclusive samples and that is usable in a plurality of different configurations to facilitate evaluation of the sample(s) from indoor and outdoor viewing perspectives.

BACKGROUND AND SUMMARY

Glass has long been incorporated into buildings and other structures for aesthetic purposes. For example, design architects designing buildings oftentimes will desire a particular coloration, amount of visible light transmission, amount of visible light reflection, and/or other aesthetic properties for a given project, e.g., to enhance its aesthetic appeal, set it apart from other projects, comport with a particular "neighborhood feel," etc.

Glass exhibits multiple effects, many of which are subtle. Yet even subtle effects can have a profound impact on aesthetics if magnified over a broad area as in the case of, for example, an office building with many stories. Although more easily perceivable aspects such as stated coloration can at some level be grasped by design architects, it oftentimes is difficult to gauge how minor changes in transmission and/or reflection might affect a project. Of course, even with a property as seemingly simple as coloration, there are many fine gradations that may not be readily appreciated.

Moreover, "off-axis" properties related to transmission, reflection, coloration, haze, and the like, also can have a profound impact on the overall aesthetics of a project. In other words, although properties such as coloration, transmission, and reflection typically are reported as nominal values, such nominal values generally assume an orthogonal viewpoint and thus do not always fully and accurately reflect or convey how a façade (for example) might be perceived when viewed at an angle, or how the outside of a building might be viewed when standing or looking at an angle.

To help combat these issues, design architects may have on-hand a collection of sample products. Additionally, some architects order sample products that are built to their specifications. Although such practices can in some instances increase the ease with which architects and/or their clients can accurately intuit the aesthetic qualities of glass-inclusive sample products, it has been observed that architects and/or their clients sometimes do not know how to look at the sample products to obtain an accurate impression of the overall aesthetic qualities. For instance, architects and/or their clients may sometimes form inaccurate impressions of the aesthetic qualities of the samples because they are looking at them only indoors, only outdoors, in only one type of lighting, etc. In fact, it has been observed that one of the most common errors that architects make is that they sometimes put the glass sample on a white piece of paper (in addition to being indoors). When this happens, the transmitted color overpowers the reflected and the tint of the glass can be misinterpreted as the color of the coating, leading to a skewed view of the aesthetic qualities of the glass. Moreover, it also can be difficult to compare samples, especially if they are ordered and viewed at different times, under different conditions, etc. Indeed, it has been observed that humans tend to be bad at making comparisons from memory, e.g., if different samples are viewed at different times. These and/or other issues unfortunately oftentimes lead to false impressions about the qualities of the product and have even been known to lead to projects with "missed specifications."

Certain example embodiments help address these and/or other concerns. For instance, certain example embodiments relate to a box or other viewer that accommodates one or more glass-inclusive samples and that is usable in a plurality of different configurations to facilitate evaluation of the sample(s) from indoor and outdoor viewing perspectives. Viewers in accordance with certain example embodiments advantageously increase the ease with which architects and/or their clients can accurately intuit the aesthetic qualities of such samples, facilitate sample comparisons, etc.

One aspect of certain example embodiments involves using sample viewers in at least two of three possible configurations, namely, a first configuration for transporting one or more sample, a second configuration for outdoor viewing of the one or more samples, and a third configuration for indoor viewing of the one or more samples. Although boxes currently are used to ship glass and glass samples, conventional boxes are not used to additionally provide views and allow comparisons of glass samples, especially while addressing the differences between outdoor and indoor viewings. In a similar vein, incumbent viewing aids, like mock-up walls, are not used for transporting glass. Certain example embodiments are advantageous in the sense that they can reduce waste by eliminating separate transportation packaging and one or more special viewer packs.

In certain example embodiments, an insulated glass (IG) unit viewing kit is provided. The kit includes at least one sample IG unit, with each said sample IG unit comprising: first and second substantially parallel, spaced apart glass substrates; a spacer system provided around peripheral edges of the first and second substrates, a gap or cavity being defined between the first and second substrates; and a sample viewer comprising one or more sample-receiving slots, the number of sample-receiving slots being greater than or equal to the number of same IG units provided in the kit. The sample viewer is transformable into at least two of first, second, and third configurations, the first configuration being an outdoor viewing configuration, the second configuration being an indoor viewing configuration, and the third configuration being packaged and adapted for transport with the at least one sample IG unit therein.

The kit of any of the three previous paragraphs may include the sample viewer according to certain example embodiments described herein.

In certain example embodiments, a sample viewer comprises one or more sample-receiving slots, the number of sample-receiving slots being greater than or equal to a number of transparent-panel inclusive samples receivable in the sample viewer, the sample viewer being transformable into at least two of first, second, and third configurations, the first configuration being an outdoor viewing configuration, the second configuration being an indoor viewing configuration, and the third configuration being packaged and adapted for transport with the at least one sample IG unit therein.

According to certain example embodiments, the sample viewer may further comprise: an inner sleeve in which the one or more sample-receiving slots are defined; first and second outer shell members; at least one first support provided to the first outer shell member; at least one second support provided to the second outer shell member; and an inner member provided to the second outer shell member. In this regard, according to certain example embodiments, the sample viewer may be transformable into the first, second, and third configurations, e.g., with the first and second outer shell members constituting outer major faces of the sample viewer when the sample viewer is arranged in the third configuration.

According to certain example embodiments, the sample viewer may be transformable into at least the first configuration, e.g., where, in the first configuration: the second set of one or more slots may receive the element(s) of the at least one second support such that the inner sleeve is supported by the at least one second support, the inner member, and the second outer shell member; the first set of one or more slots may not receive the element(s) of the first at least one support; the inner member may extend generally downward from an upper portion of the inner sleeve towards where it meets with the second outer shell member; the second outer shell member may extend generally forward from where it meets with the inner member towards a lower portion of the inner sleeve; and the first outer shell member may extend generally forward from the lower portion of the inner sleeve such than an obtuse angle is formed between an upward facing surface of the first outer shell member and a forward facing surface of the inner sleeve.

According to certain example embodiments, the sample viewer may be transformable into at least the second configuration, e.g., where, in the second configuration: the second set of one or more slots may receive the element(s) of the at least one second support; the first set of one or more slots may receive the element(s) of the at least one first support such that the inner sleeve is supported by the at least one first support and the first outer shell member; the upper portion of the inner sleeve may be forward of the lower portion of the inner sleeve; and the first outer shell member may extend generally forward from the lower portion of the inner sleeve such than an acute angle is formed between the upward facing surface of the first outer shell member and the forward facing surface of the inner sleeve.

In certain example embodiments, there is provided a method of using the sample viewers described herein. For instance, the method may comprise having the sample viewer in the first configuration; and transforming the sample viewer from (a) the third configuration into either the first or second configuration, and/or (b) the first configuration into the second configuration.

In certain example embodiments, there is provided a method of making the sample viewer provided or used herein. For instance, in certain example embodiments, a method of making a sample viewer is provided. The method comprises: having a first template from which an inner sleeve is formable; having a second template from which other portions of the sample viewer are formable, the other portions including first and second outer shell members, first and second supports, and an inner member provided to the second outer shell member; forming an inner sleeve portion from the first template; and forming an outer clamshell portion from the second template.

According to certain example embodiments, the inner sleeve portion and the outer clamshell portion may be forwarded (e.g., to an architect, designer, sample manufacturer, or other party) for creation of first and second intermediate products, respectively, with the first and second intermediate products being connectable to one another in making the sample viewer, such that the inner sleeve portion when assembled comprises one or more sample-receiving slots, the number of sample-receiving slots being greater than or equal to a number of transparent-panel inclusive samples receivable in the sample viewer, the sample viewer being manufactured so as to be transformable into at least two of first, second, and third configurations, the first configuration being an outdoor viewing configuration, the second configuration being an indoor viewing configuration, and the third configuration being packaged and adapted for transport with the at least one sample IG unit therein. In other cases, this may be done on-site prior to forwarding for insertion of samples into the viewer. In other cases, a kit comprising an assembled or to-be assembled sample viewer may be made/provided, e.g., with or without the glass sample(s) to be used therewith. In cases where the to-be-assembled sample viewer is provided as a part of a kit, flat packs to be assembled may be provided and may be forwarded for assembly.

The features, aspects, advantages, and example embodiments described herein may be combined to realize yet further embodiments.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION

Certain example embodiments relate to a box or other viewer that accommodates one or more glass-inclusive samples and that is usable in a plurality of different configurations to facilitate evaluation of the sample(s) from indoor and outdoor viewing perspectives. The glass-inclusive sample(s) may include one or more uncoated or coated glass sheets, insulated glass (IG) units, vacuum insulated glass (VIG) units, laminated products, and/or the like. In certain example embodiments, the sample viewer is "convertible" between a transportation configuration and the indoor and outdoor viewing perspective configurations. For example, certain example embodiments may be used as glass-inclusive sample shipping and storage containers that transform into miniature mockup walls with little manual effort and with little risk of human viewers looking at glass the wrong way (e.g., a manner that would lead to a false impression of the visual aesthetic of the sample(s) therein). The sample boxes of certain example embodiments are suitable for both outdoor and indoor viewing, as not all users will make the effort or have the opportunity to take samples outside. Evaluation of samples thus can be reliably and repeatably performed in both outdoor and indoor uses, using the sample viewer product in accordance with certain example embodiments.

Figure 1:
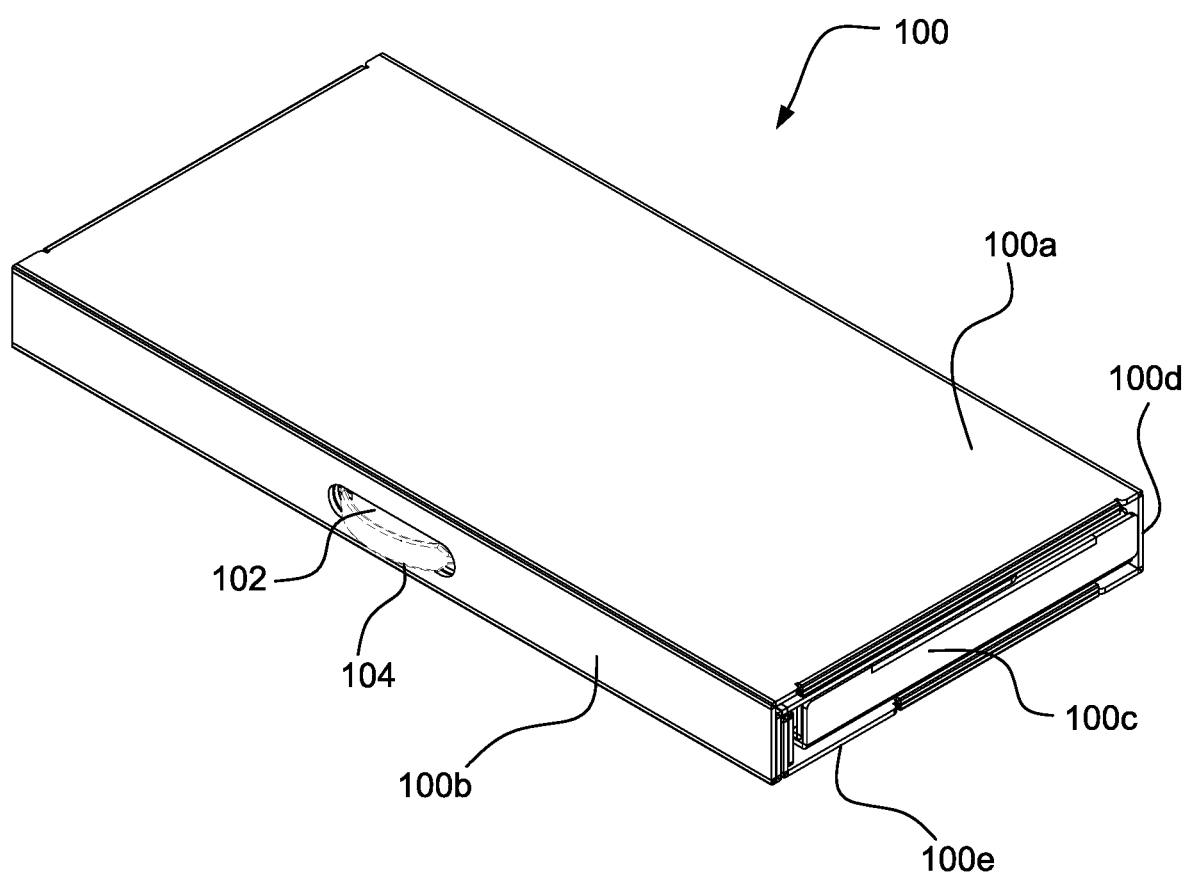
FIG. 1 is a front perspective view of a sample box viewer in a closed configuration in accordance with certain example embodiments.

Referring now more particularly to the drawings in which like reference numerals indicate like parts throughout the several views, FIG. 1 is a front perspective view of a sample box viewer 100 in a closed configuration in accordance with certain example embodiments. The sample box viewer 100 in the FIG. 1 embodiment is shown to have substantially rectangular outer surfaces, including front outer surface 100a "behind" which the sample(s) is/are able to lie, top outer surface 100b, right side outer surface 100c, bottom outer surface 100d, and back outer surface 100e. The top outer surface 100b includes a hole 102 through which a handle 104 may protrude so as to facilitate carrying/transportation of the viewer 100. In use, the viewer may in essence rest on the bottom outer surface 100d (e.g., with the aid of certain "wings" or other support members concealed in the viewer 100 when closed).

In certain example embodiments, the viewer 100 may be include inner and outer components (e.g., inner member and outer shell member), e.g., with the right side outer surface 100c (and the left side outer surface, not shown) being a part of the inner component (e.g., inner member), and with the outer component (e.g., outer shell member) including the front outer surface 100a, top outer surface 100b, bottom outer surface 100d, and back outer surface 100e. In one unlimiting embodiment, the front outer surface 100a comprises the first outer shell member and the back outer surface 100e comprises the second outer shell member. The inner component (e.g., inner member) may support or otherwise hold the sample(s). Example dual component configurations are discussed in greater detail below.

As will be appreciated from the description above and the FIG. 1 view, the sample box viewer 100 is shown to have a substantially rectangular prism shape when in the closed configuration. It will be appreciated that different aspect ratios (e.g., height-to-width ratios, depth-related ratios, etc.) may be used in different example embodiments. It will be appreciated that design variables may be adjusted to account for different samples thickness (e.g., from monolithic to IG unit or even triple-IG unit thicknesses, etc.); sample shape (e.g., A4, 12"×12", etc.); cardboard thickness and tolerances; and/or the like. The particular aspect ratio may be selected based on, for example, the sizes and/or shapes of the sample(s) and/or other material(s) to be included in the viewer. For instance, when two substantially square-shaped IG units are to be provided, the overall shape of the viewer may be a rectangular prism. As another example, when two "skinny" IG units are to be provided, the top outer surface of the viewer may be more square-shaped. When simple coated articles are to be provided to the viewer, the viewer may have a thickness less than a viewer designed to hold VIG units, etc. In certain example embodiments, packaging or other removable material may be provided so as to enable the sample-receiving pocket(s) to have a variable or changeable thicknesses.

The viewer may be formed from any suitable material such as, for example, card stock or museum stock, plastic, metal, and/or the like. In certain example embodiments, a cardboard material may be used. Corrugated cardboard may be desirable because of its ease of manufacturing and shipment, light weight, and comparative durability. Example folds and thicknesses are shown in FIG. 1 (and throughout various drawings that follow thereafter). However, those skilled in the art will understand that other folds may be used to create the same or similar designs shown in the example embodiments described herein. Moreover, those skilled in the art will understand that folds may not be necessary if a different material is used. For example, a plastic or polymer-based materials may not need such folds. Example cardboard "flat pack" configurations are provided below for reference and ease of understanding, although those skilled in the art will be able to design these and/or suitable alternative flat pack configurations. Non-paper components may be used for some components. For instance, handles may be plastic, Velcro may be used to secure pieces together and/or make parts removable, adhesives (including adhesive strips) may be used to hold cardboard parts together, plastic connectors may be provided, etc. Metal rivets, snap clasps, and/or other features additionally or alternatively may be used for these and/or other purposes.

Figure 2:
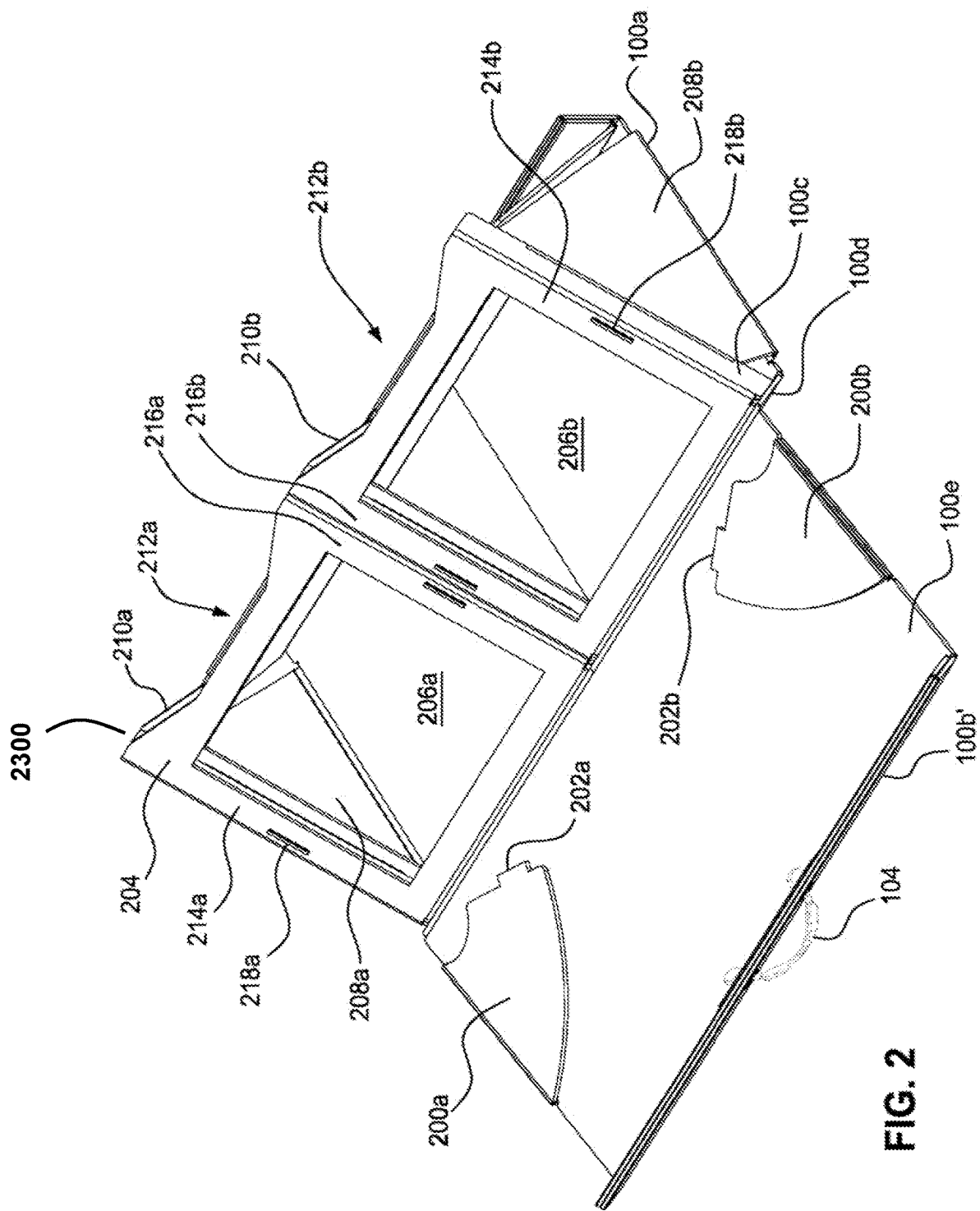
FIG. 2 is a front perspective view of a sample viewer in an open configuration suitable for outdoor use in accordance with certain example embodiments.
Figure 3:
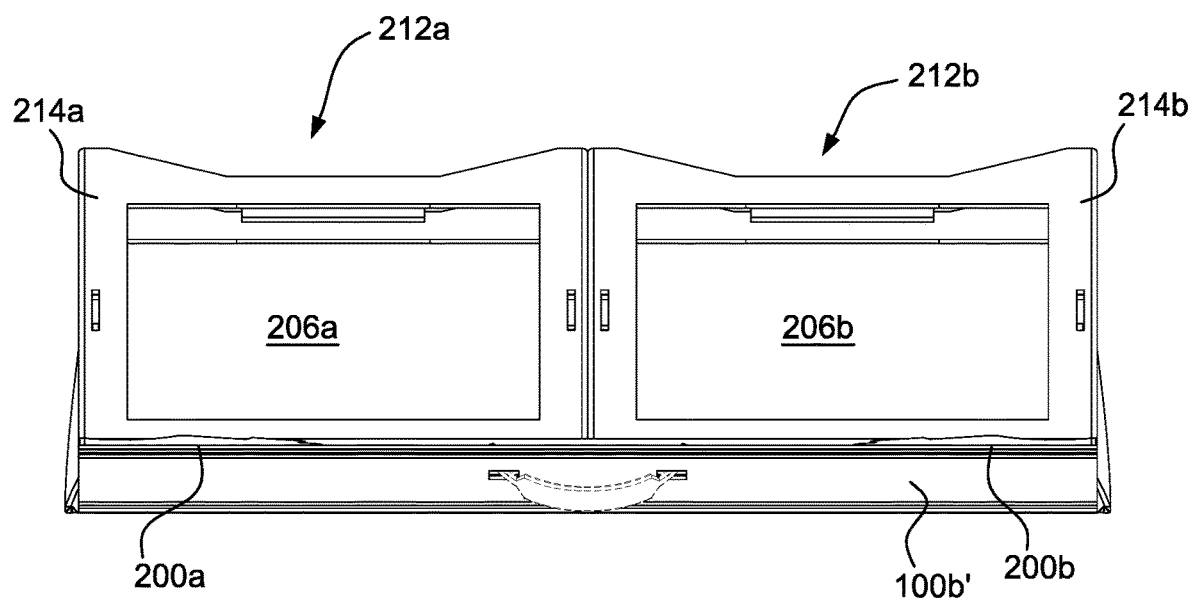
FIG. 3 is a front elevation view thereof.
Figure 4:
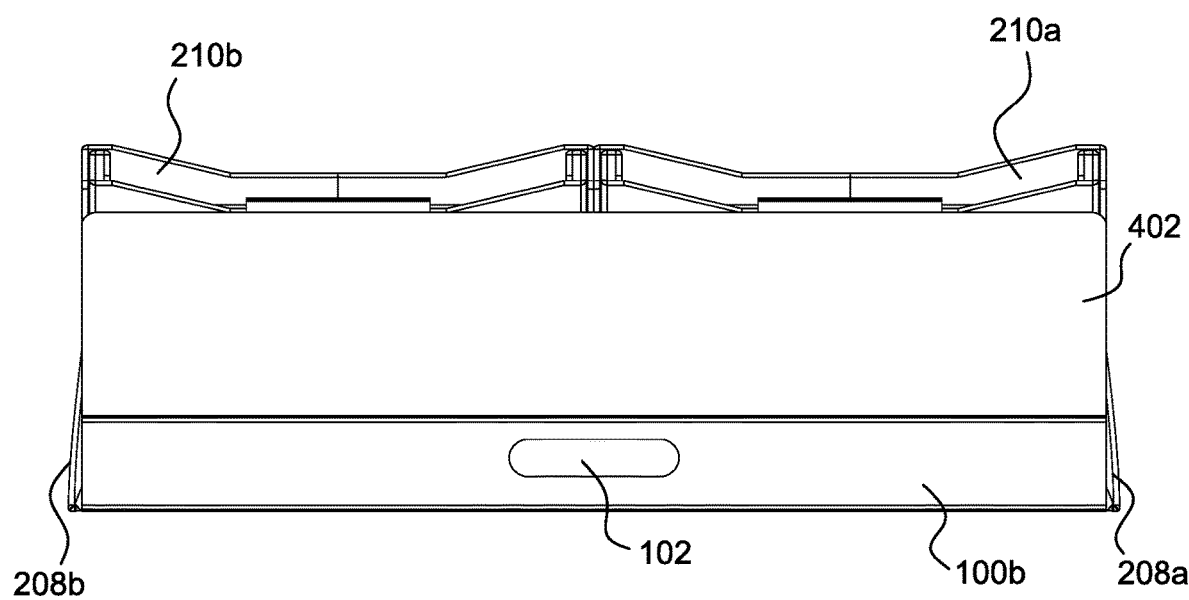
FIG. 4 is a rear elevation view thereof.
Figure 5:
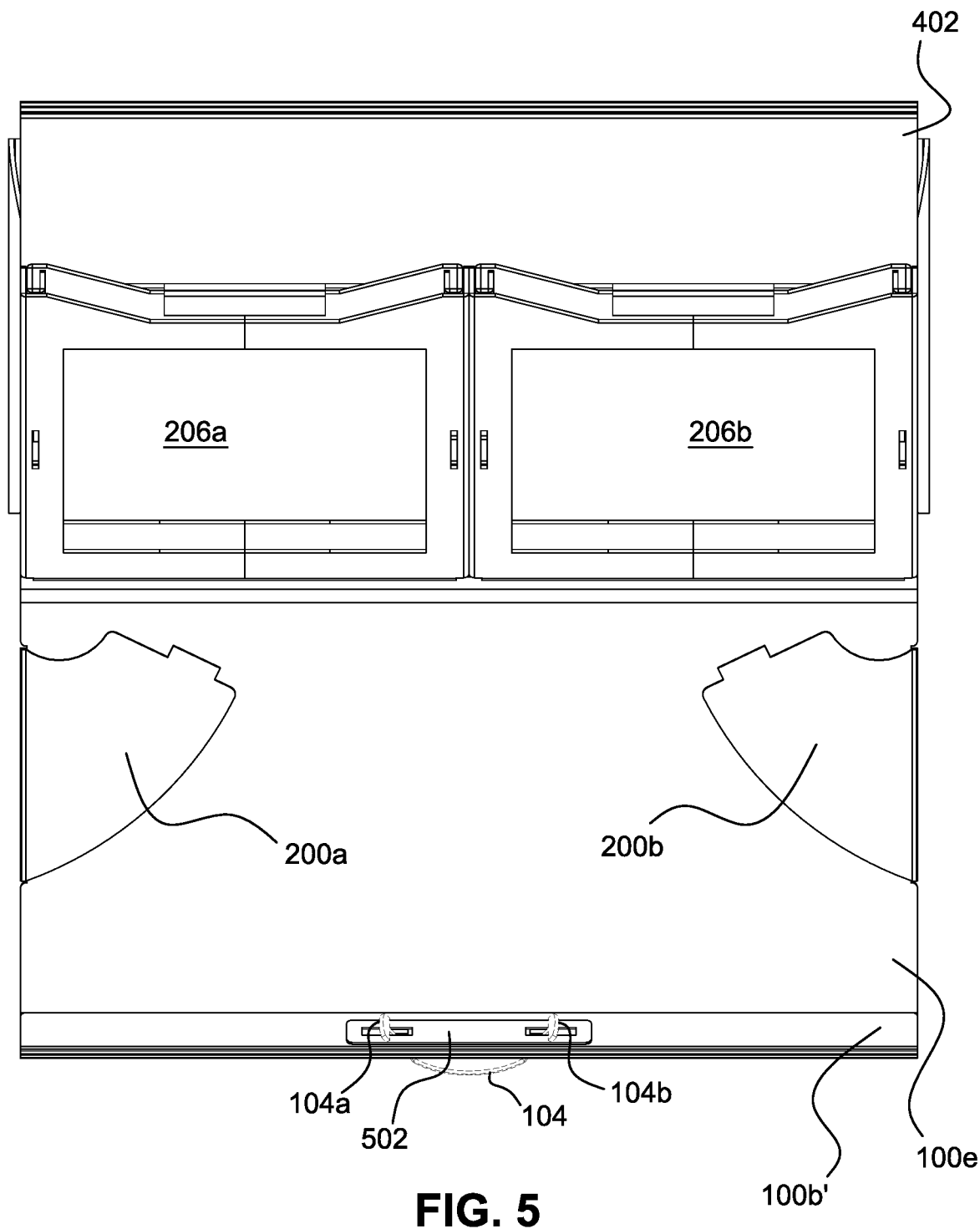
FIG. 5 is a top plan view thereof.
Figure 6:
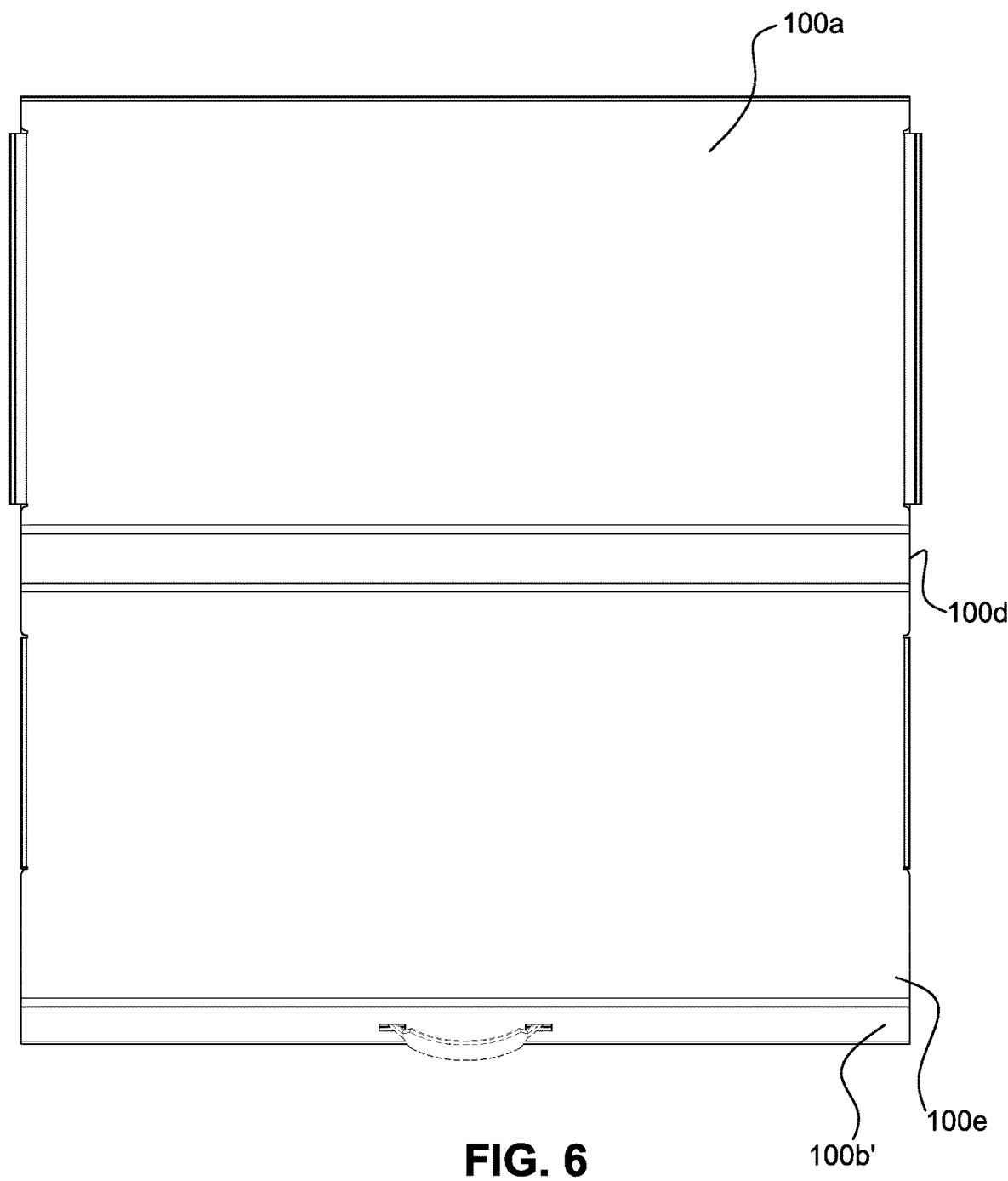
FIG. 6 is a bottom plan view thereof.
Figure 7:
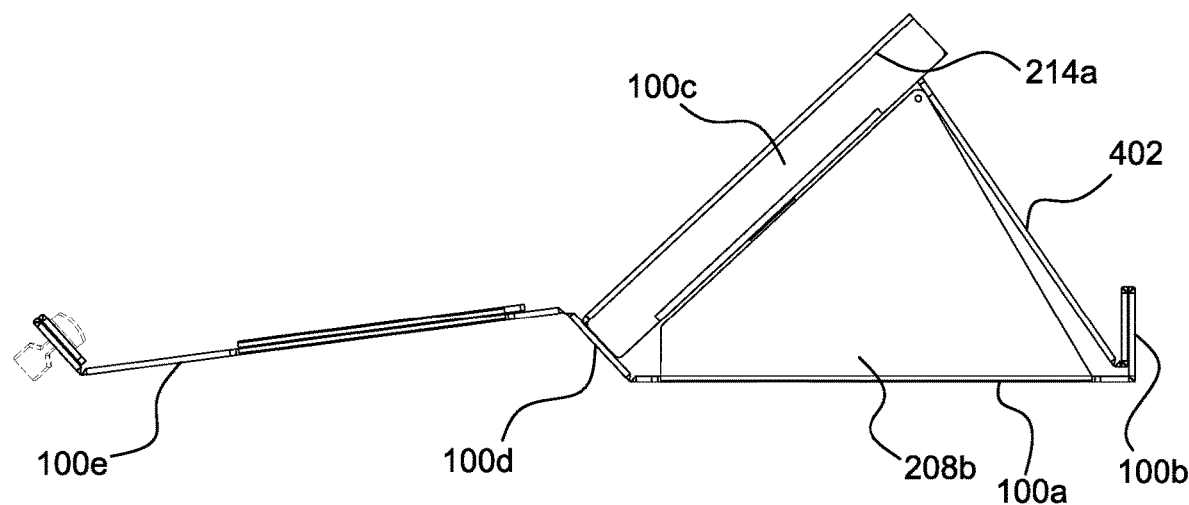
FIG. 7 is a right side view thereof (the left side substantially being a mirror thereof)
Figure 8:
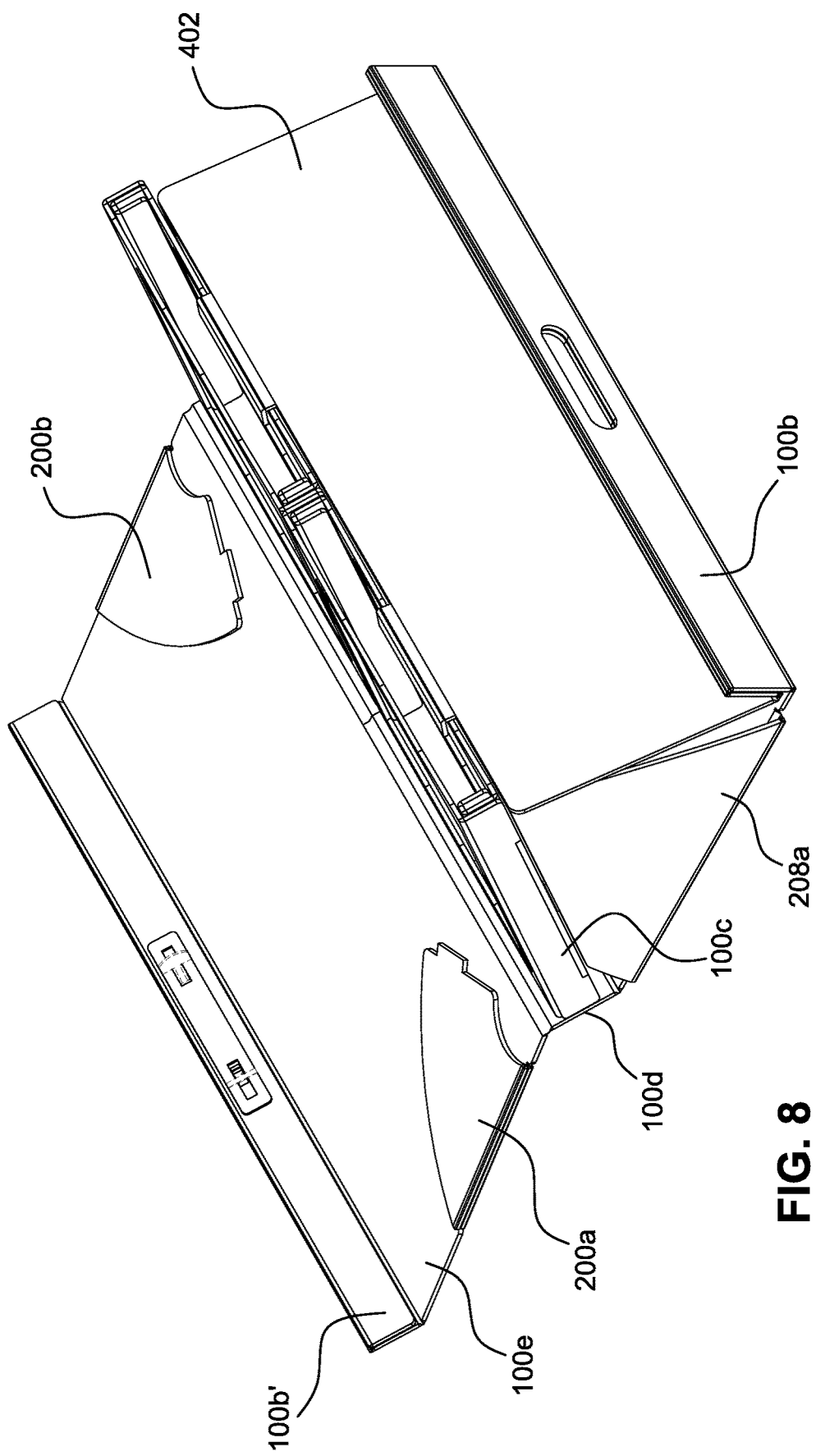
FIG. 8 is a rear perspective view thereof.

FIGS. 2-8 show a sample viewer in an open configuration suitable for outdoor use in accordance with certain example embodiments. More particularly, FIG. 2 is a front perspective view of a sample viewer in an open configuration suitable for outdoor use in accordance with certain example embodiments, FIG. 3 is a front elevation view thereof, FIG. 4 is a rear elevation view thereof, FIG. 5 is a top plan view thereof, FIG. 6 is a bottom plan view thereof, FIG. 7 is a right side view thereof (the left side substantially being a mirror thereof), and FIG. 8 is a rear perspective view thereof.

As shown in FIG. 2, for example, the interior of the back outer surface 100e includes first and second front wings 200a-200b, which are used to help hold the viewer open for indoor use, as will be more apparent from the description below. The first and second front wings 200a-200b include first and second tabs 202a-202b, which engage with slots 218a-218b provided to viewing area 204 when holding the viewer open for indoor use. The front wings 200a-200b may have any size and/or shape. They are shown as being curved in FIG. 2 (for example), but other configurations may be used in different example embodiments. Although two front wings are shown, it will be appreciated that different example embodiments may include more or fewer front wings, e.g., depending on the size of the samples, size of the viewer, relative weights, etc. For instance, a single front wing may be provided in the widthwise center of certain example embodiments, three front wings may be provided at the edges and in the center in certain example embodiments, etc.

The viewing area 204 in this example includes first and second openings 206a-206b. Samples are visible through these openings 206a-206b. Thus, this example embodiment supports one-to-two samples being provided to the viewer. However, as will become clearer below, more or fewer samples may be provided in different example embodiments. Moreover, as will become clearer from the description below, one or both openings 206a-206b may include product literature, marketing materials, and/or the like. This information may be provided in one of the openings, whereas the sample itself may be provided in the other, e.g., with the information being related to the sample provided, the company providing the sample, and/or the like.

Generally trapezoidal rear wings 208a-208b help hold the viewer in position for outdoor use. As with the front wings 200a-200b, the rear wings 208a-208b may include tabs that engage with rear slits of the viewing area 204. Any suitable size and/or shape may be used for the rear wings 208a-208b. However, it generally will be desirable to have a size and/or shape of the rear wings 208a-208b that is conducive to an obtuse angle being formed relative to the back outer surface 100e and the viewing area 204 when the viewer 100 is open and in the outdoor viewing configuration. The rear wings 208a-208b may be connected to the front outer surface 100a and may fold outwardly therefrom. Similar to as described above, although two rear wings are shown, it will be appreciated that different example embodiments may include more or fewer rear wings.

The viewing area 204 includes sample-receiving slots 210a-210b which accommodate the samples. The inner sleeve 2300 which defines the sample-receiving slots 210a-210b will be further discussed in FIGS. 23A-23C below. The left sample-receiving slot 210a is defined in part by an outer upright area 214a and an inner upright area 216a, and the right sample-receiving slot 210b is defined in part by an outer upright area 214b and an inner upright area 216b. In certain example embodiments, a spacer system is provided around peripheral edges of the sample-receiving slots 210a-210b. In one example, the space system comprises the outer upright area 214a, inner upright area 216a, outer upright area 214b, and inner upright area 216b. In certain example embodiments, a divider may be provided between the inner upright areas 216a-216b, so as to help secure the samples in position next to one another (e.g., to help reduce the likelihood that they will directly bang into one another).

Upper portions 212a-212b of the viewing area 204 proximate to the sample-receiving slots 210a-210b may have different profiles in different example embodiments. Different profiles may make it easier to remove the samples from the slots 212a-212b, e.g., because it can be easier to grab ahold of an exposed edge portion of a sample, as compared to having to invert the viewer, touch the sample through a portion to be viewed and slide it out, etc. When viewed in a front elevation view, this example includes upper portion profiles that are lower proximate to the widthwise centers of the sample-receiving slots 210a-210b as compared to their widthwise edges. In this example, there is a gradual linear slope from the edges towards the centers. In other example embodiments, generally U-shaped profiles may be used, and the U-shaped profiles may include hard or soft transitions from the uprights towards the center portions (e.g., the transitions may be more or less rounded, provided at hard right angles, provided at other angles, etc.). In other example embodiments, the profiles may be semi-circular, triangle shaped, or the like. In still other examples, flat tops may be provided.

As shown in FIGS. 3 and 5, for example, the handle 104 may be provided to an interior member 100b' connected to the back outer surface 100e. A thickened or additional area 502 may be provided to help the handle securely attach to the outer shell. For instance, tab locks 104a-104b provided to the handle 104 may extend through slots provided in the area 502 and the back outer surface 100e to help secure the handle 104 to the viewer.

A back portion 402 of the viewer is obscured by the front outer surface 100a (from which it unfolds) when the viewer 100 is in the closed configuration. However, when the viewer 100 is open and in the outdoor viewer configuration, at least part of the back portion 402 is visible through the openings 206a-206b. Similarly, when the viewer 100 is open and in the outdoor viewer configuration, at least parts of the interior surfaces of the rear wings 208a-208b are visible through the openings 206a-206b. These interior surfaces of the back portion 402 and the rear wings 208a-208b may be provided in a dark color (e.g., black). By contrast, the interior of the back outer surface 100e and the front wings 200a-200b (including at least the portions thereof that are viewable when they are in the configuration shown in FIG. 2, for example) may be provided in a contrasting, lighter color (e.g., white). Providing this coloration may help reflected images, coloration, and/or other aesthetics, be determined by a person using the viewer 100, as will become made clearer from the description below. Other colors might also be useful such as, for example, blue (which could be used to represent the color of the coating during a day with a clear sky), grey (which could be used to represent the color of the coating during an overcast day), orange (which could be used to represent the coating color during sunset/sunrise), etc. Images of a skyline can also be used to get an intuitive idea of what the coating color will be at scale. It has been observed that it is difficult to mentally project a small 12×12 sample to what a full-sized building might look like in that color. However, seeing a miniature skyline in the reflected image can make it much easier to make to mental leap to what that color will look like on a large scale. Certain example embodiments therefore may be provided in different colors, with different images, etc. In certain example embodiments, removable color and/or image inserts may be provided, e.g., to enable simulations such as some or all of those described above.

Figure 9:
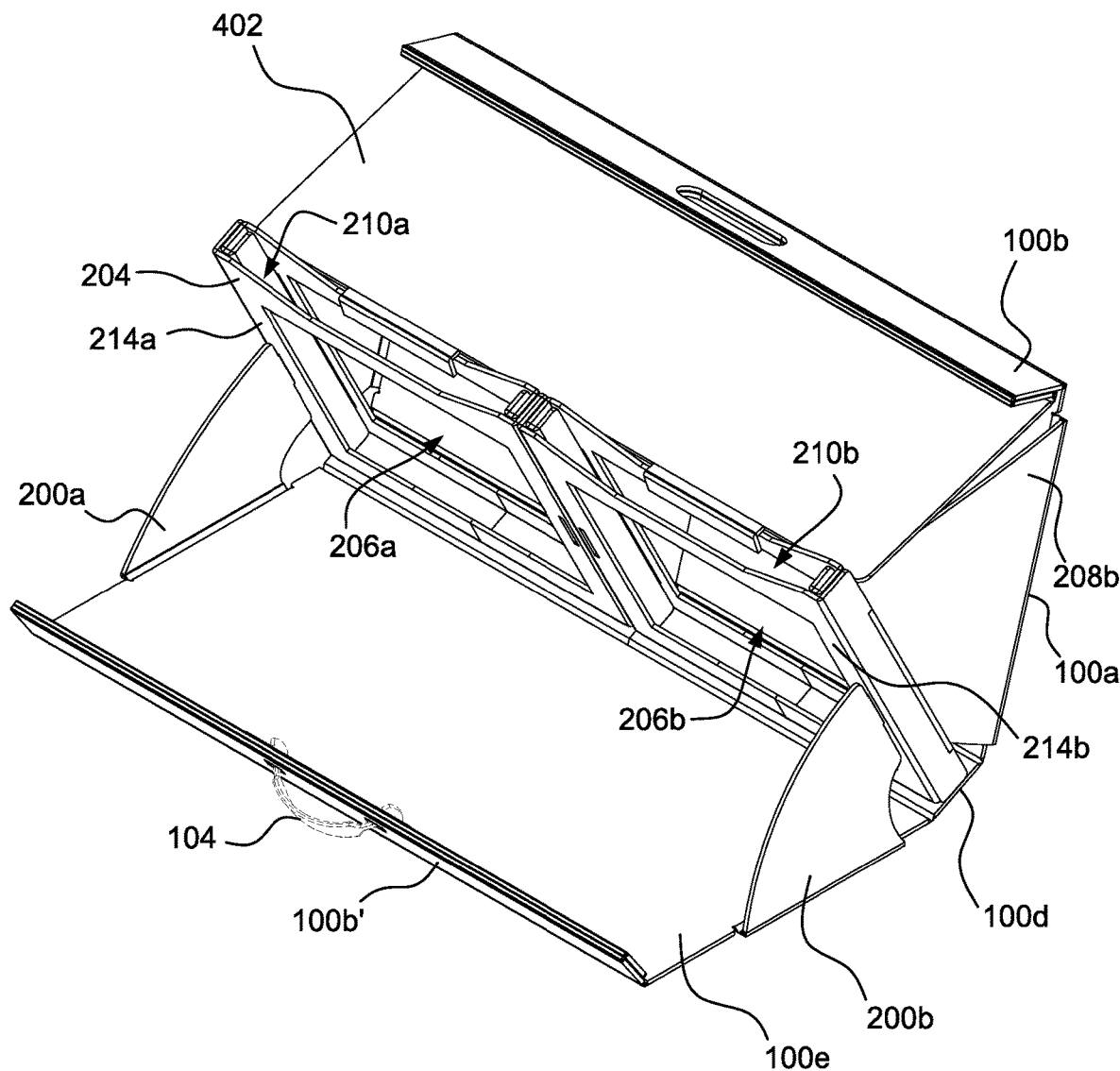
FIG. 9 is a front perspective view of a sample viewer in an open configuration suitable for indoor use in accordance with certain example embodiments.
Figure 10:
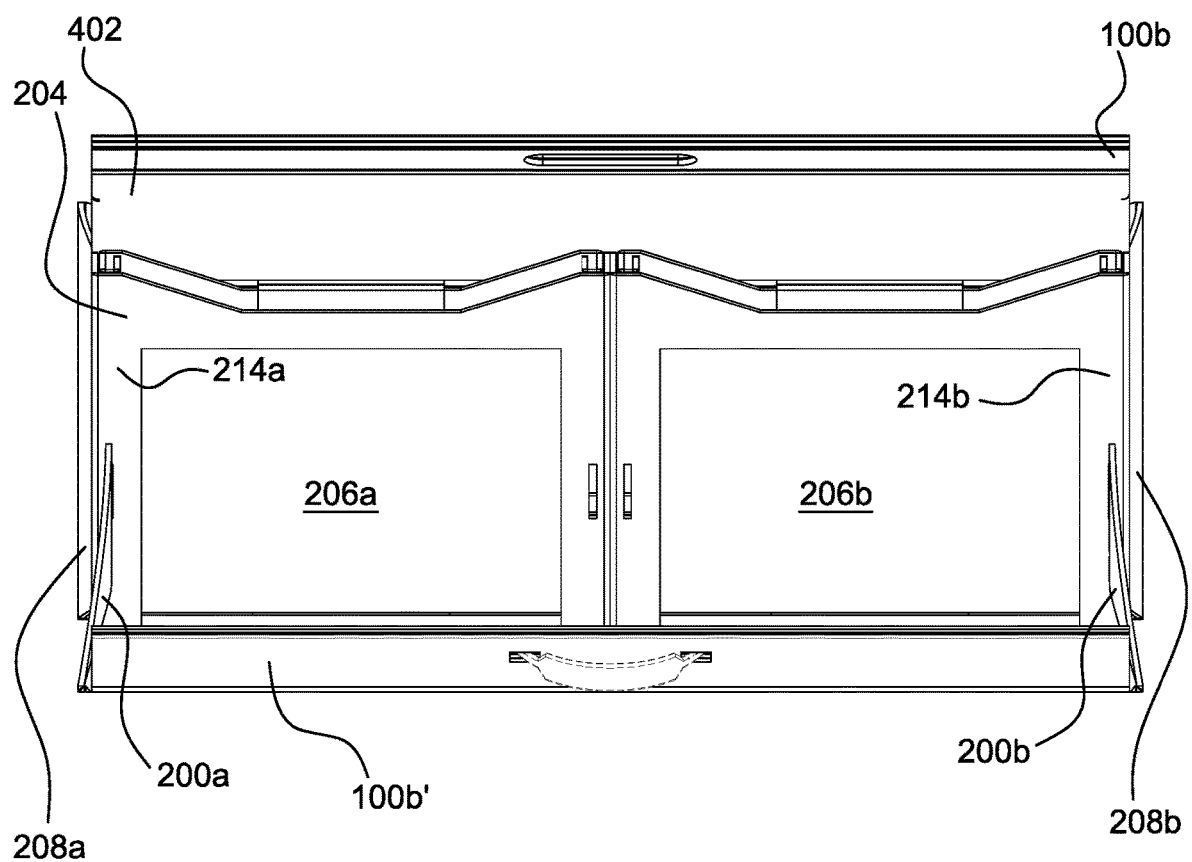
FIG. 10 is a front elevation view thereof.
Figure 11:
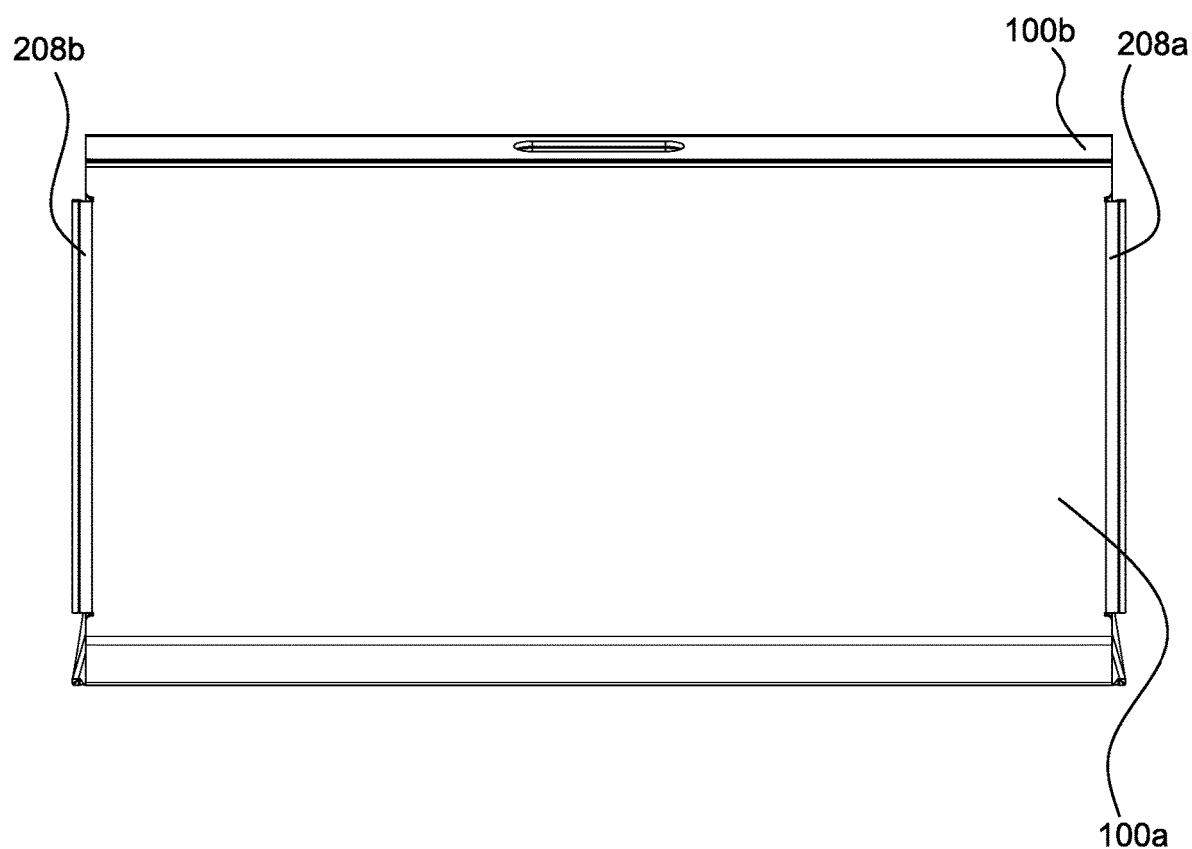
FIG. 11 is a rear elevation view thereof.
Figure 12:
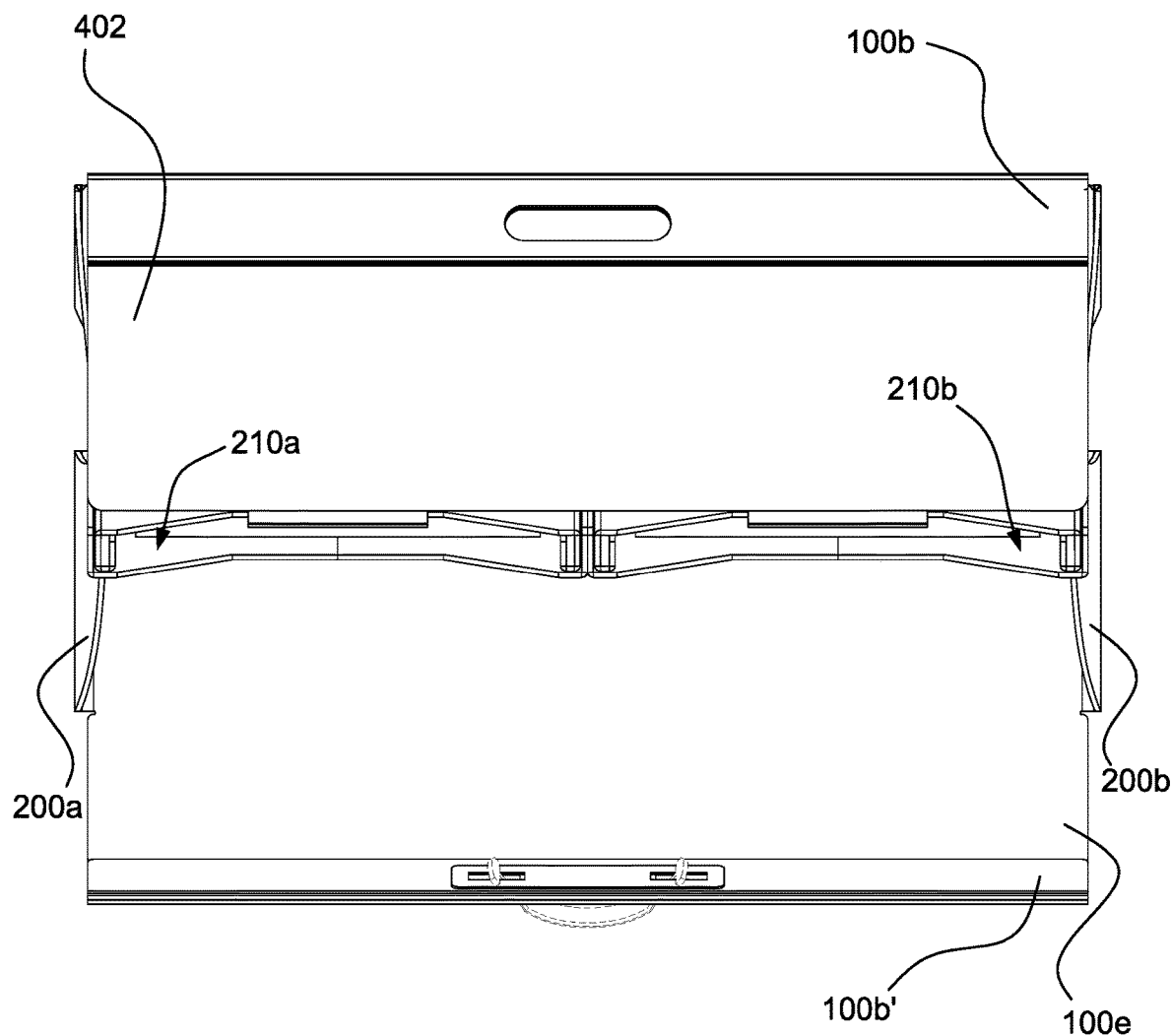
FIG. 12 is a top plan view thereof.
Figure 13:
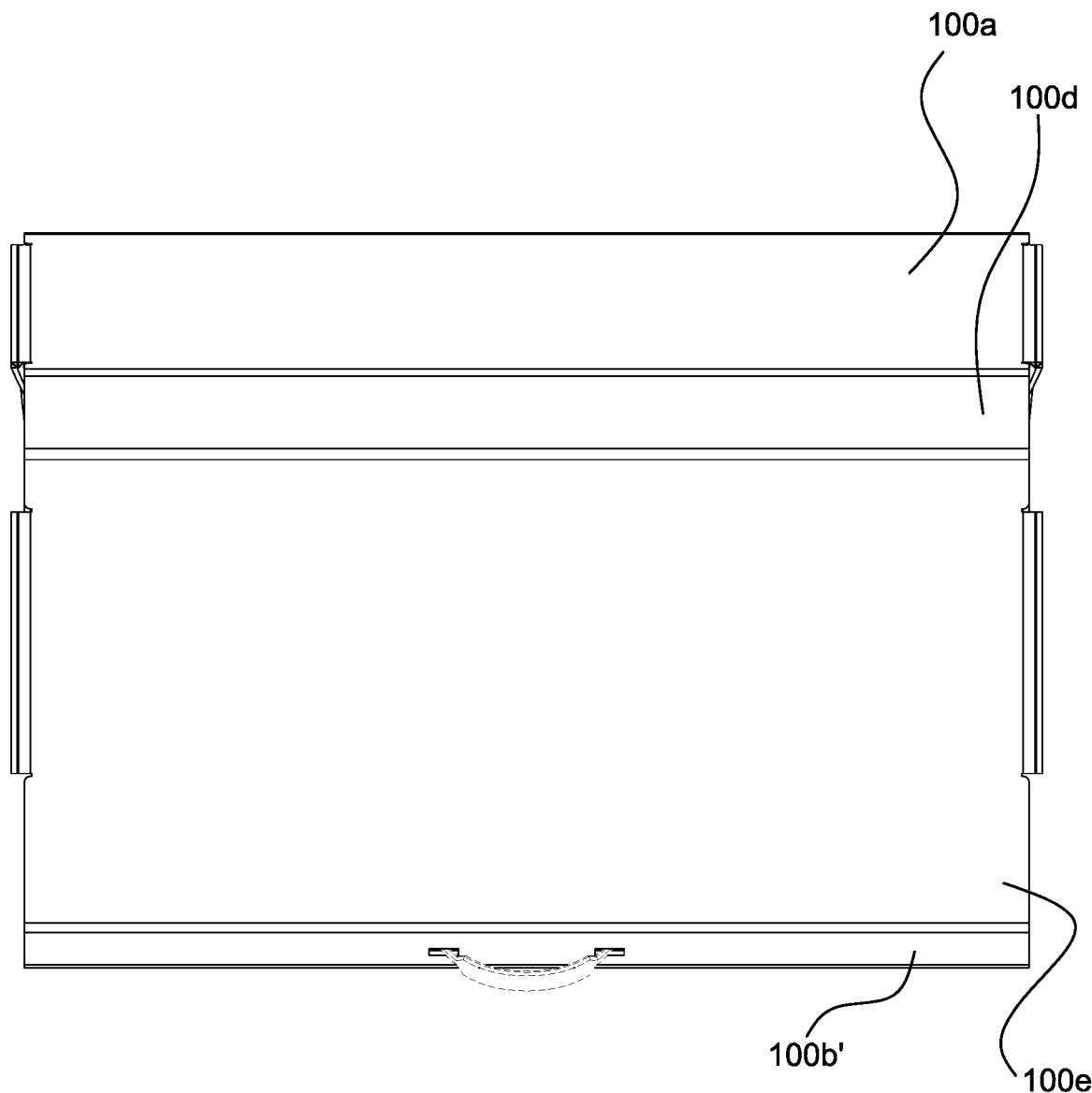
FIG. 13 is a bottom plan view thereof.
Figure 14:
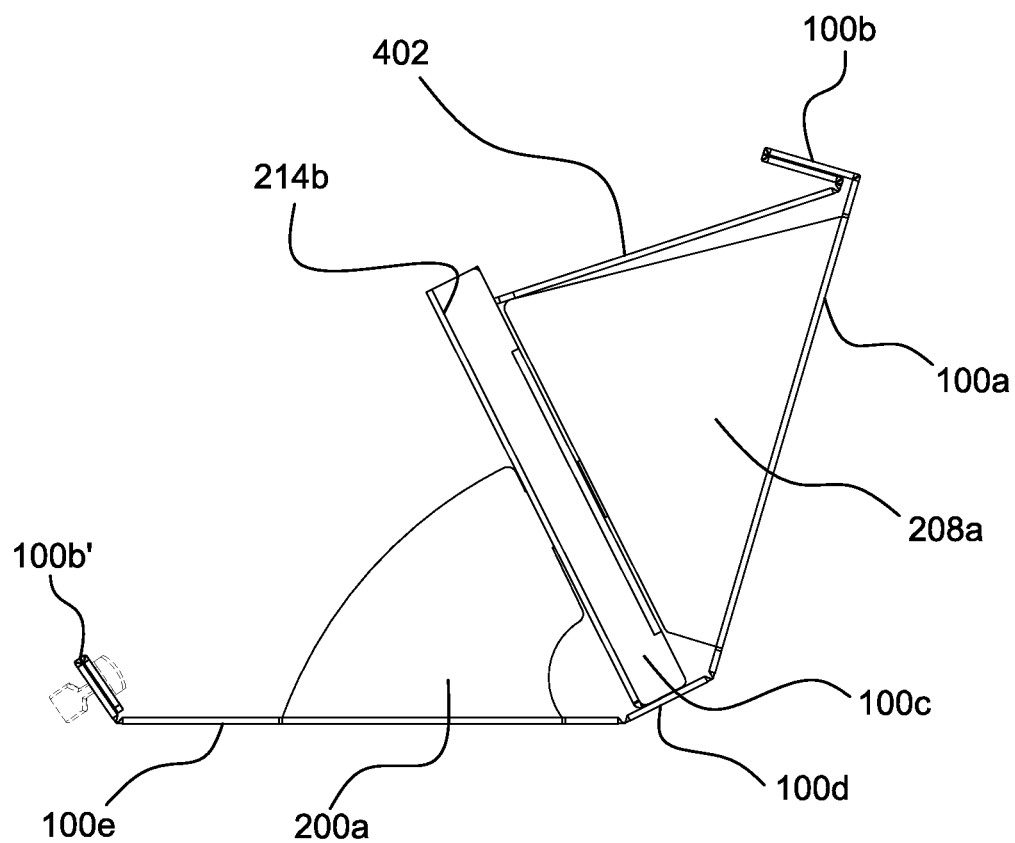
FIG. 14 is a right side view thereof (the left side substantially being a mirror thereof)
Figure 15:
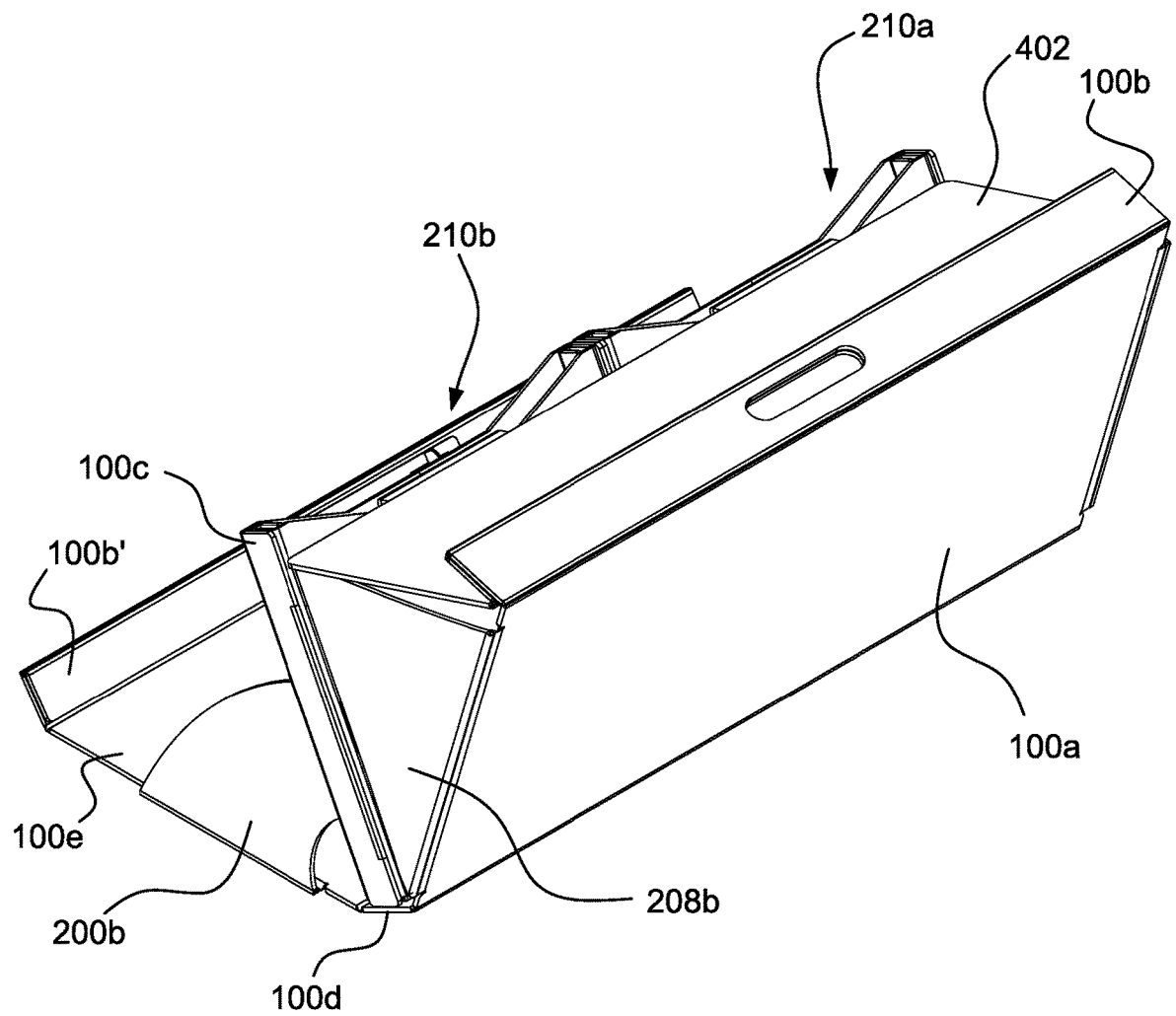
FIG. 15 is a rear perspective view thereof.

FIGS. 9-15 show a sample viewer in an open configuration suitable for indoor use in accordance with certain example embodiments. The embodiment shown in FIGS. 1-8 is designed to be used with the embodiment in FIGS. 9-15, and vice versa. Of course, different example indoor and outdoor configurations may be used together in different example embodiments. Referring to FIGS. 9-15, FIG. 9 is a front perspective view of a sample viewer in an open configuration suitable for indoor use in accordance with certain example embodiments, FIG. 10 is a front elevation view thereof, FIG. 11 is a rear elevation view thereof, FIG. 12 is a top plan view thereof, FIG. 13 is a bottom plan view thereof, FIG. 14 is a right side view thereof (the left side substantially being a mirror thereof), and FIG. 15 is a rear perspective view thereof.

As will be appreciated from FIG. 9, for example, the viewing area 204 is propped open by virtue of the tabs of the front wings 200a-200b engaging with slots provided to the viewing area. At least portions of the front outer surface 100a and rear wings 208a-208b are viewable through the openings 206a-206b. The area "behind" the openings 206a-206b is substantially sealed by the rear wings 208a-208b on the sides, the front outer surface 100a at the back, and the portion 402 at the top.

As noted above, any suitable size and/or shape may be used for the front wings 200a-200b. However, it generally will be desirable to have a size and/or shape of the front wings 200a-200b that is conducive to an acute angle being formed relative to the back outer surface 100e and the viewing area 204 when the viewer 100 is open and in the indoor viewing configuration.

Figure 16:
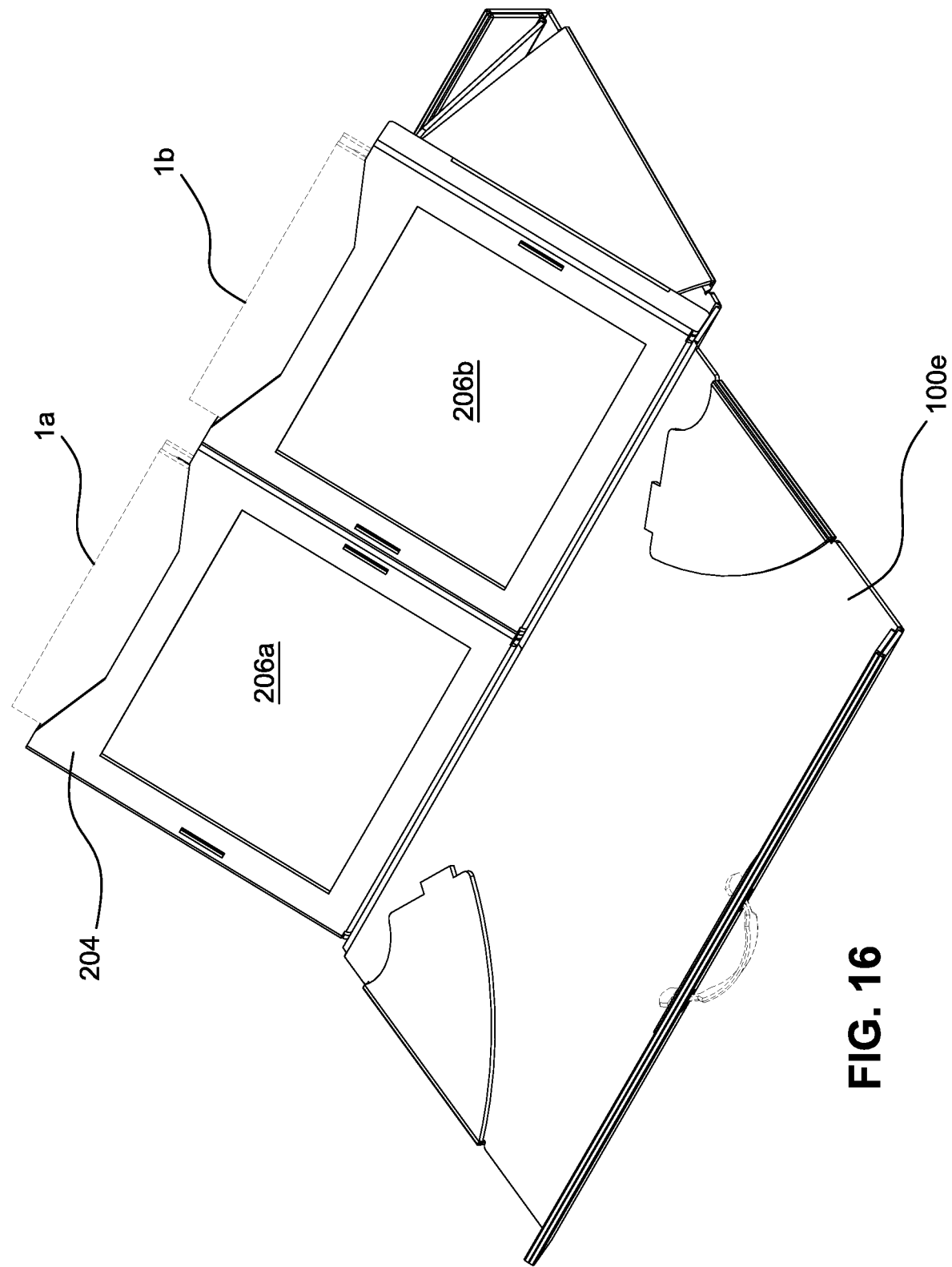
FIG. 16 shows insulated glass (IG) unit samples inserted into the FIG. 2 example configuration, in accordance with certain example embodiments.
Figure 17:
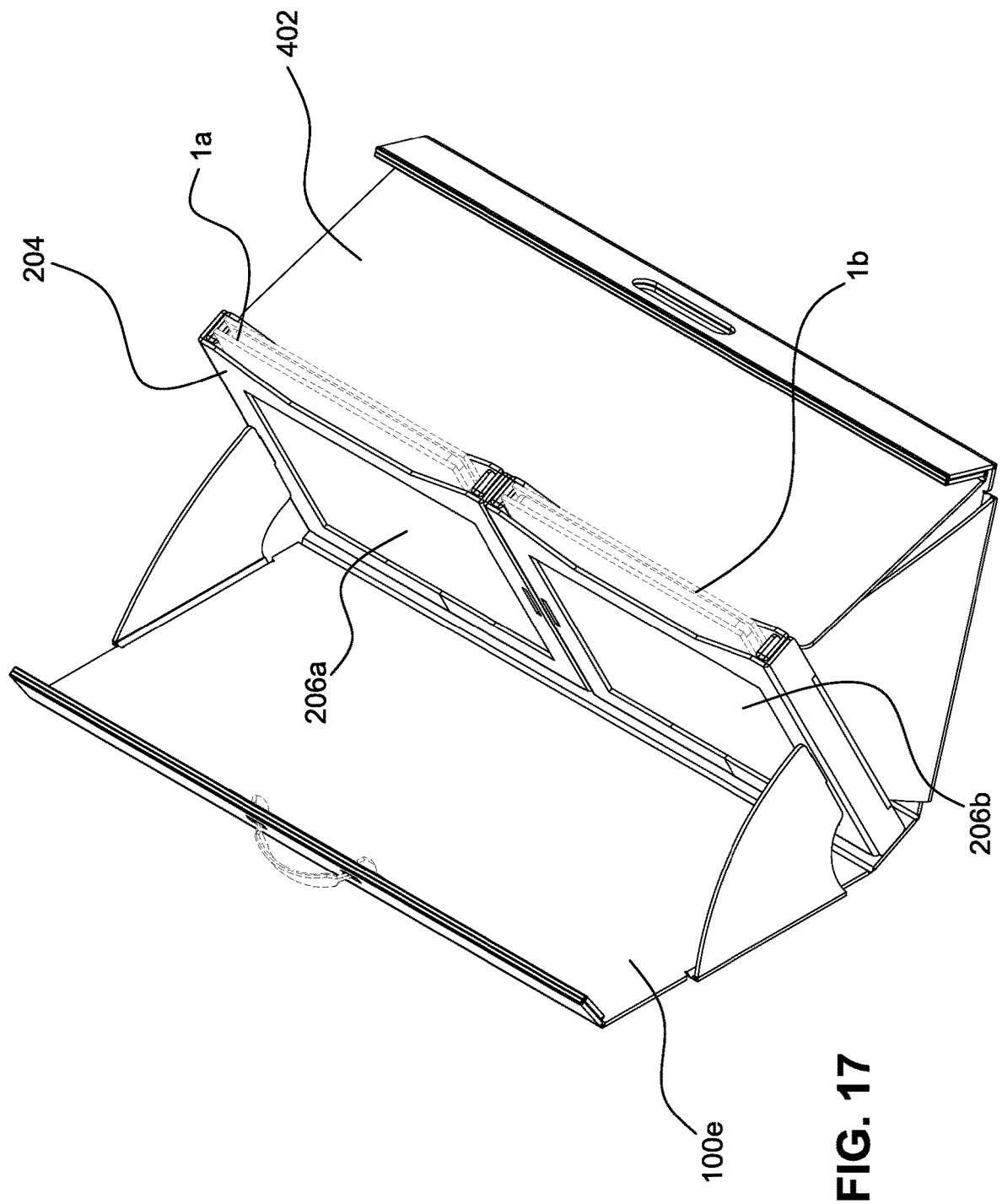
FIG. 17 shows IG unit samples inserted into the FIG. 9 example configuration, in accordance with certain example embodiments.

FIG. 16 shows IG unit samples 1a and 1b inserted into the FIG. 2 example configuration, in accordance with certain example embodiments. FIG. 17 shows IG unit samples 1a and 1b inserted into the FIG. 9 example configuration, in accordance with certain example embodiments. As will be appreciated from the description above, FIG. 16 is suitable for outdoor use, and FIG. 17 is suitable for indoor use. The FIG. 16 configuration can be reached from the closed or transportation configuration (e.g., as shown in FIG. 1), and the FIG. 17 configuration can be reached from the FIG. 16 configuration. In certain example embodiments, an adhesive may be used across all or substantially all of the top of the glass in the IG unit samples 1a and 1b. The adhesive may wrap down onto the front and/or back surfaces of the samples 1a and 1b in certain example embodiments. If the adhesive extends downward towards and in contact with the inner shell components, it also may be used to help hold the glass in place in the viewer. An adhesive or non-adhesive member (e.g., a folded piece of paper, card stock, or the like) may wrap around the top of one or both samples, individually or collectively, and may be used to provide product information and/or images for viewing in one or both configurations. For instance, double-sided papers, card stock, or the like, that extend into the openings 206a and/or 206b may be used to provide images that are viewable in outdoor and indoor viewing configurations. These and/or other materials may help keep the glass clean in certain example instances, may provide a convenient place to hold on to when removing the samples, etc.

Figure 18A:
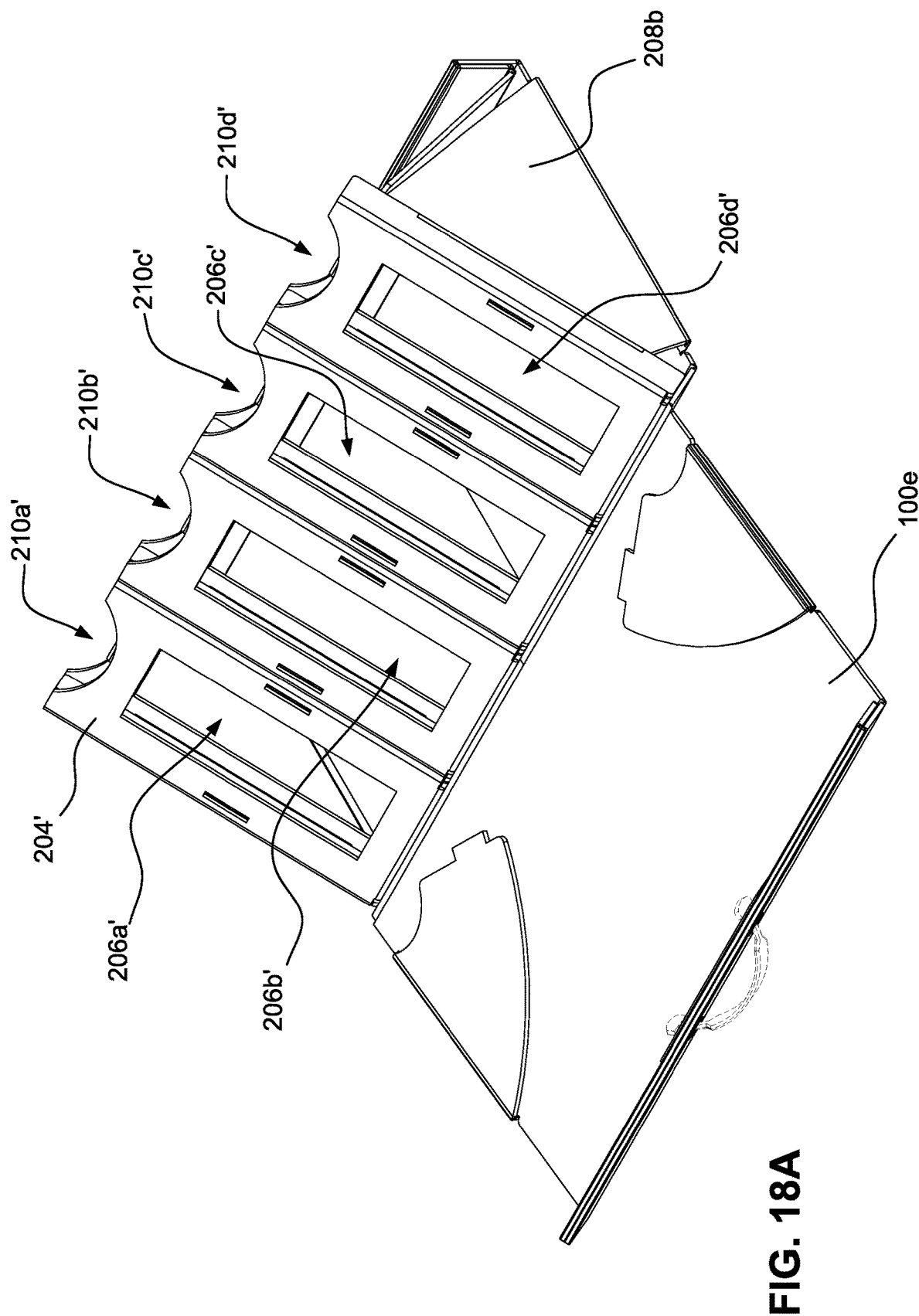
FIG. 18A is a variant of the FIG. 2 example configuration, which includes four slots for holding samples or other information in accordance with certain example embodiments.
Figure 18B:
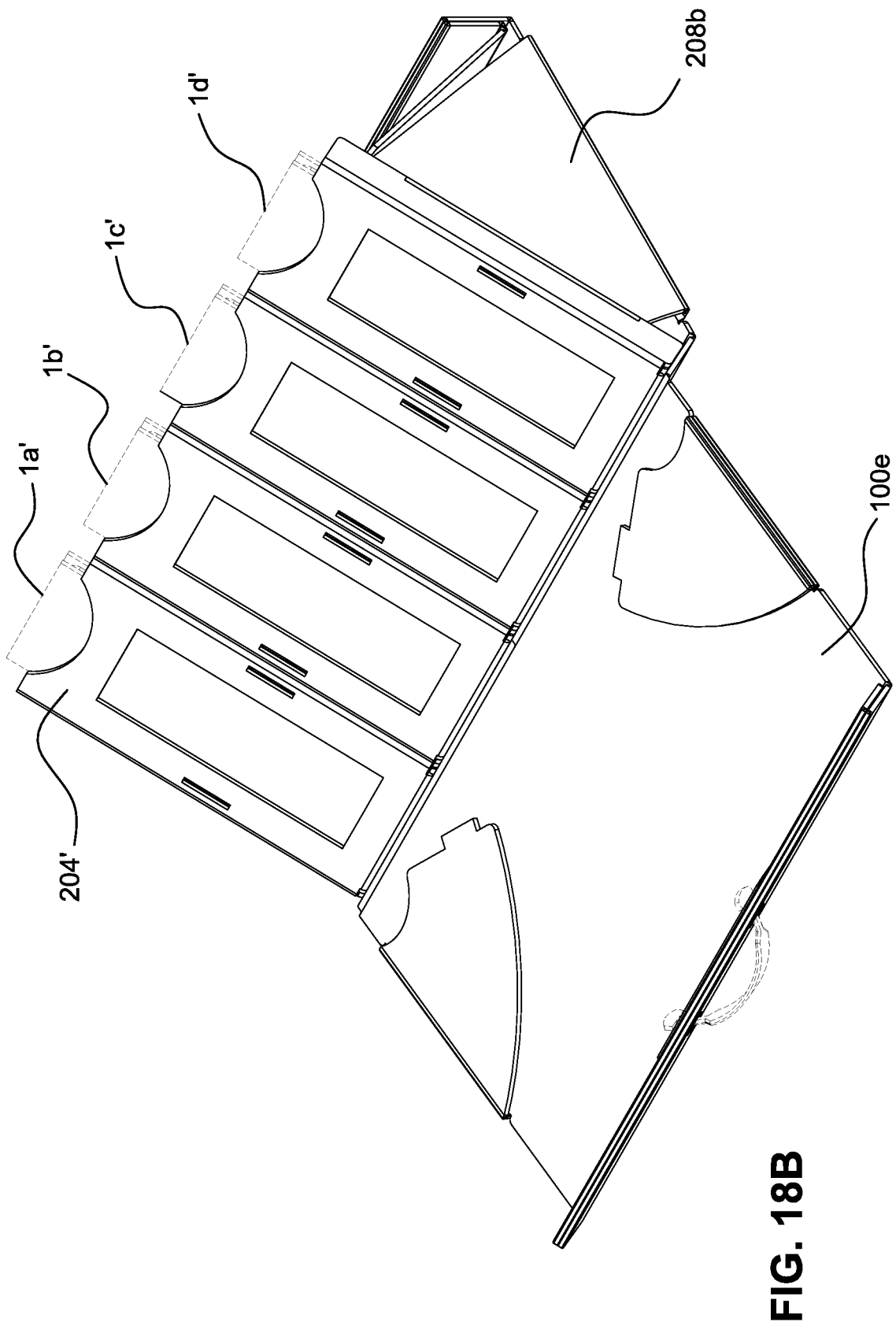
FIG. 18B shows IG unit samples inserted into the FIG. 18A example configuration, in accordance with certain example embodiments.
Figure 19A:
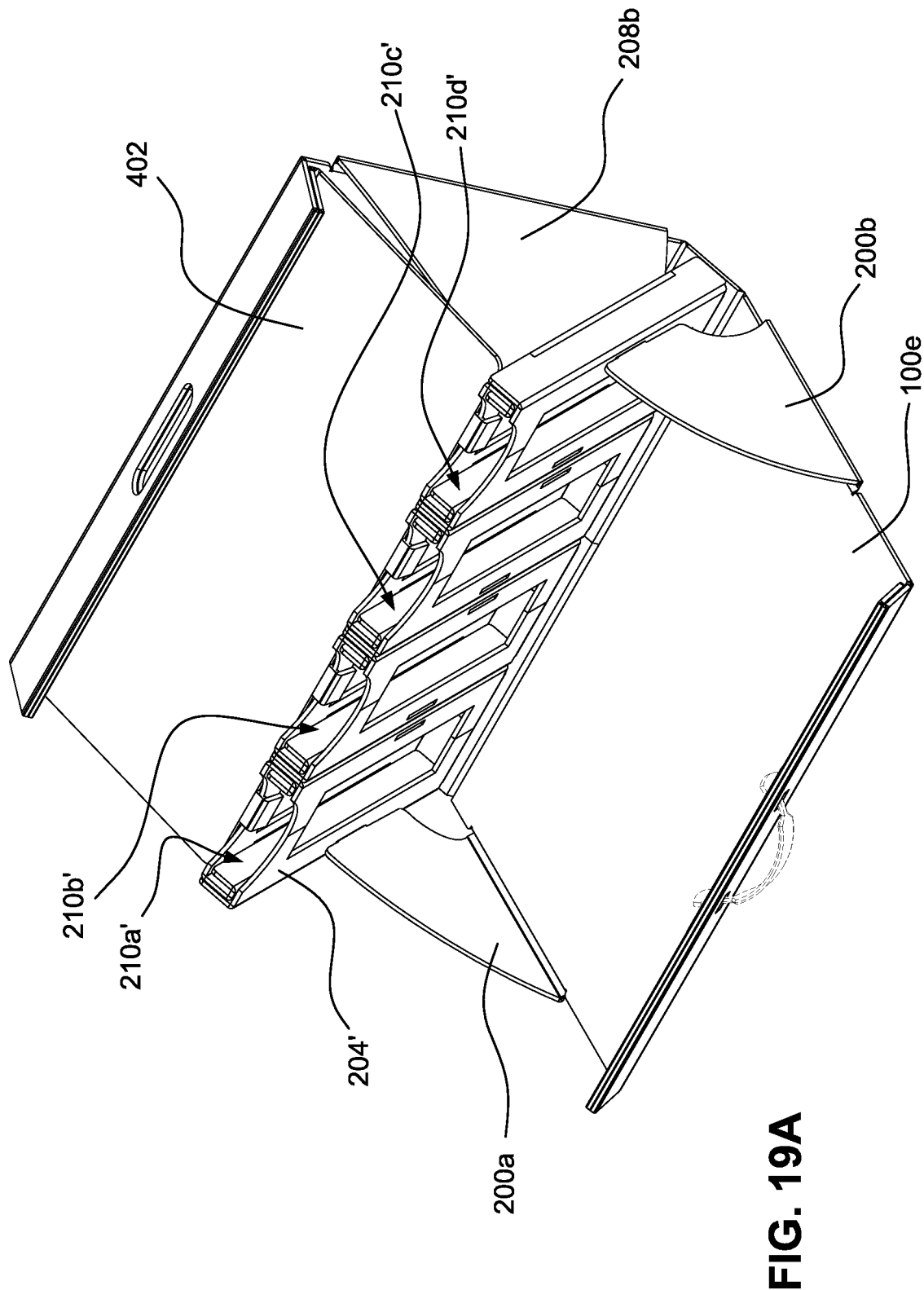
FIG. 19A is a variant of the FIG. 9 example configuration, which includes four slots for holding samples or other information and is compatible with the FIG. 18A arrangement, in accordance with certain example embodiments.
Figure 19B:
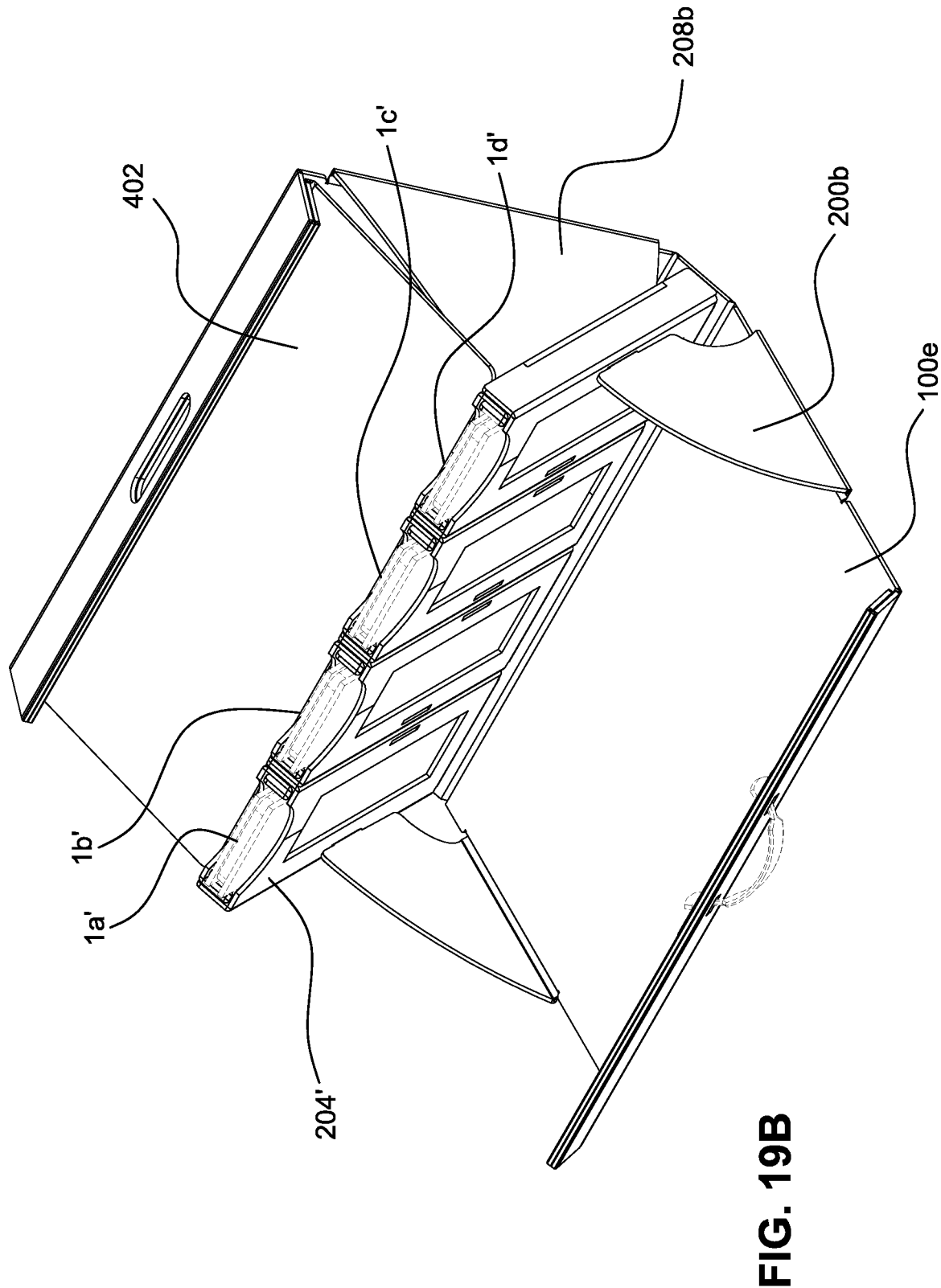
FIG. 19B shows IG unit samples inserted into the FIG. 19A example configuration, in accordance with certain example embodiments

As noted above, more or fewer sample-receiving pockets may be provided in different example embodiments. FIGS. 18A-19B, for example, show four sample-receiving slots 210a'-210d' for openings 206a'-206d'. FIGS. 18A and 19A show this four pocket arrangement without any samples inserted therein for the outdoor and indoor viewing configurations, respectively. FIGS. 18B and 19B show example IG units 1a'-1d' inserted into the sample-receiving pockets 210a'-210d', with FIG. 18B being the outdoor viewing configuration and FIG. 19B being the indoor viewing configuration. It has been found that tall, narrow samples are very convenient to hold in-hand while still providing a length or "runway" desirable for one to easily gauge coloration and/or other aesthetic properties. Architects can see and compare a variety of products at the same time, provide multiple options to their clients, etc. Similarly, "teaching packs" can be put together to educate designers and/or clients about different optical effects such as, for example, gradients in reflectivity, color, and/or the like. Indeed, as alluded to above, perception research has found that people generally are bad at comparing subjective traits (like color, taste, sound quality, etc.) from memory and need to have items to compare in close relative proximity in order to be able to judge them accurately. Providing multi-sample versions can help address this issue in some instances.

Figure 20A:
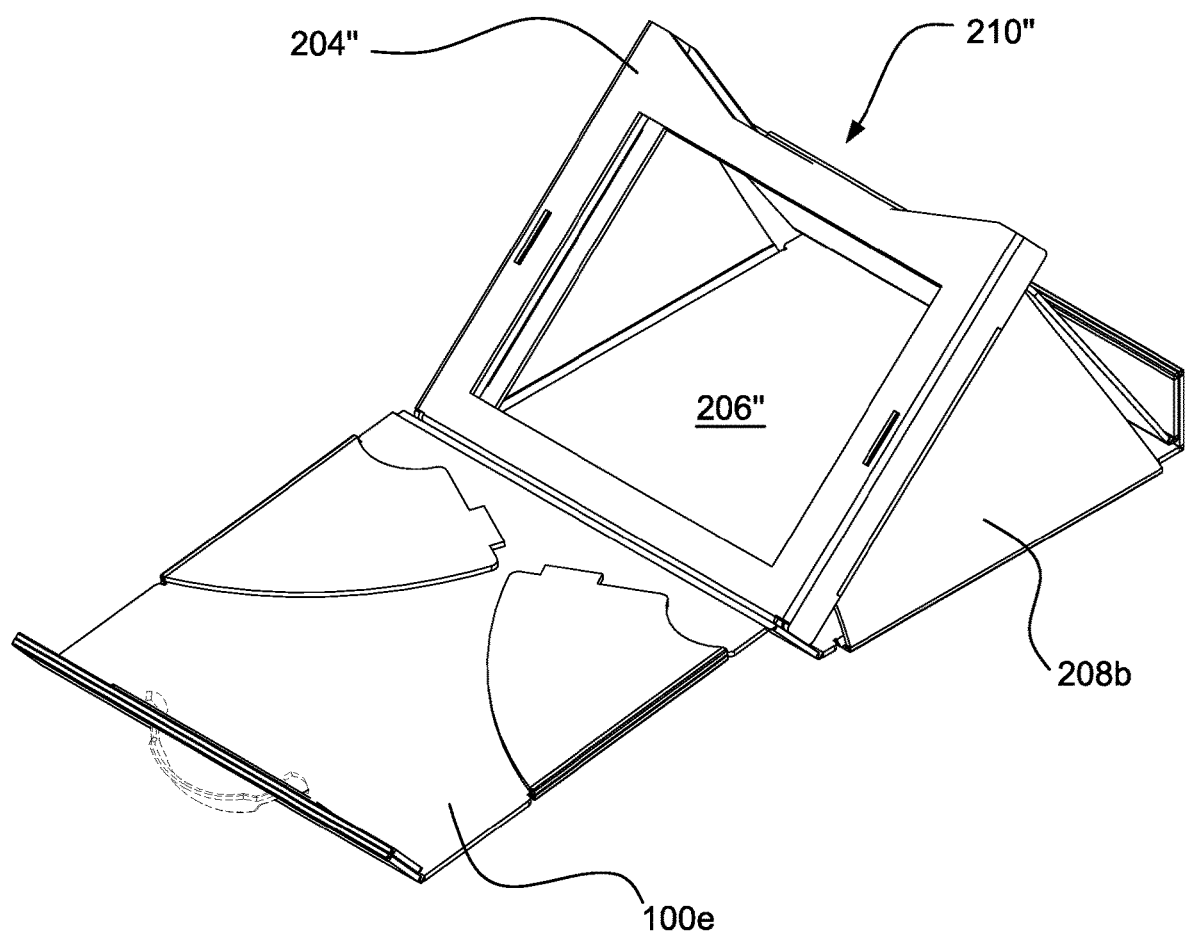
FIG. 20A is a variant of the FIG. 2 example configuration, which includes one slot for holding a sample or other information in accordance with certain example embodiments.
Figure 20B:
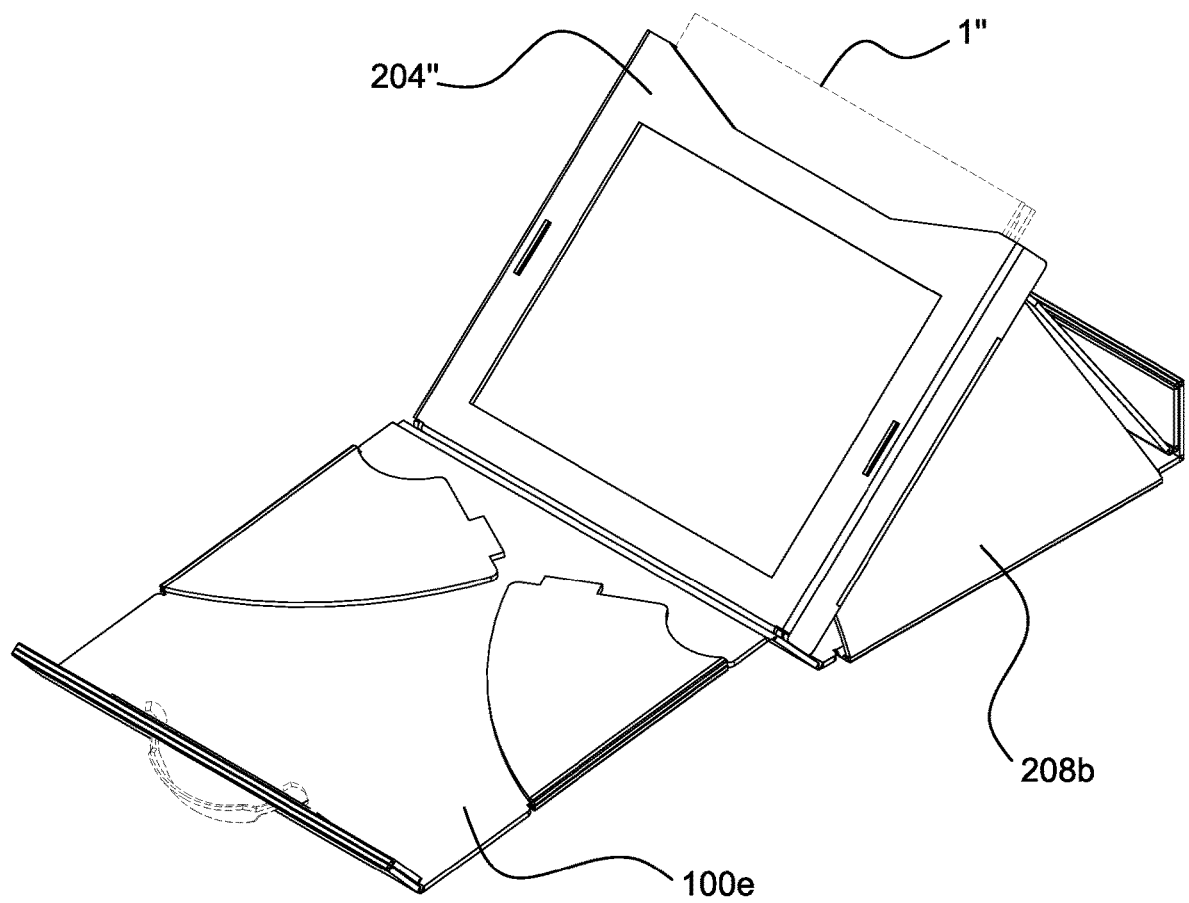
FIG. 20B shows an IG unit sample inserted into the FIG. 20A example configuration, in accordance with certain example embodiments.
Figure 21A:
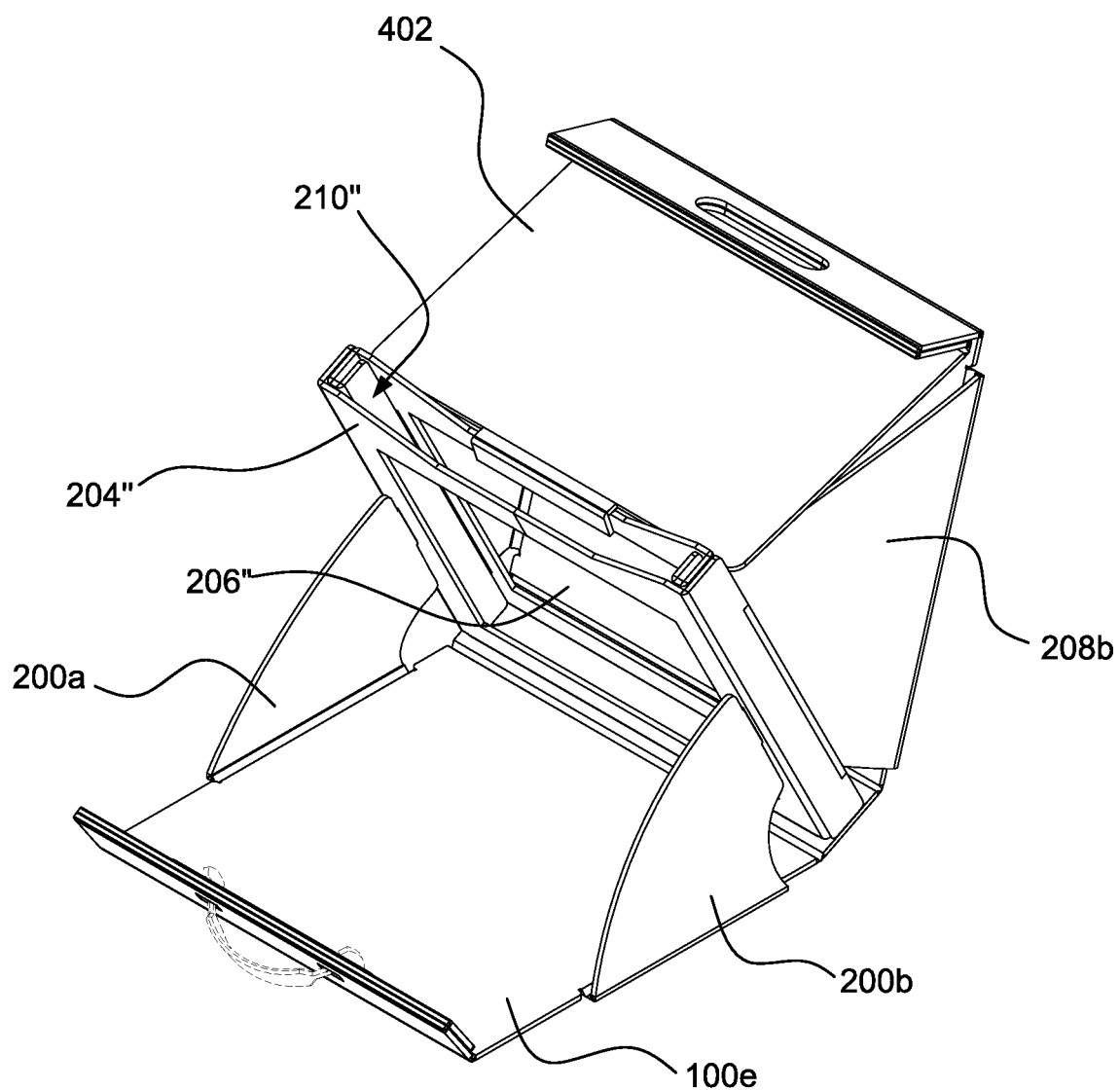
FIG. 21A is a variant of the FIG. 9 example configuration, which includes one slots for holding a sample or other information and is compatible with the FIG. 20A arrangement, in accordance with certain example embodiments.
Figure 21B:
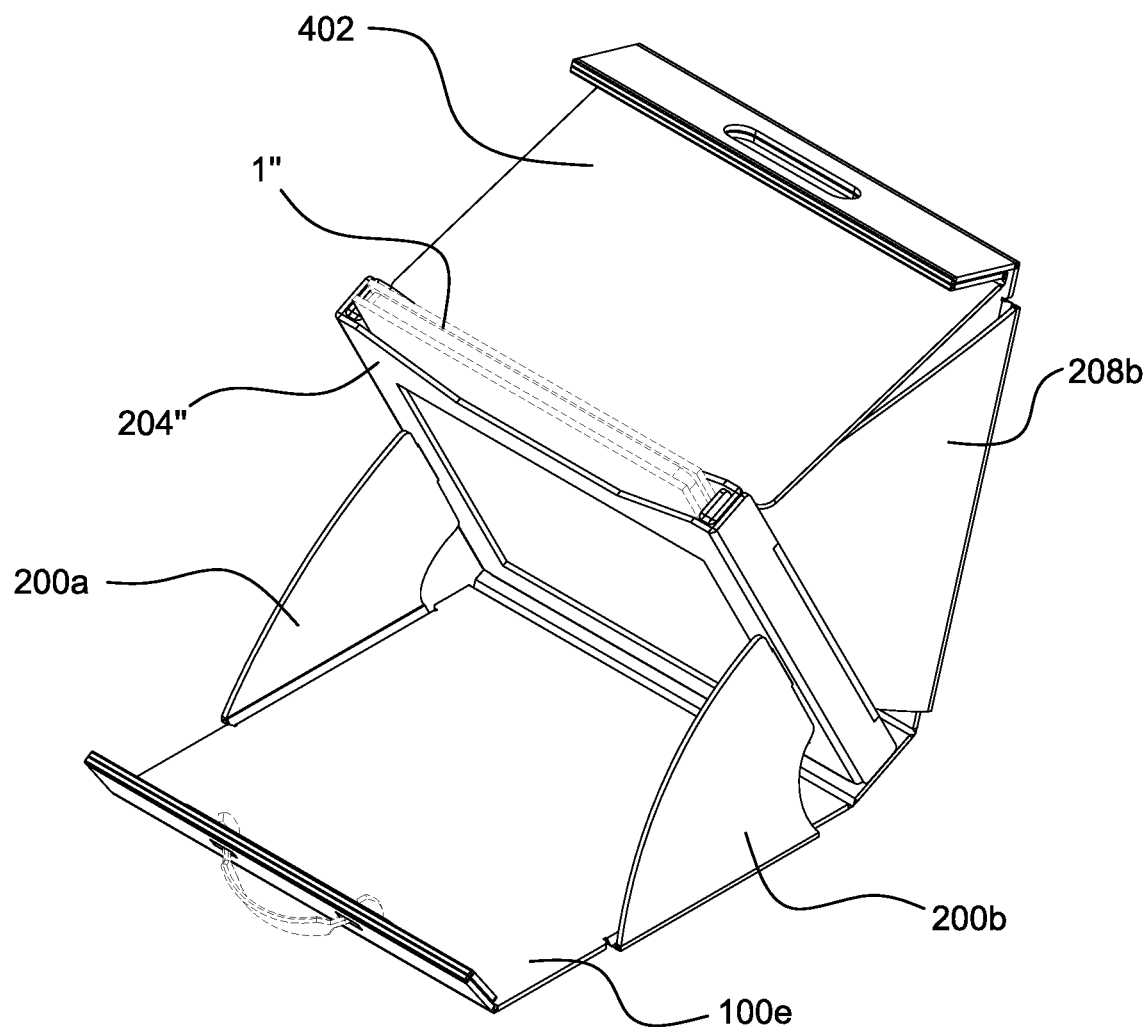
FIG. 21B is shows an IG unit sample inserted into the FIG. 21A example configuration, in accordance with certain example embodiments.

In a similar vein, FIGS. 20A-21B show a single sample receiving slot 210" for a single opening 206". FIGS. 20A and 21A show this one pocket arrangement without a sample inserted therein for the outdoor and indoor viewing configurations, respectively. FIGS. 20B and 21B show example IG unit 1″ inserted into the sample-receiving pocket 210″, with FIG. 20B being the outdoor viewing configuration and FIG. 21B being the indoor viewing configuration.

Further example configurations, modifications, and/or adjustments are shown and described in U.S. application Ser. No. 29/706,216 filed on Sep. 18, 2019, the entire contents of which are hereby incorporated herein by reference.

As explained above, corrugated cardboard and/or the like may be used to create the viewers of certain example embodiments. Flat packs may be created for inner sleeve and outer shell components. Flat packs may be created by die cutting according to patterns, or via any other suitable mechanism. Flat pack templates may be provided to accommodate logos, text, and graphics on the viewer's surface(s). Depending on the standard sample thickness (e.g., monolithic, laminate, or IG units, etc.), the flat pack designs may be modified to produce convenient initial assembly and in-use experience. It will be appreciated that non-flat pack materials may be used in certain example embodiments. For instance, injection molded plastic, cast metal, formed paper fibers, and/or the like may be used to create inner and/or outer shell components in certain example embodiments. In certain example embodiments, different configurations may be provided, e.g., where there is only one piece (corresponding to both inner and outer components), where there are multiple pieces beyond just inner and outer shells, etc.

Figure 22:
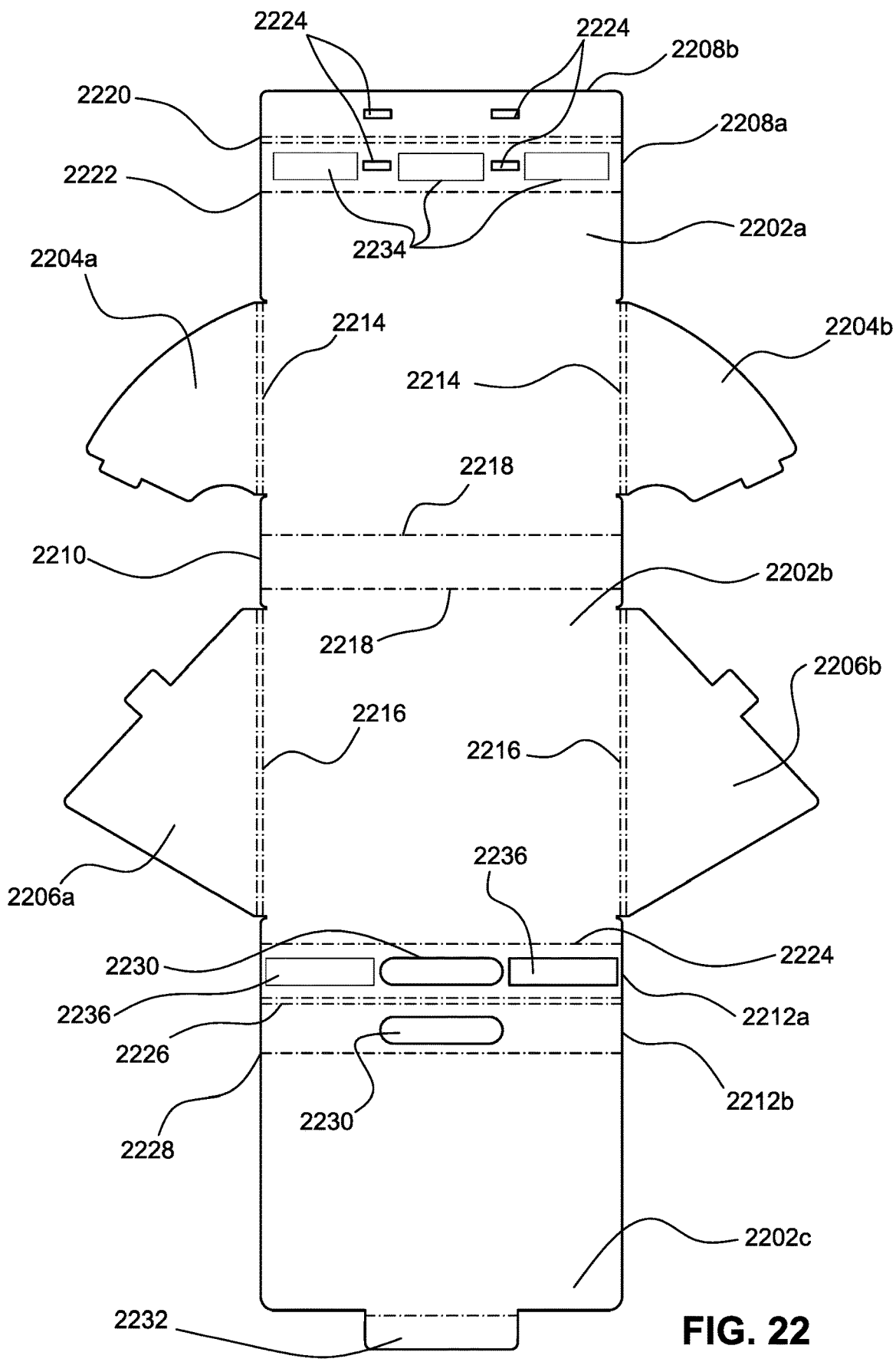
FIG. 22 is a plan view of an example flat pack that could be used to create an outer shell of a box viewer, in accordance with certain example embodiments.

Example flat packs will now be described in connection with FIGS. 22-23C. In FIGS. 22 and 23A-23B, the dash-dot broken lines indicate areas where the material has been thinned or perforated to facilitate folding and/or the like. FIG. 22 is a plan view of an example flat pack that could be used to create an outer shell of a box viewer, in accordance with certain example embodiments. A first area 2202a includes arms 2204a-2204b on opposing sides thereof. The arms 2204a-2204b are easily foldable by virtue of scored or perforated areas 2214. The first area 2202a and arms 2204a-2204b correspond to the back outer surface 100e and front wings 200a-200b in the example discussed above.

A second area 2202b includes arms 2206a-2206b on opposing sides thereof. The arms 2206a-2206b are easily foldable by virtue of scored or perforated areas 2216. The second area 2202b and arms 2206a-2206b correspond to the front outer surface 100a and rear wings 208a-208b in the example discussed above.

The first and second areas 2202a and 2202b area spaced apart from one another by virtue of narrow area 2210. The first area 2202a is foldable towards the second area 2202b, and vice versa, by virtue of scored or perforated areas 2218. The narrow area 2210 corresponds to the bottom outer surface 100d in the example discussed above.

On a side of the first area 2202a opposite the narrow area 2210 are inner and outer handle connection areas 2208a and 2208b. The outer handle connection area 2208b folds about scored or perforated area 2220 and contacts inner handle connection area 2208a. The handle connection areas 2208a-2208b, once joined, fold towards the first area about scored or perforated area 2222. A handle may be connected via the holes 2224. For instance, tabs or other fastening mechanisms may extend through these holes 2224, be sandwiched between the handle connection areas 2208a-2208b, etc. When assembled, the handle connection areas 2208a-2208b correspond to area 100b′ in the example discussed above.

On a side of the second area 2202b opposite the narrow area 2210 are handle hole areas 2212a and 2212b. A handle is able to pass through the holes 2230 in these areas. The first handle hole area 2212a is foldable towards the second area 2202b by virtue of scored or perforated area 2224, and the second handle hold area 2212b is foldable towards the first handle hole area 2212a by virtue of scored or perforated area 2226. When assembled, the handle hole areas 2212a-2212b correspond to top outer surface 100b in the example discussed above.

A third area 2202c is provided on a side of the handle hole areas 2212a and 2212b opposite the second area 2202b. It is foldable towards the second area 2202b via scored or perforated area 2228 and includes a tab or other feature 2232 on an end thereof. The third area 2202c corresponds to member 402 in the example discussed above.

An outer shell can be formed from the FIG. 22 example flat pack as follows. The handle connection areas 2208a-2208b are brought into contact with one another by folding about area 2220, and they may be secured to one another via adhesive provided in areas 2234 or the like. Similarly, the handle hole areas 2212a-2212b are brought into contact with one another by folding about area 2226, and they may be secured to one another via adhesive provided in areas 2236 or the like.

The third area 2202c is brought into contact with the second area 2202b. The arms 2206a-2206b are folded about areas 2216 towards the second area as well. The third area 2202c may be folded towards the second area 2202b prior to the arms 2206a-2206b such that the third area 2202c contacts the second area 2202b and the arms 2206a-2206b contact the third area 2202c, or the third area 2202c may be folded towards the second area 2202b after to the arms 2206a-2206b such that the arms 2206a-2206b contact the second area 2202b and the third area 2202c contacts the arms 2206a-2206b.

The arms 2204a-2204b are folded about areas 2214 so that they contact area 2202a. An assembled sleeve may be glued or otherwise affixed to narrow area 2210. The first and second areas 2202a and 2202b may be folded towards one another so that they face each other. The assembled area including the handle connection areas 2208a-2208b may be folded over to complete the outer shell. As an alternative, the first and second areas 2202a and 2202b may be folded towards one another prior to the assembled being provided. In this case, the assembled sleeve may inserted into the subassembly. It will be appreciated that these and/or other equivalent steps may be performed in any suitable order in different example embodiments.

Figure 23A:
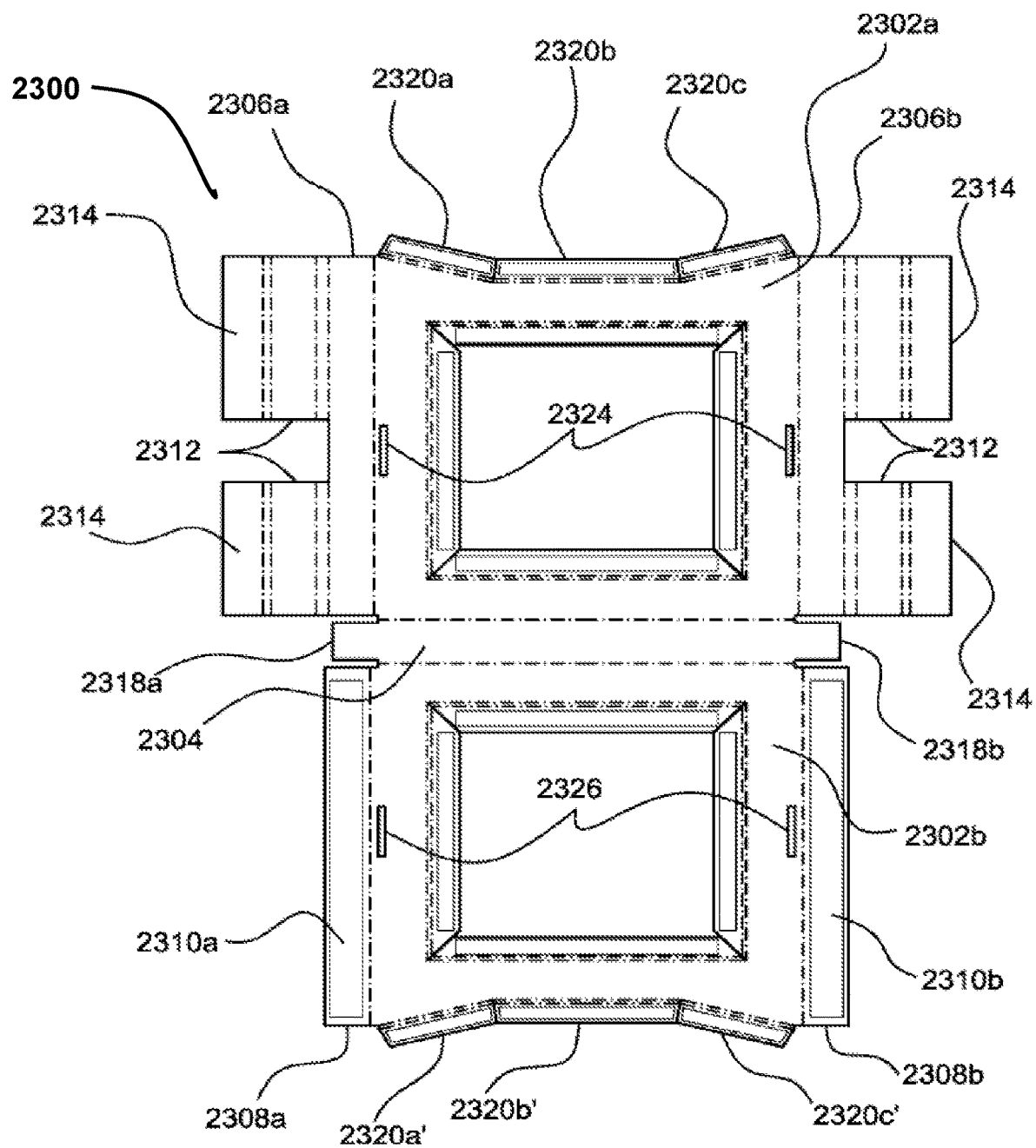
FIG. 23A is a top plan view of a first example flat pack that could be used to create an inner sample-receiving sleeve 2300, in accordance with certain example embodiments.
Figure 23B:
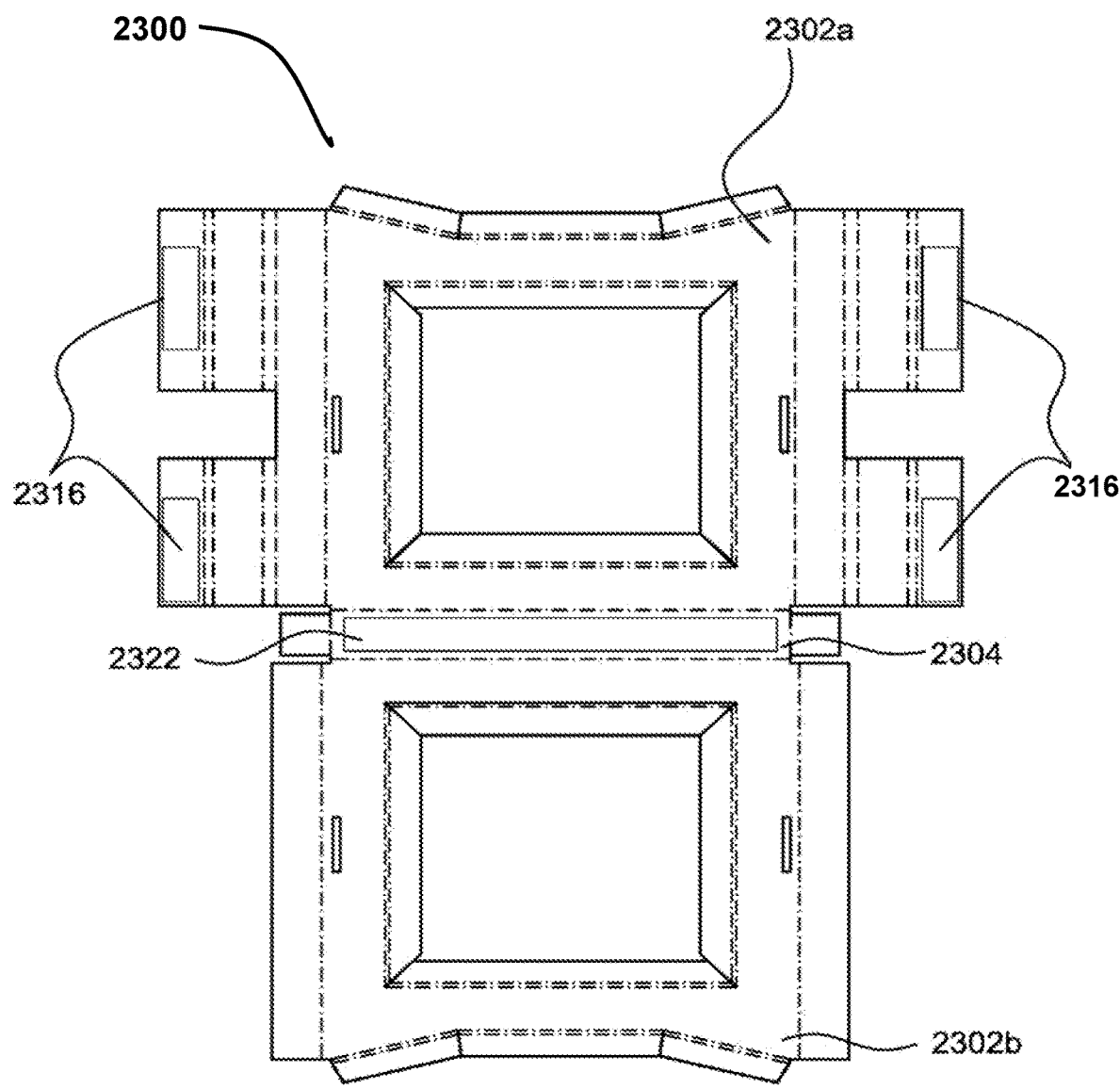
FIG. 23B is a bottom plan view of the FIG. 23A example.

FIG. 23A is a top plan view of a first example flat pack that could be used to create an inner sample-receiving sleeve 2300, in accordance with certain example embodiments, and FIG. 23B is a bottom plan view of the FIG. 23A example.

Referring to FIG. 23A, the first and second sleeve portions 2302a and 2302b are foldable towards one another about the scored or other areas provided about the center portion 2304. Ultimately, inner surfaces of the first and second sleeve portions 2302a and 2302b face one another. Tab portions 2318a-2318b provided on opposing ends of the center portion 2304 to help further define the space between the sleeve portions 2302a-2302b.

Upper arms 2306a-2306b fold inwardly 90 degrees towards one another, and the lower arms 2308a-2308b wrap around the outside of the upper arms 2306a-2306b and are secured thereto via adhesive provided to areas 2310a-2310b or the like. First leg segments 2312 provided to the first sleeve portion 2302a wrap around the lower arms 2308a-

2308*b*, and second leg segments 2314 help further secure the first and second sleeve portions 2302*a*-2302*b* to one another via adhesive provided to areas 2316. This arrangement advantageously makes it easier for the tabs to go into the sleeve without touching the glass, at least in certain example embodiments.

Areas 2302*a*-2302*c* and 2302*a'*-2302*c'* joint with one another to create the pocket into which the sample is slidable. They together define the profile, e.g., as in slot 210*a* and upper portion 212*a* in the example discussed above.

The sleeve formable from the flat pack shown in and described in connection with FIGS. 23A-23B may be used in connection with the outer shell from FIG. 22. Once the sleeve is assembled, adhesive provided in area 2322 may help to secure the sleeve of FIGS. 23A-23B to the narrow section 2210 of the shell of FIG. 22. A first set of slots 2324 provided to the sleeve may accommodate tabs from arms 2204*a*-2204*b* from the shell when in indoor use, and a second set of slots 2326 may accommodate tabs from arms 2206*a*-2206*b*.

Figure 23C:
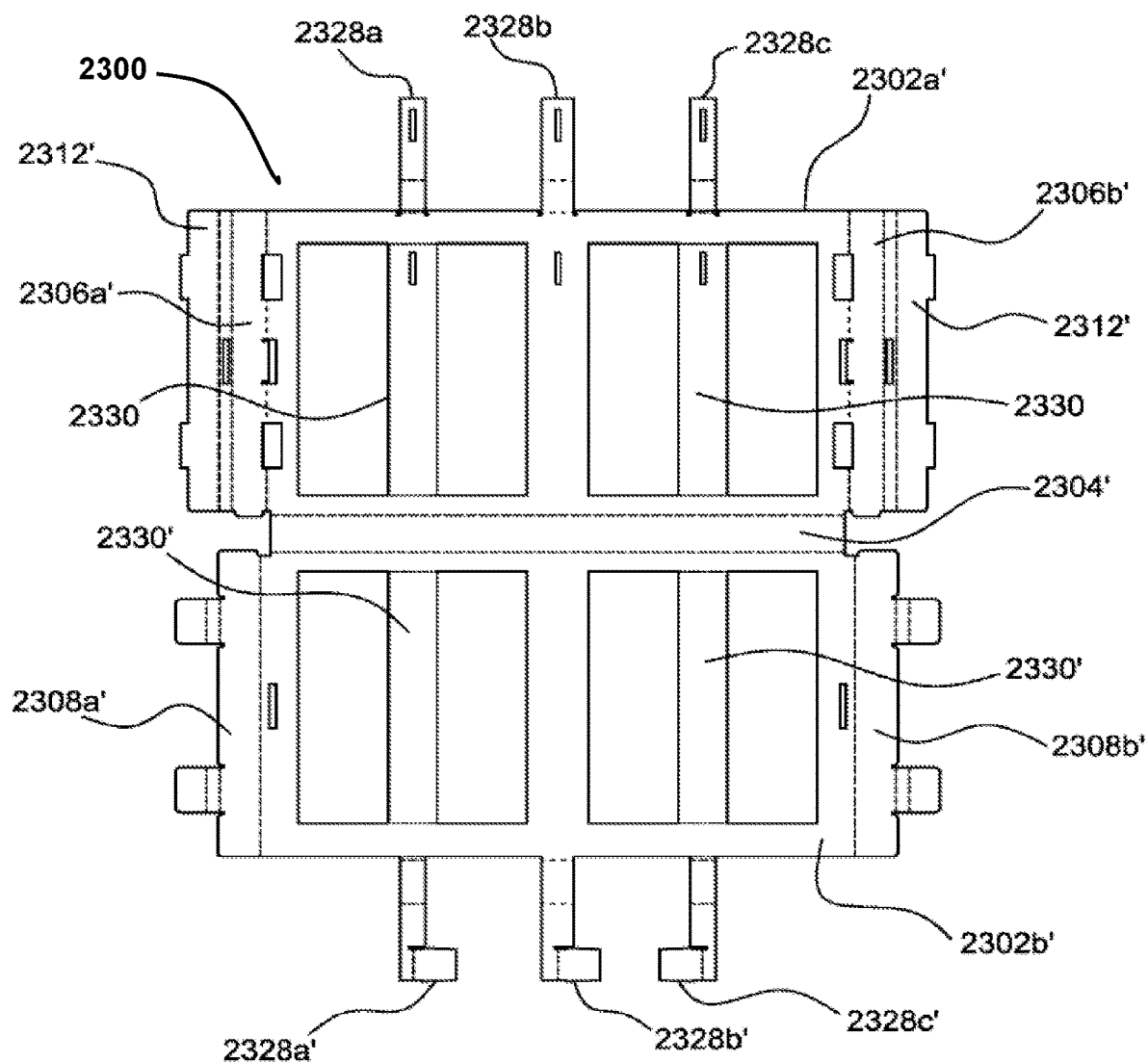
FIG. 23C is a top plan view of a second example flat pack that could be used to create an inner sample-receiving sleeve 2300, in accordance with certain example embodiments.

FIG. 23C is a top plan view of a second example flat pack that could be used to create an inner sample-receiving sleeve, in accordance with certain example embodiments. Conceptually, the FIG. 23C example is similar to that discussed in connection with FIGS. 22A-B. For instance, first and second sleeve portions 2302*a'*-2302*b'* are separated by a center section 2304' and may be manipulated to face one another. Upper side arms 2306*a'*-2306*b'* form the sides of the sleeves and are secured using outer arms 2312' and lower arms 2308*a'*-2308*b'*.

This example is somewhat different, however, in that four sample receiving areas are defined. They are separated by bridge portions, at least some of which are removable. For instance, upper bridge portions 2330 and lower bridge portions 2330' may be removed, e.g., by using perforated areas proximate to their edges. Another difference relates to the locking mechanism which includes a first set of members 2328*a*-2328*c* and a second set of members 2328*a'*-2328*c'* that engage with one another, e.g., as set forth in greater detail in connection with FIGS. 30A-30D.

Figure 24A:
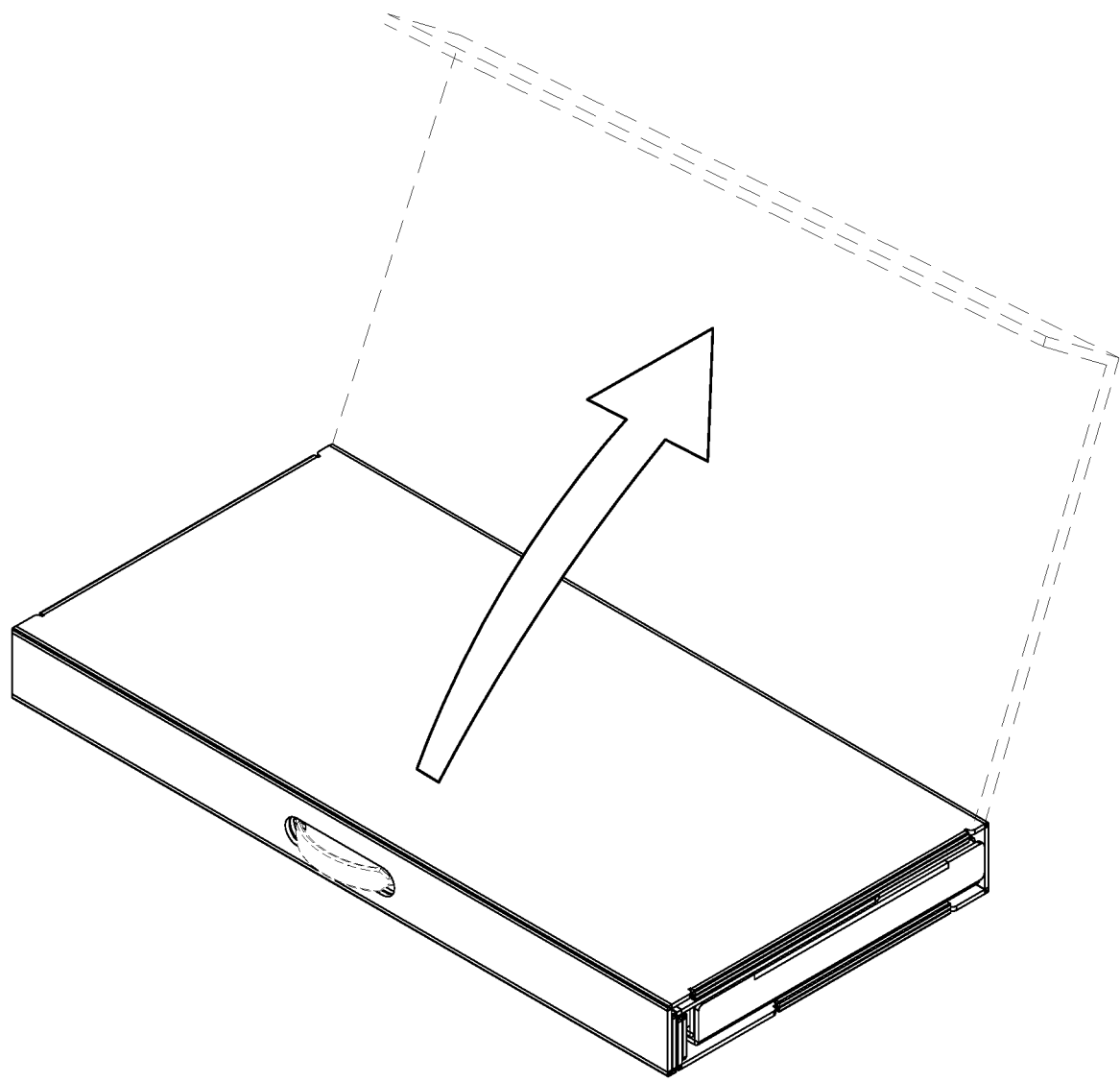
FIGS. 24A-24J show how an example viewer can be transitioned from a closed state to a first open configuration suitable for outdoor use, in accordance with certain example embodiments.
Figure 24B:
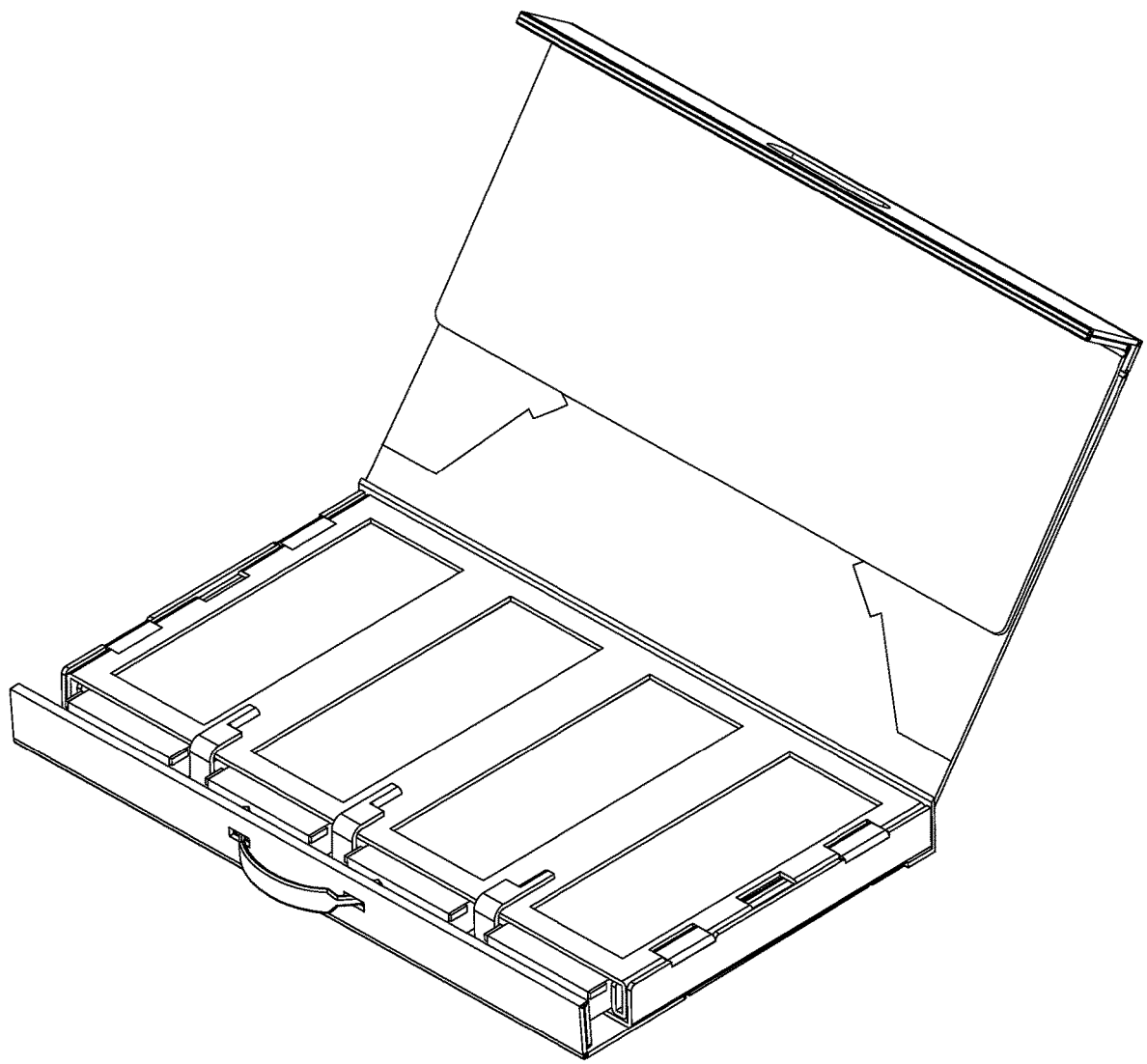

FIGS. 24A-24J show how an example viewer can be transitioned from a closed state to a first open configuration suitable for outdoor use, in accordance with certain example embodiments. The process beings with the viewer placed on dry, stable low surface (such as the ground) with a good view of the sky. Compare, for example, the FIG. 1 viewer, which is in the closed configuration. The lid is lifted, as shown in FIG. 24A. This results in a view shown in FIG. 24B. As shown in FIG. 24A, there are four samples in four product-receiving pockets, similar to as in FIGS. 18A-19B.

Figure 24C:
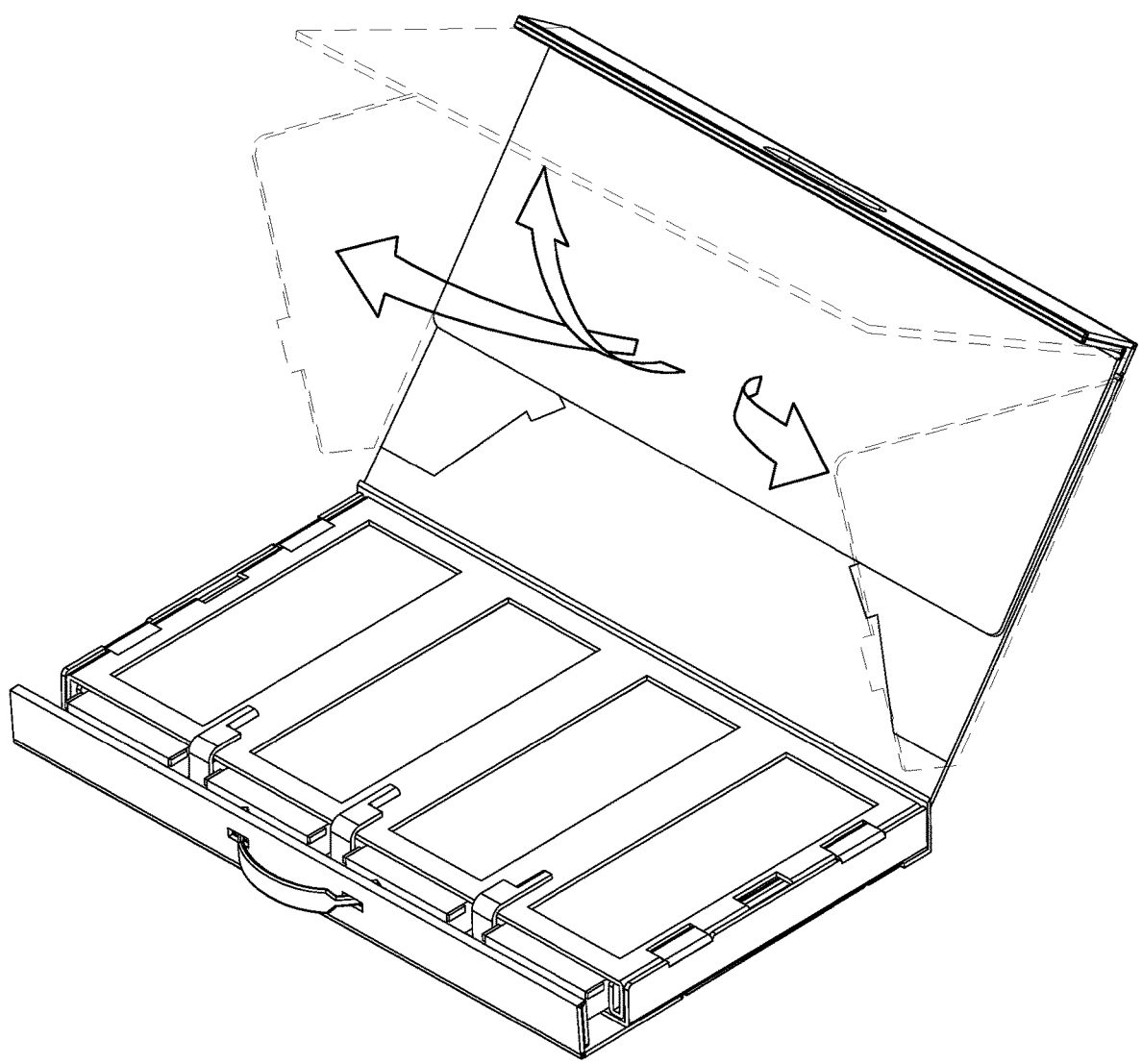
Figure 24D:
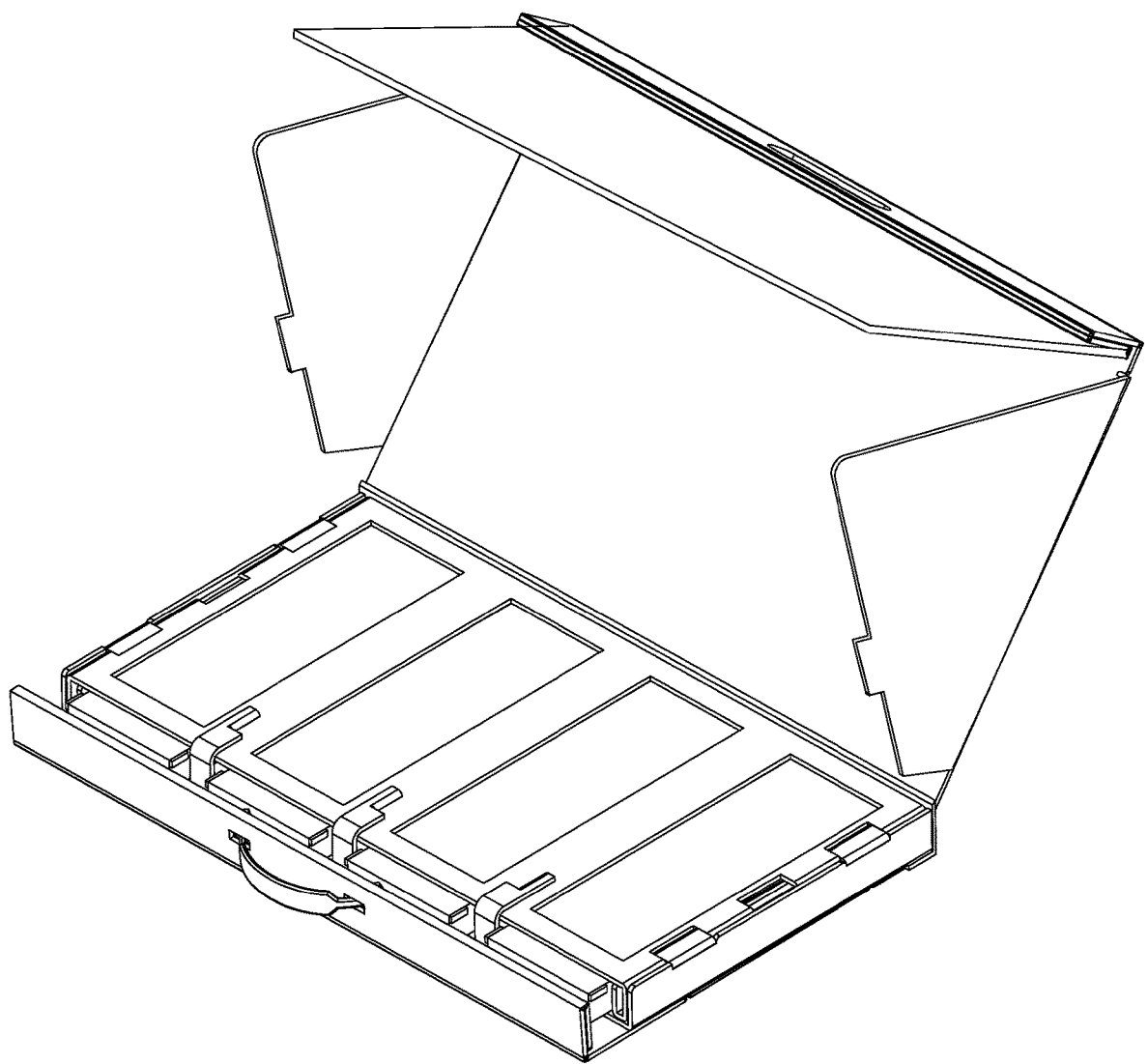
Figure 24E:
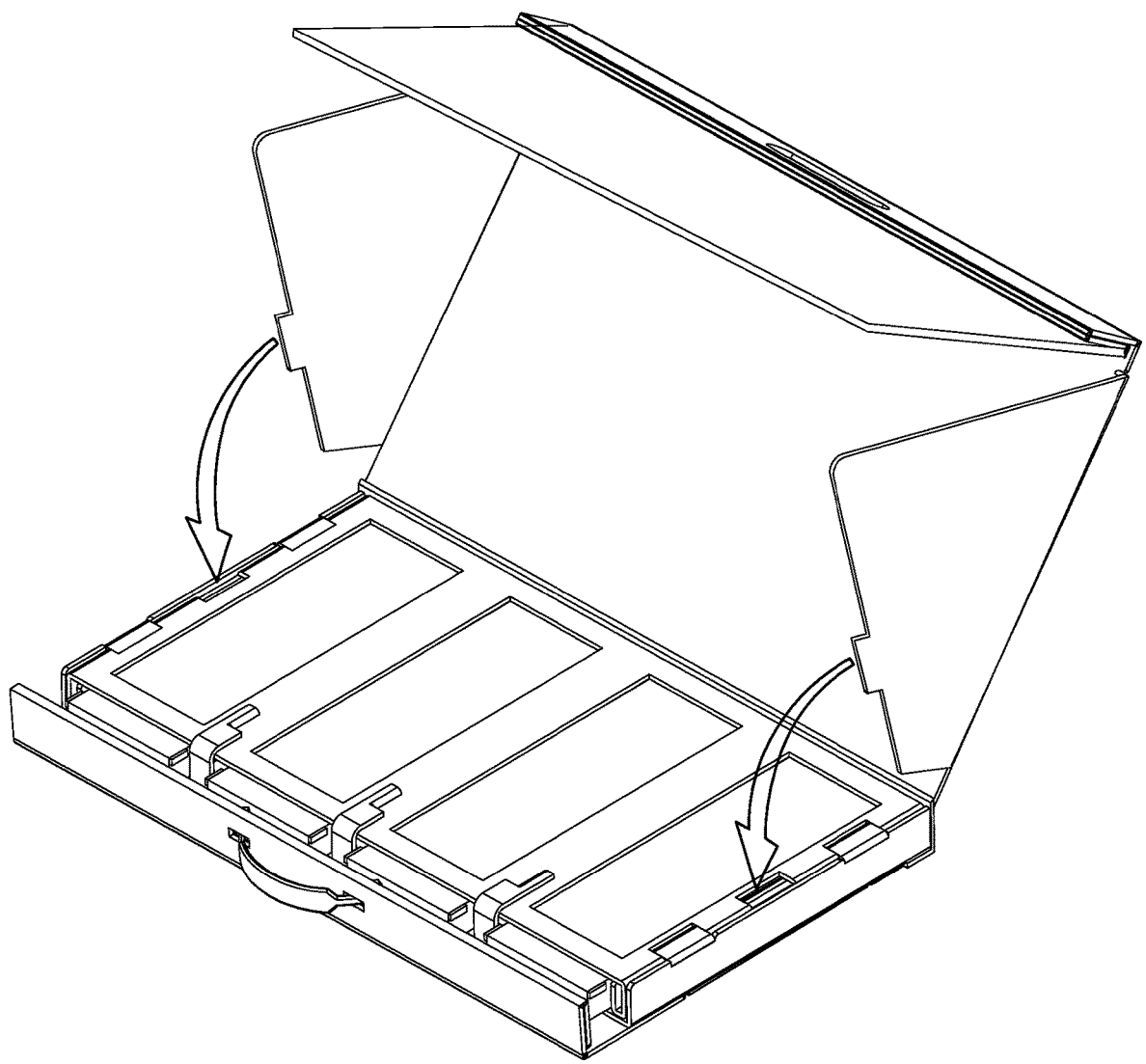
Figure 24F:
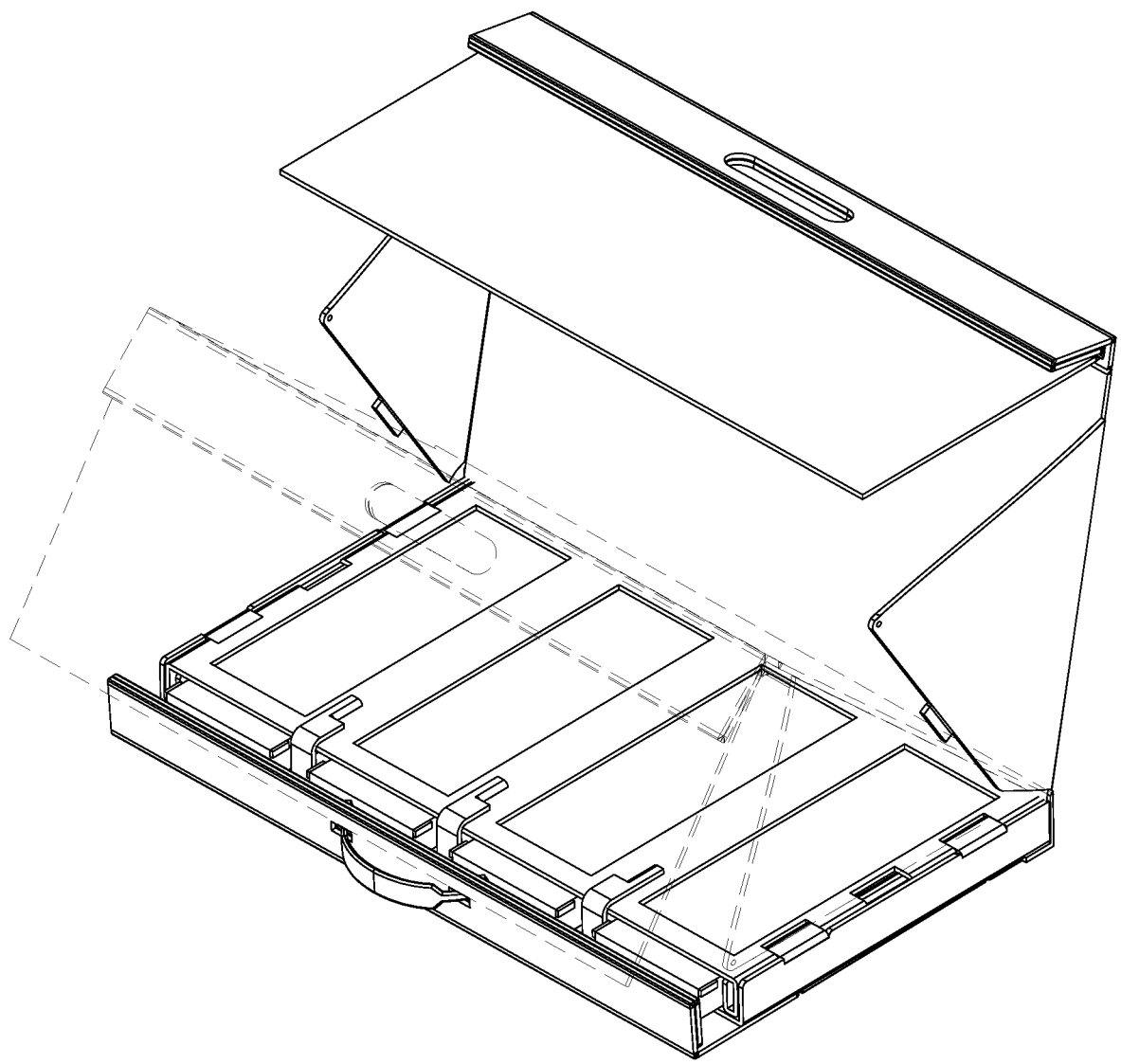
Figure 24G:
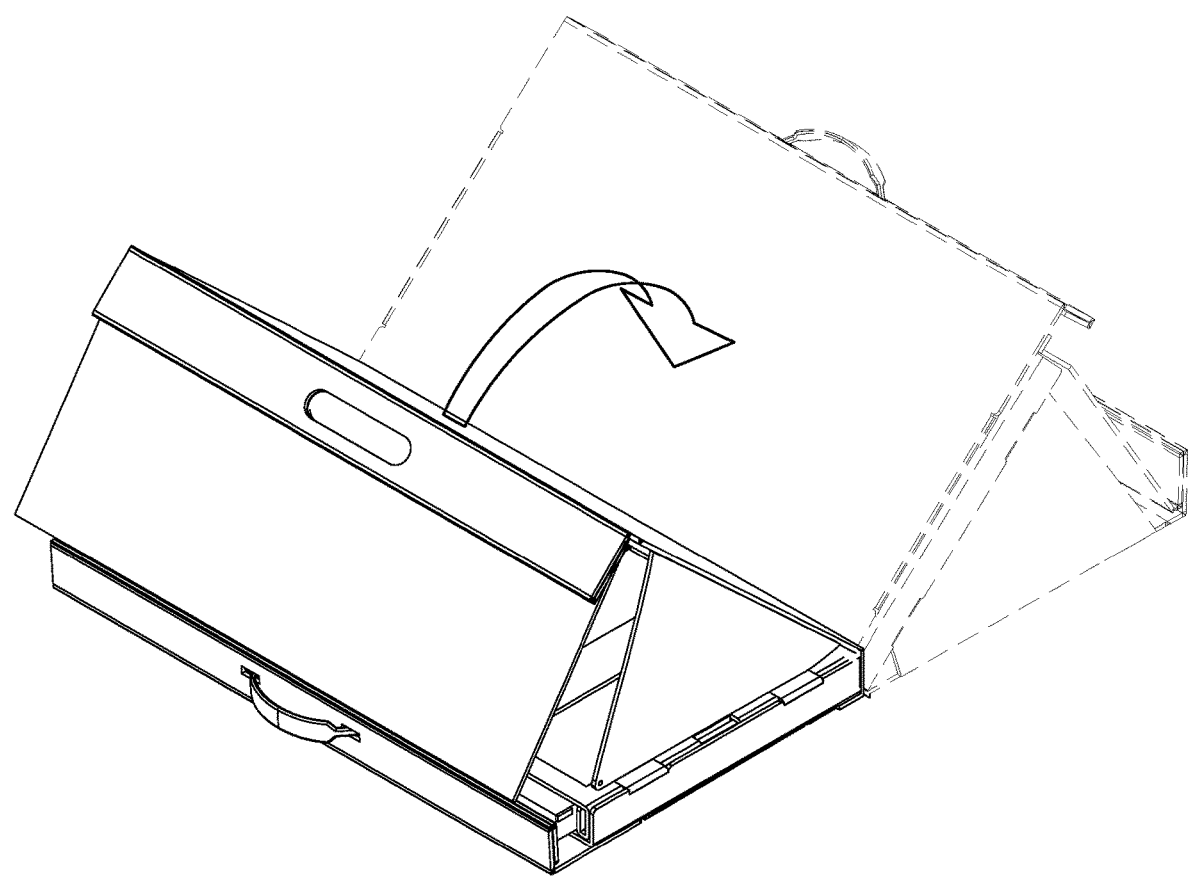
Figure 24H:
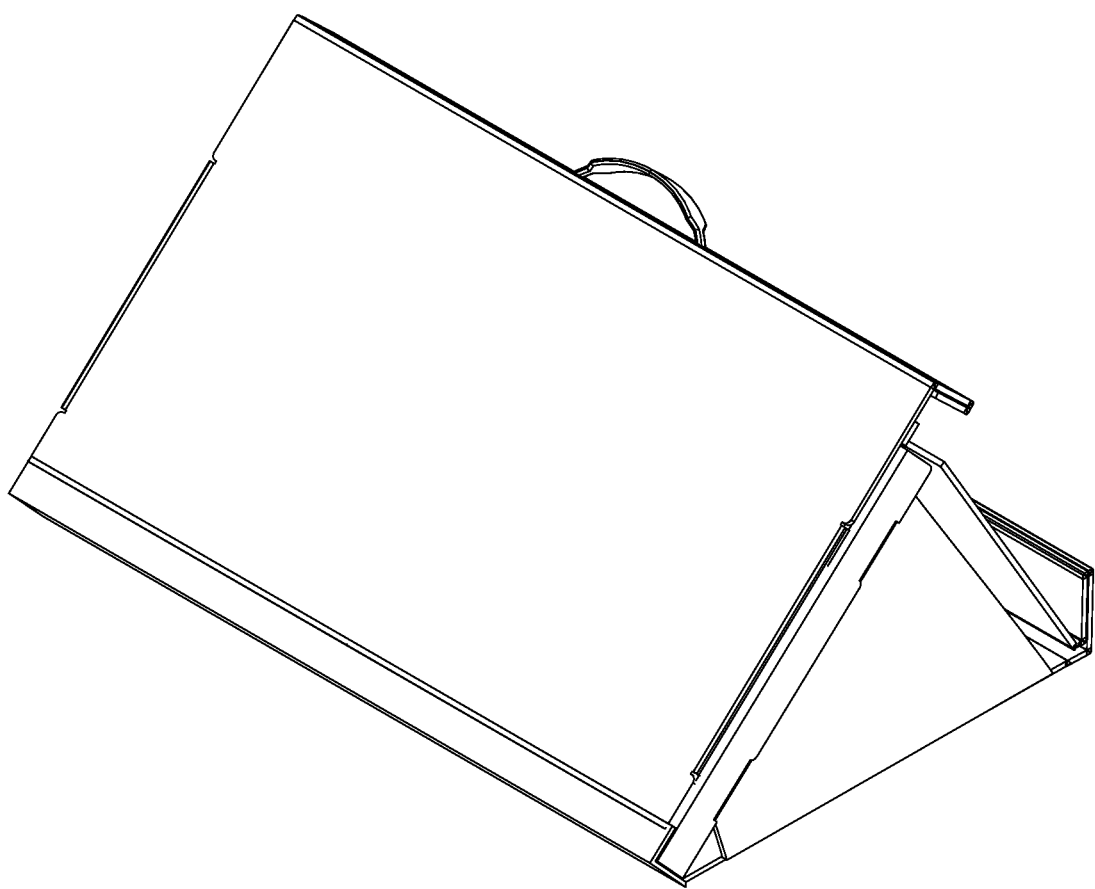
Figure 24I:
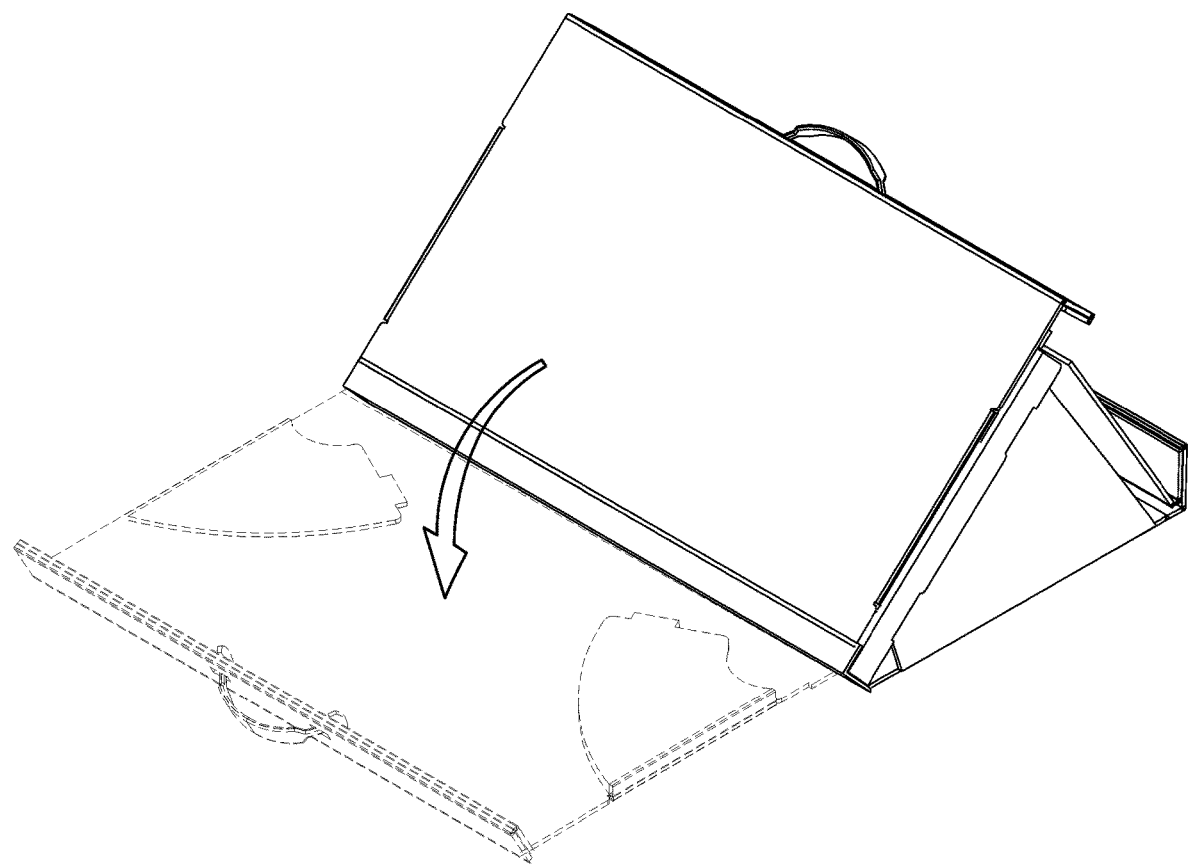
Figure 24J:
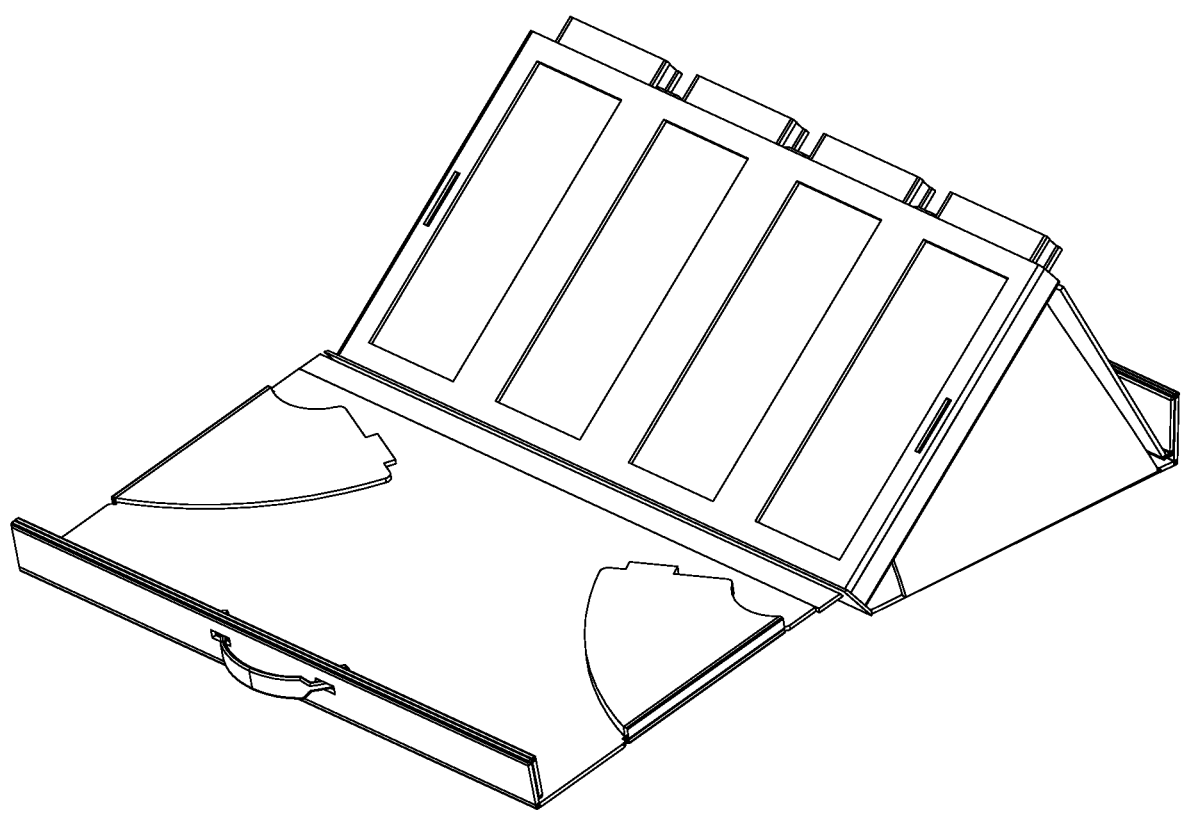

The flaps are pulled out from the lid, as shown in FIG. 24C. It will be appreciated that these are equivalent to the member 402 and the rear wings 208*a*-208*b*, discussed above. In the closed configuration, they are concealed by the front outer surface 100*a*. This results in a view shown in FIG. 24D. The interior surfaces of these flaps are provided in a dark coloration, as noted above. The use of a dark color may be advantageous in certain example embodiments in that it can help ensure that the coating color is presented correctly. For example, if white were used here, the transmitted color would be shown more than the reflected color, potentially leading to a distorted view of the coating color. This description notwithstanding, it will be appreciated that it sometimes might be desirable to have either white in the background (e.g., if viewers want to understand what the transmitted color is like), or an image of the interior scene of a building. Again, this would aid in understanding scale (like with the city skyline example provided above), and it also can help communicate the strength of the reflectivity of the coating. This can be particularly useful when looking at two different samples in front of the same interior scene in that the more reflective one will obscure the scene significantly more than the less reflective coating. It also will be appreciated that by virtue of being in the shadow box, the inside image should or might appear dimmer (e.g., compared to the light levels outside of the box) even when indoors. The tabs on the side flaps are inserted into the slots on the central sleeve, as shown in FIG. 24E-24F. As shown in FIG. 24G, the entire unit is flipped on its back, resulting in a configuration shown in FIG. 24H. The front flap is opened, as shown in FIG. 24I, resulting in the view shown in FIG. 24J. FIG. 24J thus is equivalent to the FIG. 18B view. An obtuse angle between the front flap and the samples is formed, consistent with the description provided above.

Figure 25:
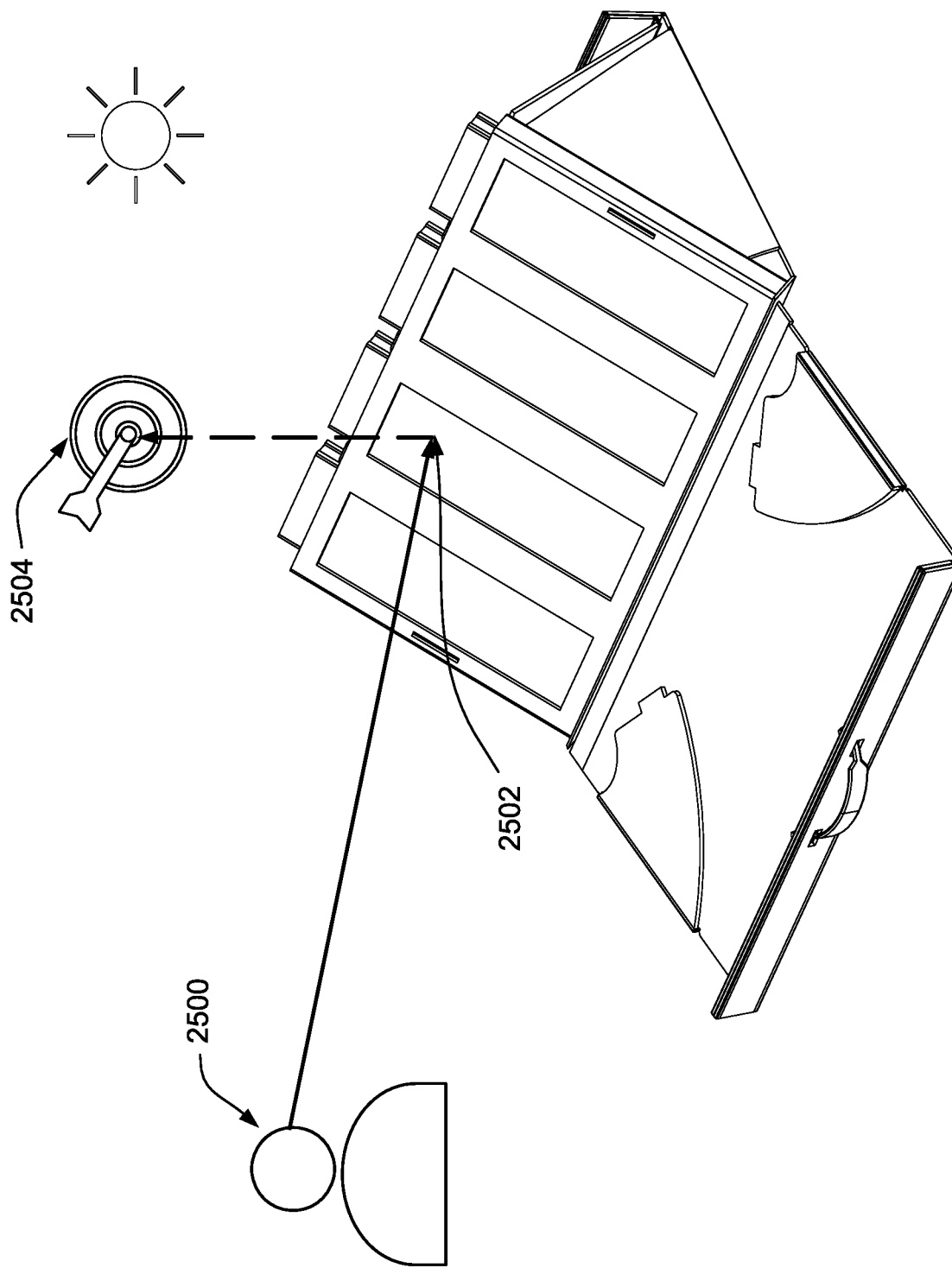
FIG. 25 schematically shows an example product in outdoor use, in accordance with certain example embodiments.

FIG. 25 schematically shows an example product in outdoor use, in accordance with certain example embodiments. When the viewer is in the outdoor configuration, in use, one can observe the reflected color of the area around and/or near a bright light source, reflected color of a blue sky, reflected color of the sky on an overcast day, etc. With respect to the former, to evaluate color outdoors, an architect and/or client 2500 can focus on a reflection 2502 of a target area 2504 near a bright light source like the sun 2506. It oftentimes will be desirable to try to ensure that one's gaze is not focused directly at a reflection of the bright light because doing so is likely to at a minimum distort the view of the samples. That is, looking at an overly bright object in the reflection might overpower the coated color and "blow it out" to white. A similar effect can be observed with cameras taking a photo of a bright light where the intensity of light exceeds the dynamic range of the sensor and the area of brightness just ends up being information-less white in the image. Note also that looking directly at a reflected source of very bright light could present safety concerns. The brightness is likely, however, to make the colors more vibrant and the differences between samples easier to see, provided that the brightness does not blow out the color.

Figure 26A:
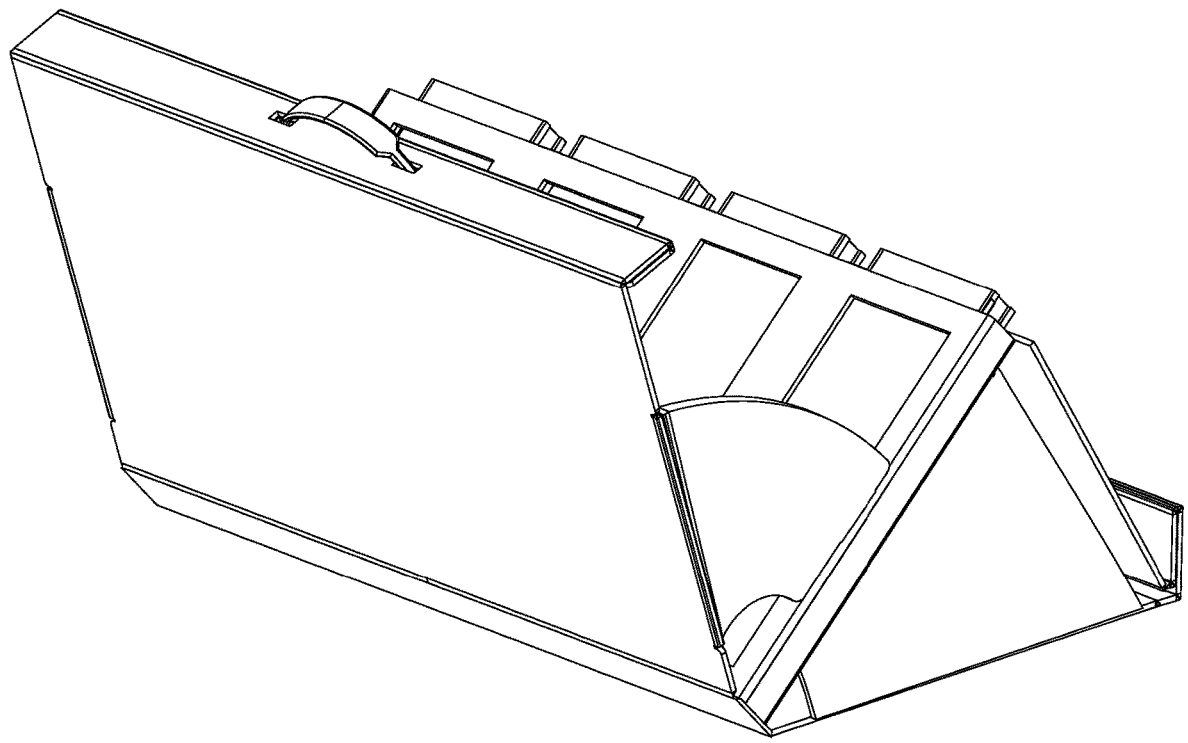
FIGS. 26A-26C show how an example viewer can be transitioned from a first open configuration suitable for outdoor use to a second open configuration suitable for indoor use, in accordance with certain example embodiments.
Figure 26B:
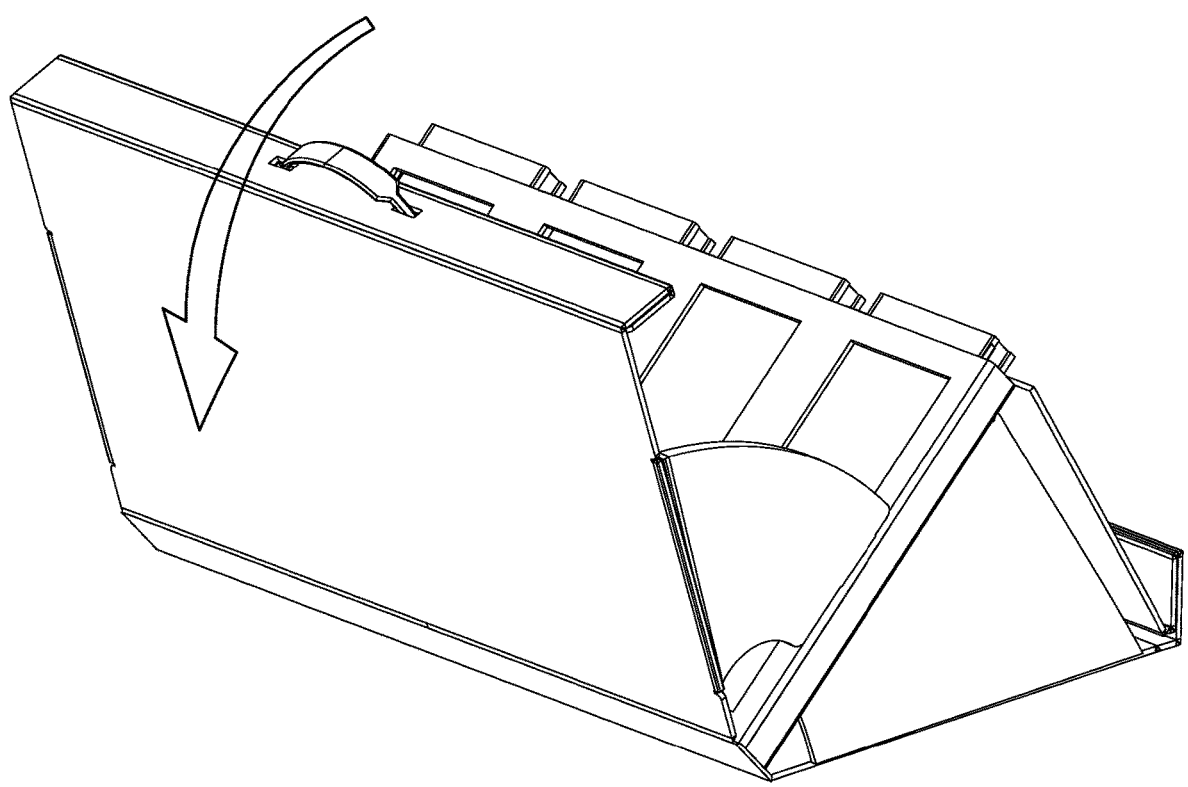
Figure 26C:
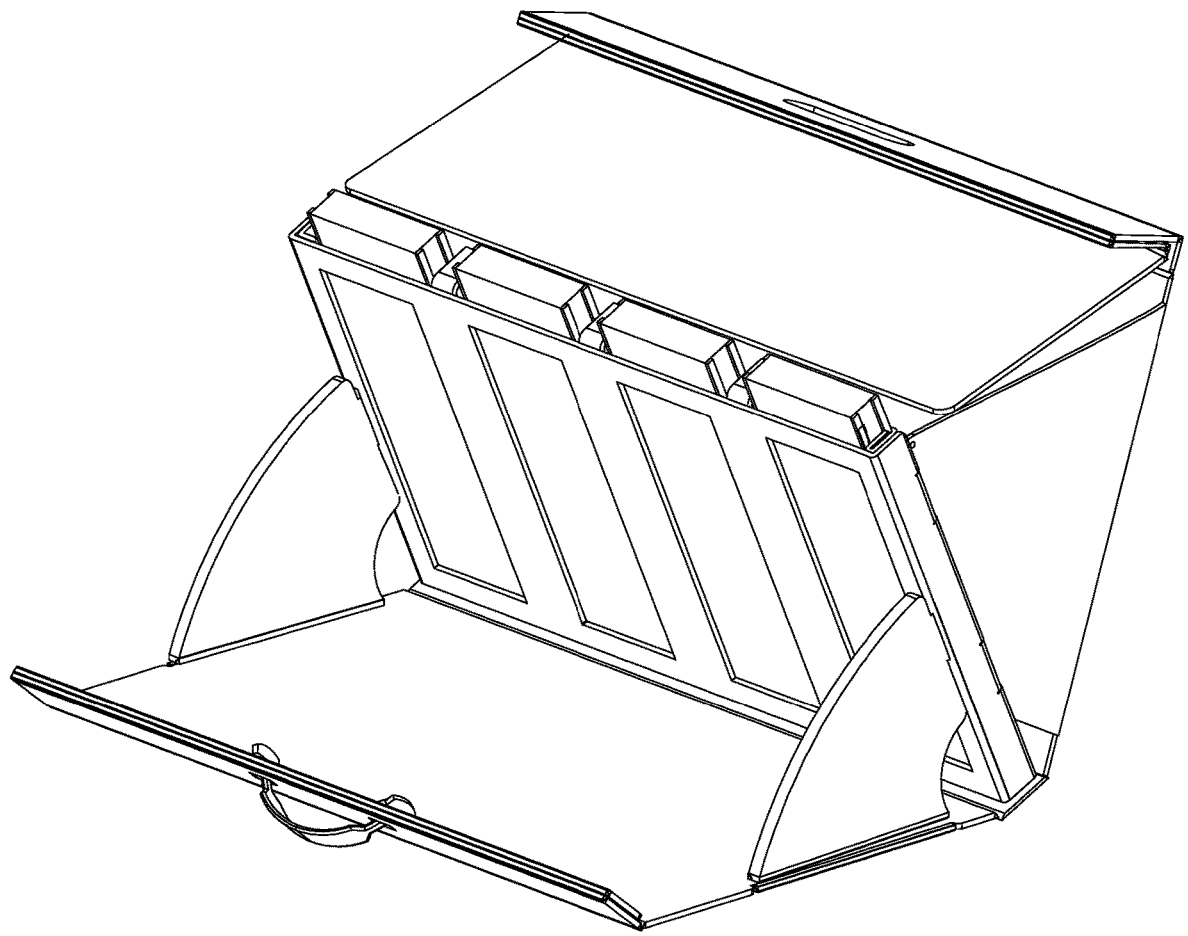

FIGS. 26A-26C show how an example viewer can be transitioned from a first open configuration suitable for outdoor use to a second open configuration suitable for indoor use, in accordance with certain example embodiments. FIG. 26A begins the transition from the state shown in FIG. 24J and, in this vein, is similar to the transition from FIG. 18A to FIG. 19A. The process may be performed without having to use the viewer in the outdoor viewing configuration. The viewer in the outdoor configuration is placed on a stable, elevated surface such as a tabletop or counter. The side tabs from the opened front flap are opened and inserted into slots on the center sleeve. This is equivalent to taking the tabs 202*a*-202*b* of front wings 200*a*-200*b* and inserting them into the slots 218*a*-218*b* of the viewing area 204 from FIG. 2 (for example). The entire unit is flipped onto the cover, which is equivalent to the back outer surface 100*e* described above, as shown in FIG. 26B. This results in the configuration shown in FIG. 26C, which is equivalent to that shown in FIG. 19B. The white surfaces of the interior of the front wings 200*a*-200*b* and back outer surface 100*e* are apparent from FIG. 26C. The dark coloration is still "behind" the samples. An acute angle is formed between the flap and the samples, consistent with the description provided above.

Figure 27:
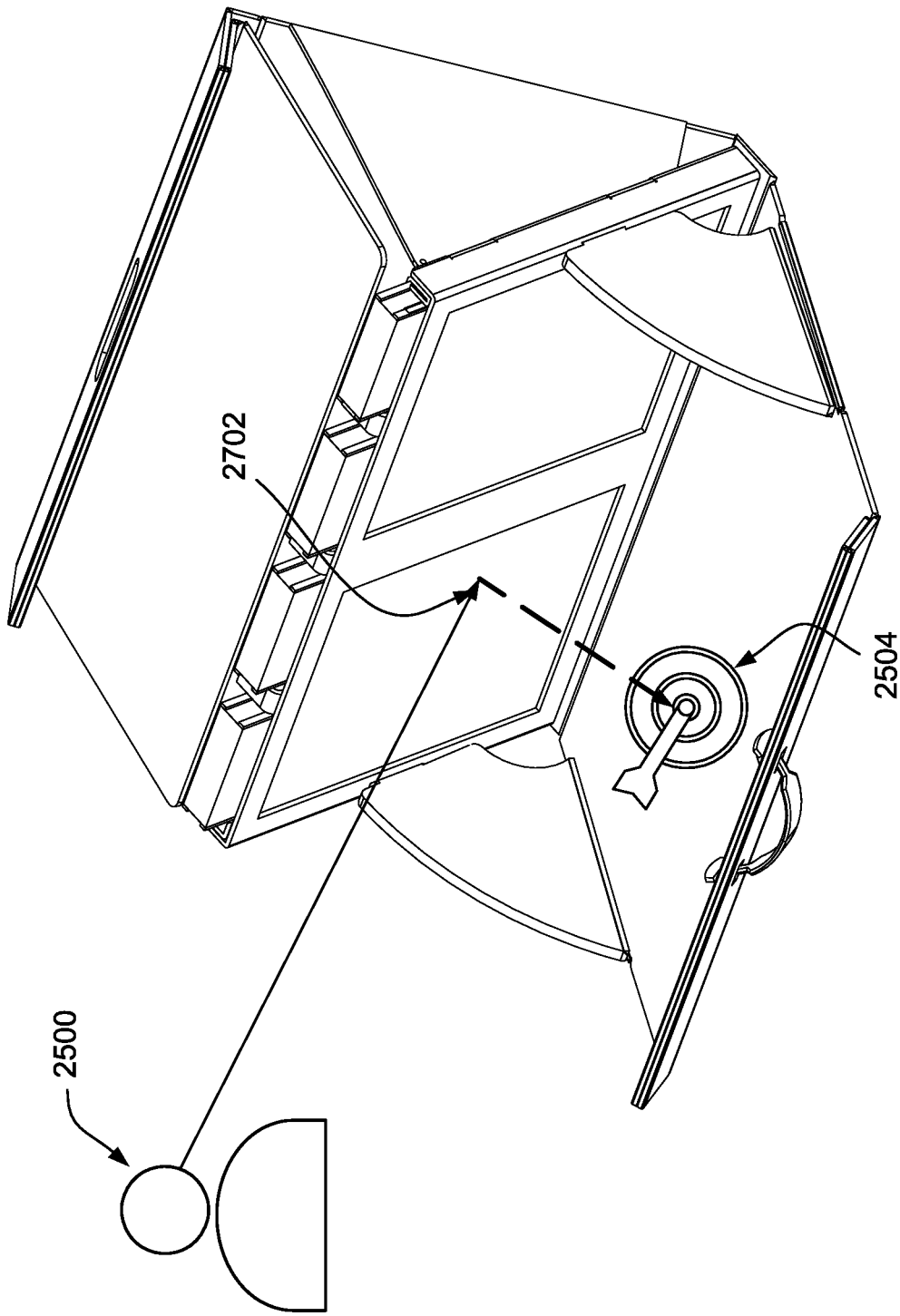
FIG. 27 schematically shows an example product in indoor use, in accordance with certain example embodiments.

FIG. 27 schematically shows an example product in indoor use, in accordance with certain example embodiments. When the viewer is in the indoor configuration, in use, the designer or client 2500 can observe the reflected color 2702 of an area 2704 on the extended flap. The designer or client 2500 simply focuses on whatever is in the target area 2704 as it looks reflected in the samples. The viewer is provided in a neutral color (which may be a light color such as white), which is beneficial for non-biased comparisons of samples. However, any image (e.g., from photos, magazines, a pre-printed design logo or pattern, etc.) can be focused on the target area 2704 to obtain a different perspective and impression of the samples, and provide an indication of how a full façade might appear.

Figure 28:
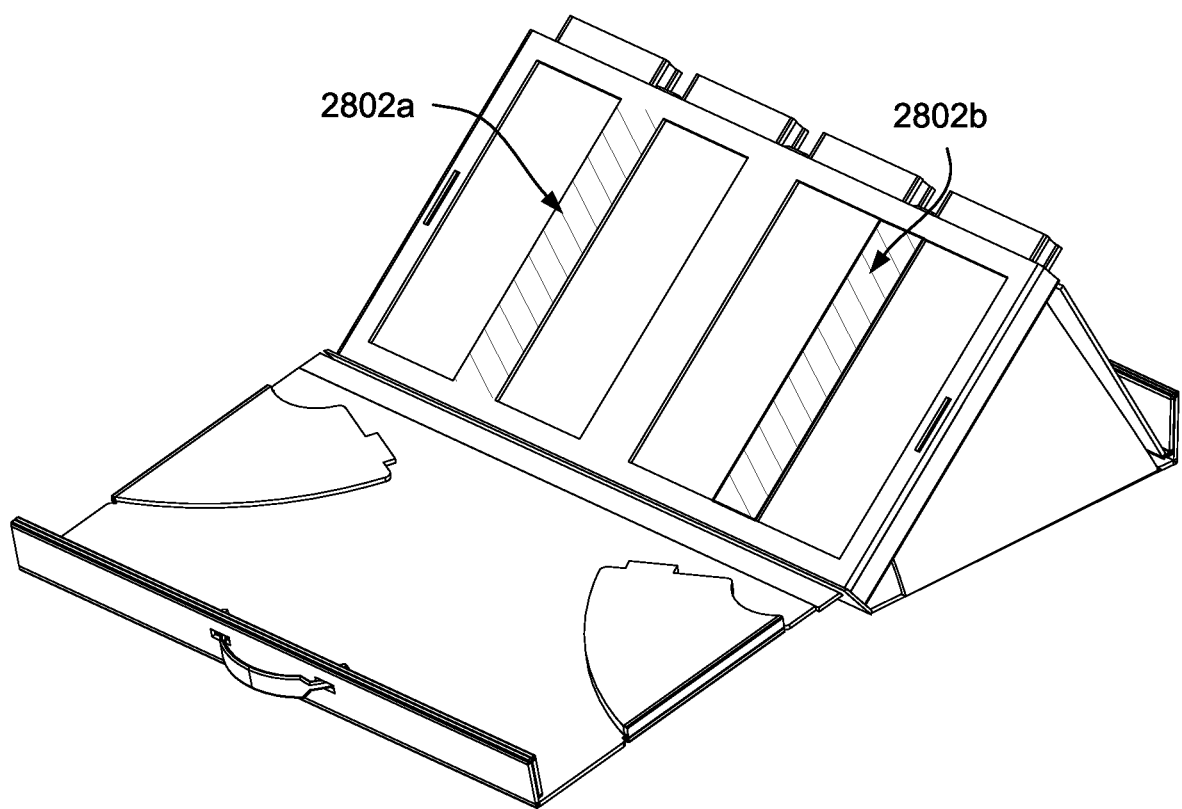
FIG. 28 shows example removable panels being inserted into a viewer, in accordance with certain example embodiments.

Although certain example embodiments have been shown as having multiple pockets that are the same size and shape, different embodiments may provide multiple pockets with two or more sizes. To help facilitate multiple different pocket configurations, removable panels may be provided. FIG. 28, for example, shows example removable panels 2802*a*-2802*b* being inserted into a viewer, in accordance with certain example embodiments. These panels may be formed from the same material as the viewer itself in certain example embodiments. They may, for instance, include tab features that link into slots or the like formed in the inner viewing area in certain example embodiments. Thus, a single larger area viewer may be used as if it has one opening, two openings of equal size, two openings of different sizes, three openings (e.g., one accommodating a sample taking up approximately half of the viewing area, and two accommodating samples each taking up approximately a quarter of the viewing area), four openings of equal sizes, etc.

Multiple configurations allow marketing and sales teams to provide a combination of products for the architect and/or client to see, e.g., as first impressions. Being able to provide multiple configurations via a single product (through the use of removable dividers, for example) also is advantageous because it facilitates manufacturing, stock requirements, shipping, etc., as a single box may be easily modified by having one or more dividers incorporated therein.

Example configurations are shown in FIGS. 29A-29E show example product configurations for example viewers. These configurations may be manufactured "as such" and/or may be achievable by incorporating removable dividers as discussed above.

Figure 29A:
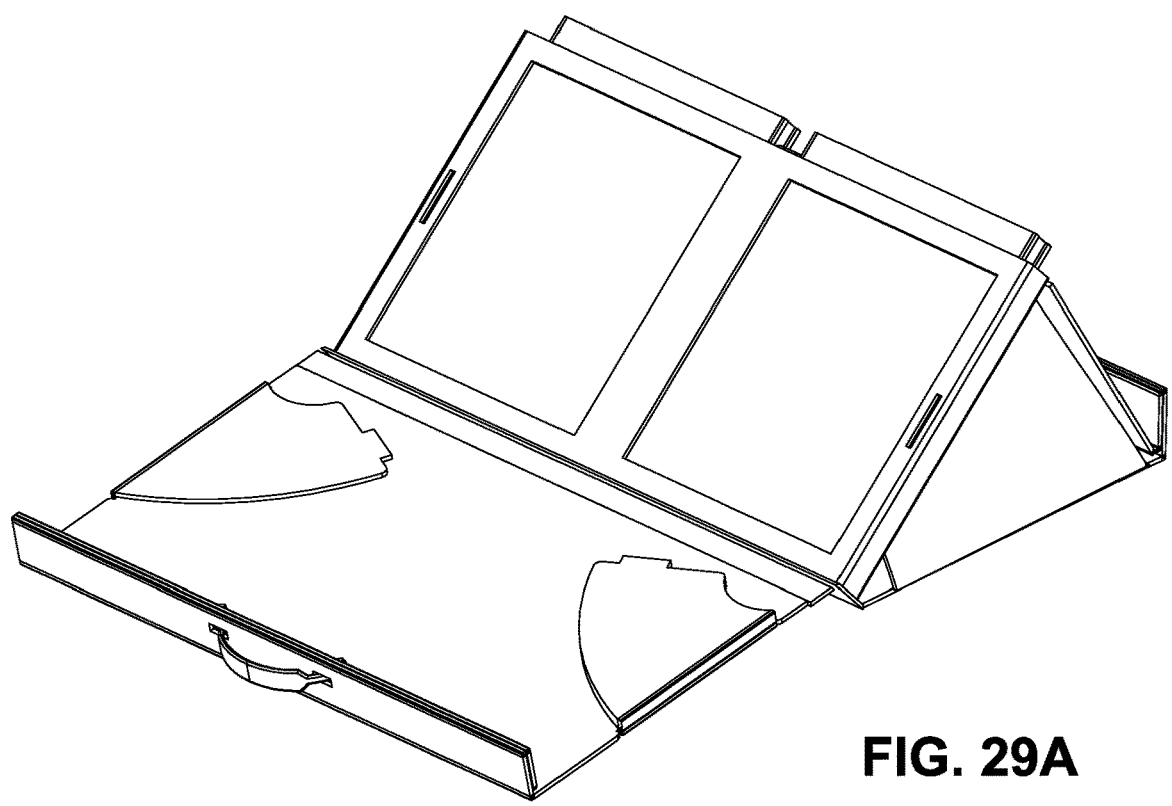
FIGS. 29A-29E show example product configurations for example viewers.

With the FIG. 29A design, different display options include providing two samples with the same coating and in the same orientation (e.g., to show consistency across samples, or to show the same coating on different glass substrates, etc.); two samples with the same coating but one with the exterior major surface (typically glass side) oriented outwardly and the other with the interior major surface (typically film side) oriented outwardly; the exterior major surfaces oriented outwardly for two different coatings; the interior major surfaces oriented outwardly for two different coatings; one sample with one or more coatings and another sample to be used as a standard or comparison (e.g., uncoated glass, a currently installed product, etc.); and/or the like.

Figure 29B:
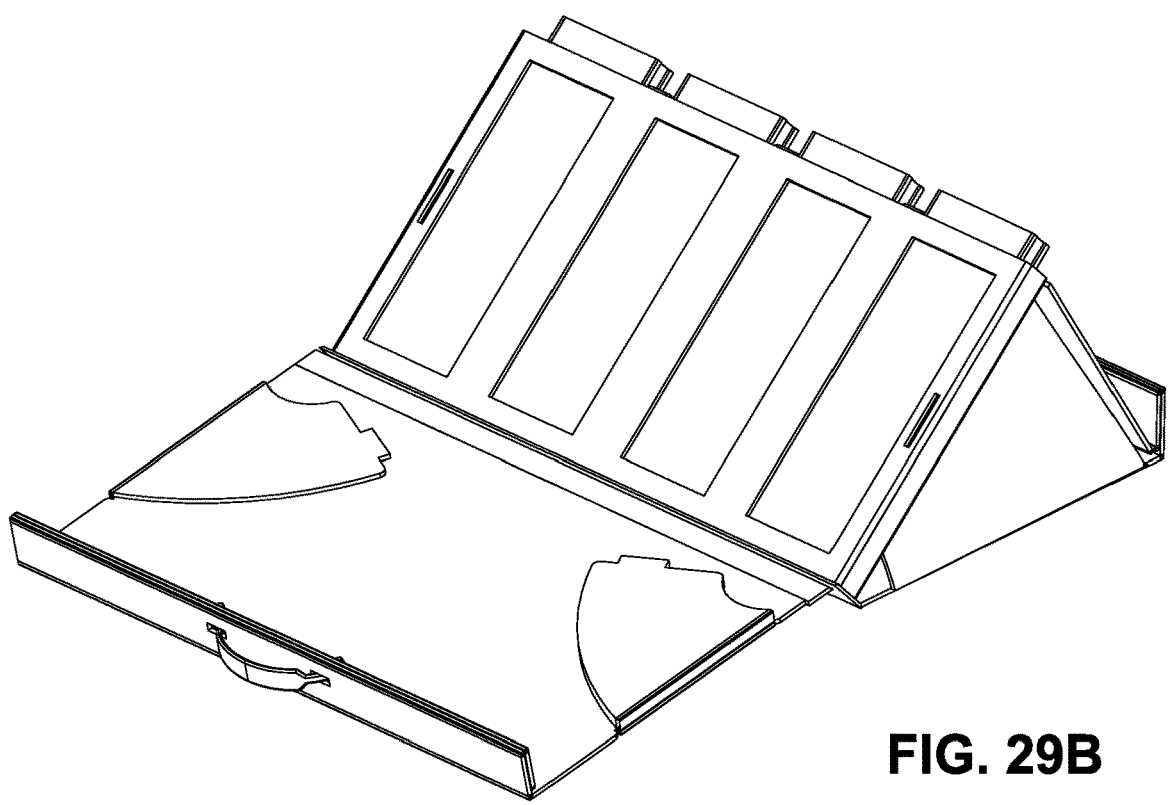

With the FIG. 29B design, different display options include providing four samples with the same coating and in the same orientation (e.g., to show consistency across samples, or to show the same coating on different glass substrates, etc.); interior and exterior major surfaces oriented outwardly for the same coating provided on different substrates; interior and exterior major surfaces oriented outwardly for different coatings provided on the same substrates; a variety pack of different coatings provided on the same or different substrates; and/or the like.

Figure 29C:
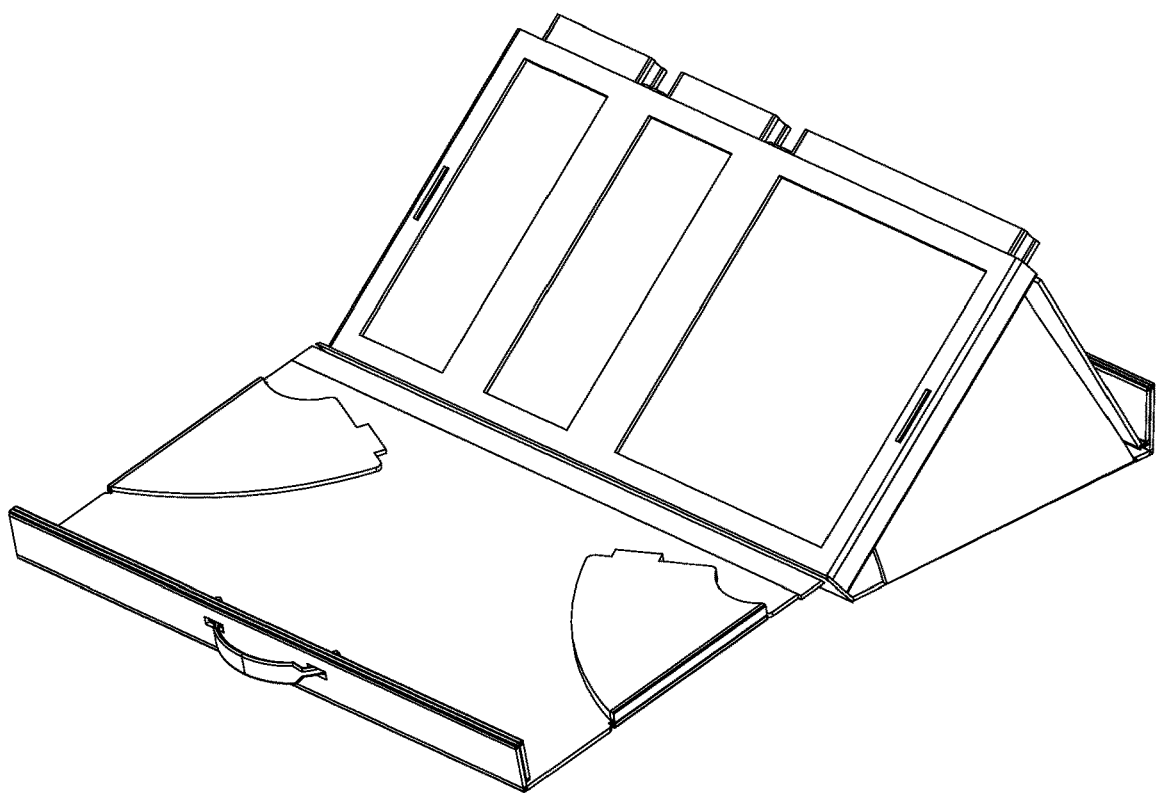

With the FIG. 29C design, different display options include providing three samples with the same coating and in the same orientation (e.g., to show consistency across samples, or to show the same coating on different glass substrates, etc.); two samples with the same coating on different substrates and one sample with a different coating on the same or different substrate; exterior major surface of two different coatings and interior major surface of another, or interior major surface of two different coatings and exterior major surface of another; a variety pack of different coatings provided on the same or different substrates; two samples with one or more coatings and another sample to be used as a standard or comparison; and/or the like.

Figure 29D:
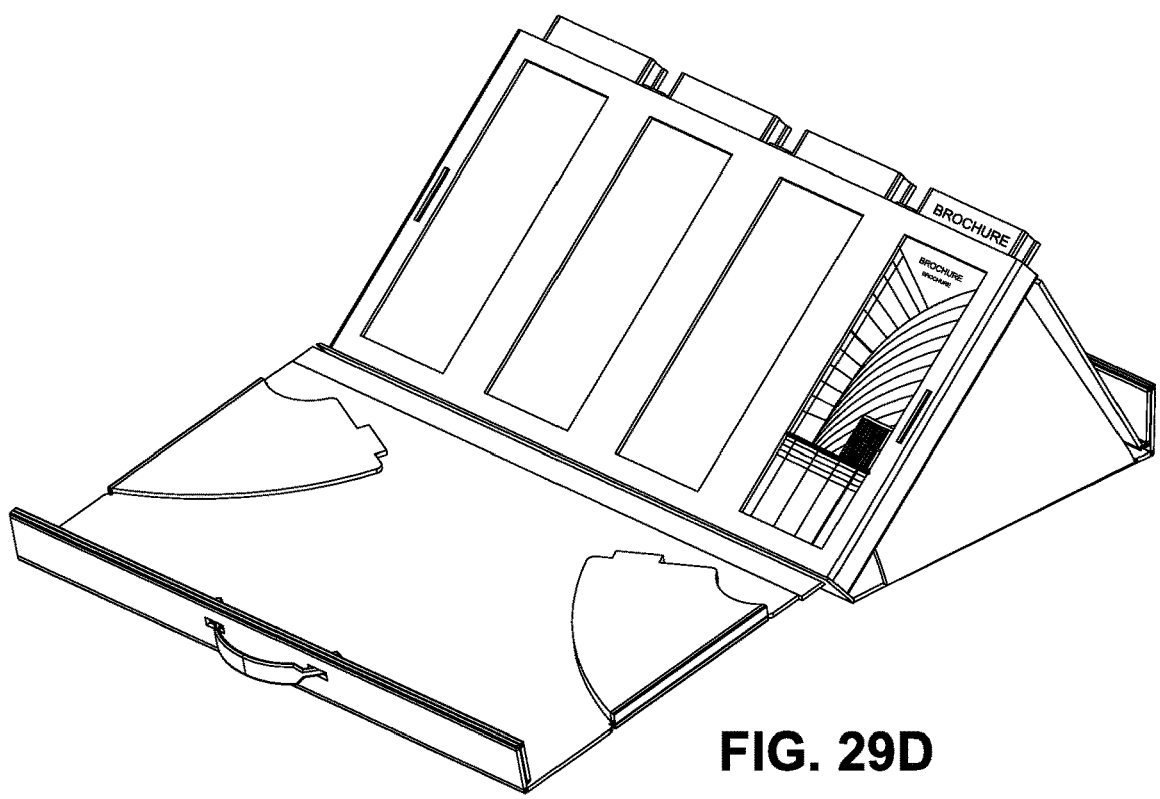

With the FIG. 29D design, different display options include providing three samples with the same coating and in the same orientation (e.g., to show consistency across samples, or to show the same coating on different glass substrates, etc.) and a brochure or other product information; a variety pack of different coatings provided on the same or different substrates and a brochure or other product information; interior and exterior major surfaces, a standard or comparison sample, and a brochure or other product information; and/or the like.

Figure 29E:
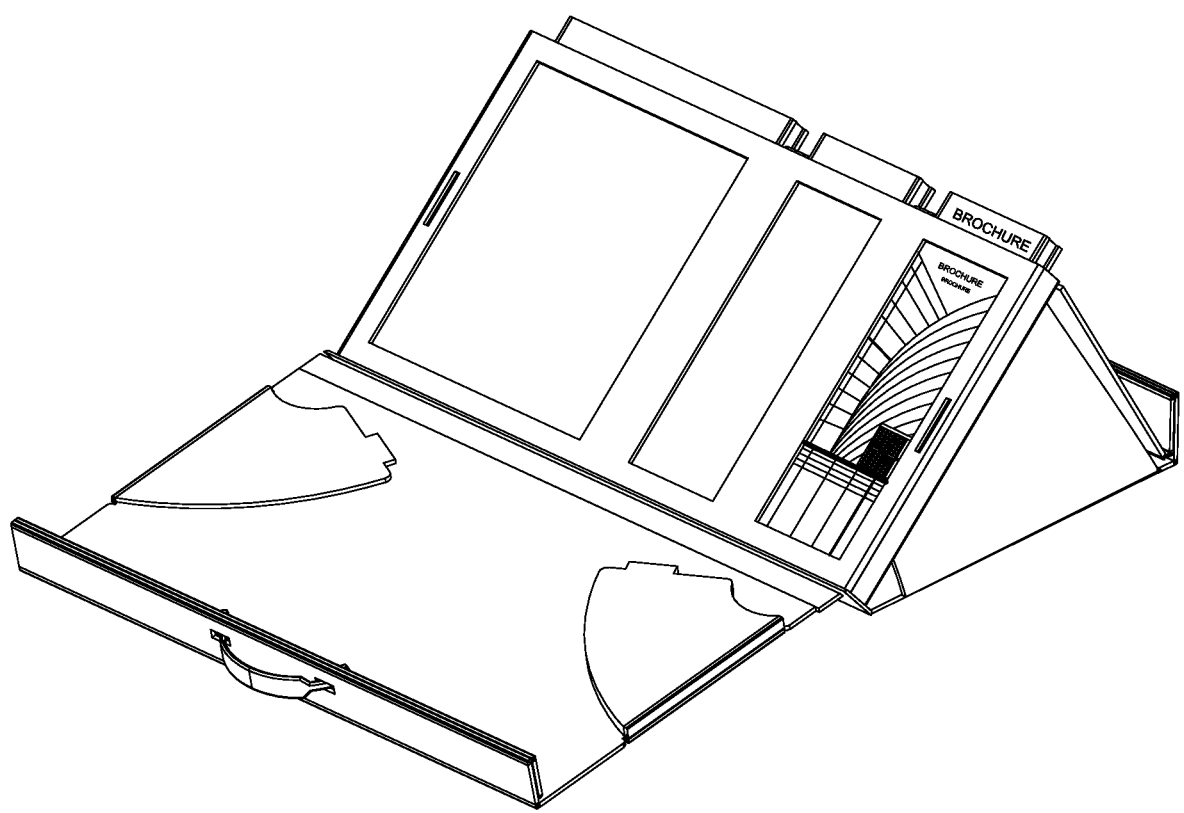

With the FIG. 29E design, different display options include providing two samples with the same coating and in the same orientation (e.g., to show consistency across samples, or to show the same coating on different glass substrates, etc.) and a brochure or other product information; interior and exterior major surfaces and a brochure or other product information, two different coatings and a brochure or other product information; a first sample, a standard or comparison sample, and a brochure or other product information; and/or the like.

It will be appreciated that in the descriptions above pertaining to FIGS. 29A-29E, other arrangements are possible. Moreover, "interior" and "exterior" are used to refer generally to building, vehicle, or other product interior and exterior. For simplicity, "coatings" and "substrates" are discussed in the singular, but it will be appreciated that the products may be monolithic articles, or IG units, laminated articles, VIG units, and/or the like, e.g., with multiple substrates and/or multiple coated surfaces. This description therefore should be treated broadly as encompassing a host of different product types, orientations, arrangements, etc.

Figure 30A:
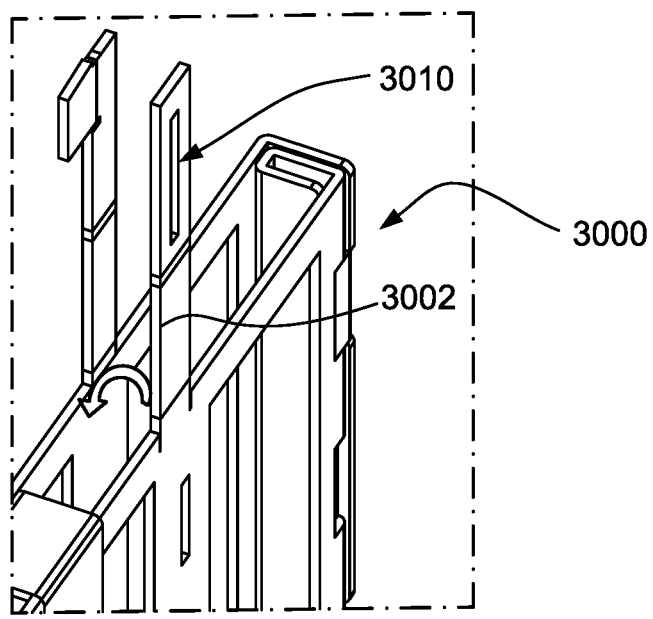
FIGS. 30A-30D show how the top edge locking mechanism of the FIG. 23C example can be used, in accordance with certain example embodiments.
Figure 30B:
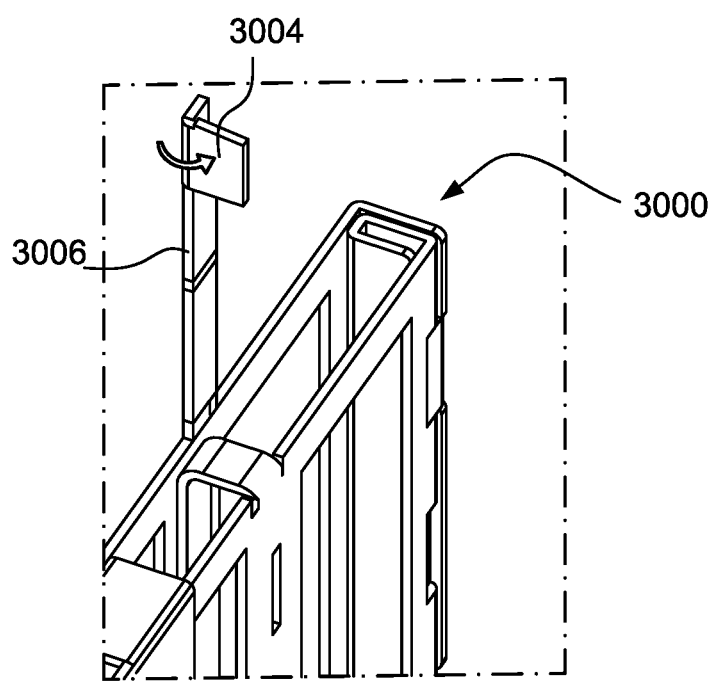
Figure 30C:
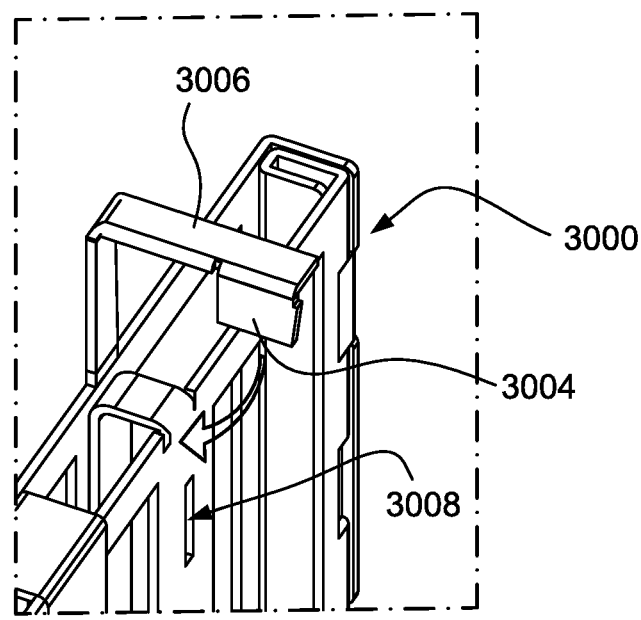
Figure 30D:
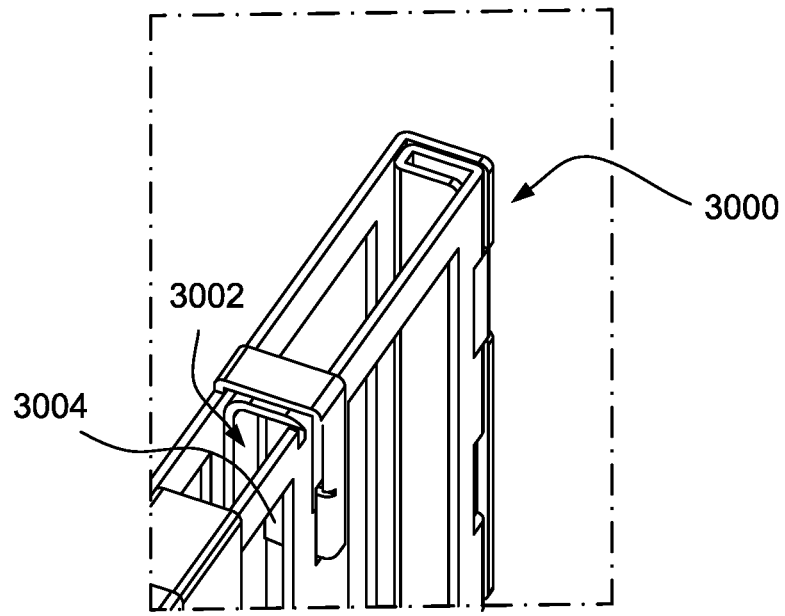

FIGS. 30A-30D show how the top edge locking mechanism of the FIG. 23C example can be used, in accordance with certain example embodiments. FIG. 30A in this sense is an enlarged view of a partially assembled version of FIG. 23C. As shown in FIG. 30A, the rear spacer 3002 is folded into the inside of the sleeve 3000. As shown in FIG. 30B, the tab 3004 on the front spacer 3006 is folded towards the rear of the sleeve 3000. As shown in FIG. 30C, the front spacer 3006 is folded towards the rear, and the tab 3004 is inserted into the slot 3008 formed in the sleeve 3000. As shown in FIG. 30D, the tab 3004 goes through the slot 3010 on the rear spacer 3002.

Although certain example embodiments have been described in connection with providing one or more sample in a single row, it will be appreciated that other grid-like or other patterns may be used in different example embodiments. For instance, in certain example embodiments, samples may be arranged in one or more columns. This may result in a regular grid-like pattern. In other example embodiments, samples in different rows may be offset from one another. In still other example embodiments, different mosaic patterns may be used.

In certain example embodiments, additional samples may be contained within the viewer in different areas. For instance, in certain example embodiments, additional pockets may be provided to areas that unfold outwardly from the edges of the box (e.g., proximate to the upright areas 214a-214b). In certain example embodiments, a more book-like arrangement may be provided, e.g., with a "hinge" being provided proximate to the inner uprights 216a-216b. In still other example embodiments, multiple samples may be stacked one behind the other, e.g., in an accordion-like arrangement.

Figure 31A:
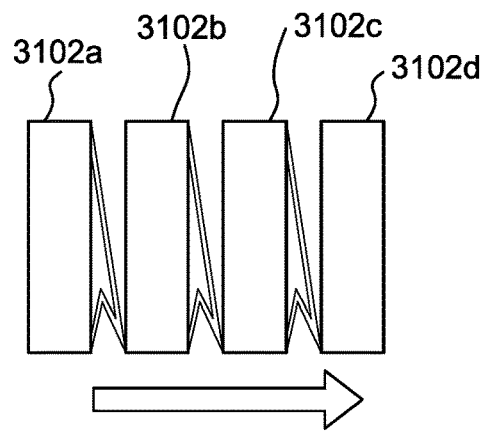
FIGS. 31A-31B schematically show interior portions of an example accordion-type viewer in accordance with certain example embodiments.
Figure 31B:
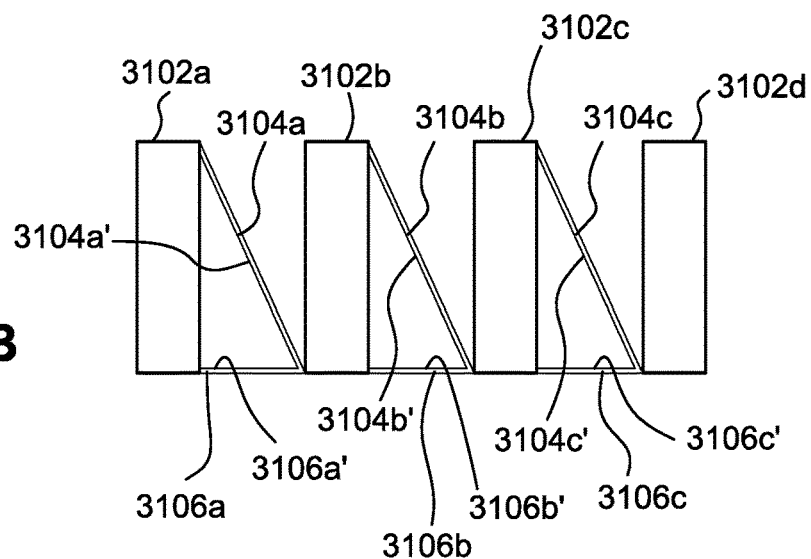

In this regard, FIGS. 31A-31B schematically show interior portions of an example accordion-type viewer in accordance with certain example embodiments. FIG. 31A is compressed, and FIG. 32B is expanded in the direction indicated by the arrow. The interior portions may take the place of the inner sleeve or viewing area 204 in certain example embodiments. As shown in FIGS. 31A-31B, the stacked arrangement may partially unfold or "accordion out," e.g., with the extension being limited based on the length of the cardboard skin areas 3104a-3104c between adjacent sample holding areas or pockets 3102a-3102b. Feet 3106a-3106c may fold out to help maintain the accordion-type viewer in substantially upright position. In certain example embodiments, the feet 3106a-3106c may be integral with the skin areas 3106a-3106c. Additionally or alternatively, the feet 3106a-3106c may be integral with or otherwise connected to a lower, rear area of the preceding pocket 3102a-3102c. Making the feet 3106a-3106c integral with one or both of these areas may enable the unit to be more easily expanded or contracted. Although four pockets 3102a-3102d are shown in FIGS. 31A-31B, it will be appreciated that more or fewer pockets may be provided in different example embodiments and, as a result, more or fewer skin areas and feet may be provided. In certain example embodiments, the number of skin areas will be no more than one less than the number of pocket. The number of feet may be equal to or less than the number of pockets in certain example embodiments. In certain example embodiments, skin areas and/or feet may be made from a material that is the same as or different from those mentioned above (and may be the same as or different from the material(s) used in creating the pocket areas). In this regard, fabric, rubber, or other materials additionally or alternatively may be used.

Inner surfaces 3104a'-3104c' of the downward sloping accordion skin sections 3104a-3104c and/or interior surfaces 3106a'-3106c' of the feet 3106a-3106c may help serve as shadow boxes. A consistent (e.g., dark) coloration therefore may be provided to one or both of the inner surfaces 3104a'-3104c' of the skin sections 3104a-3104c and/or interior surfaces 3106a'-3106c' of the feet 3106a-3106c. By contrast, a surface of skin sections 3104a-3104c opposite the interior surfaces 3104a'-3104c' may be provided in a different (e.g., light) coloration. Images and/or the like may be used on some or all of these surfaces, e.g., as described above.

Figure 32:
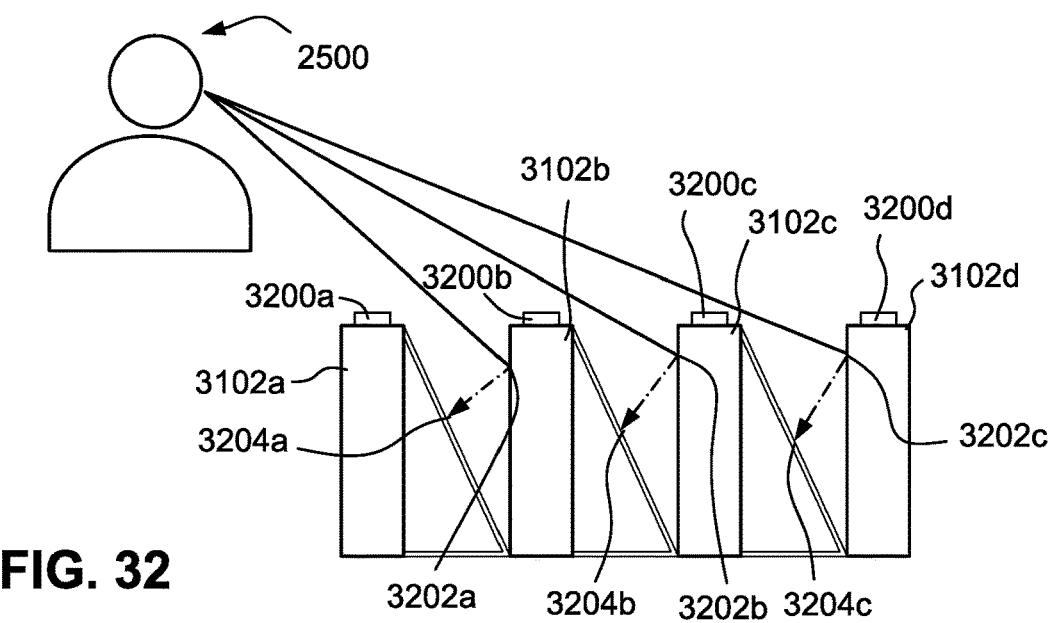
FIG. 32 schematically shows the FIG. 31A-31B example, in use, in accordance with certain example embodiments.

FIG. 32 schematically shows the FIG. 31A-31B example, in use, in accordance with certain example embodiments. When a user 2500 looks at the unfolded samples 3200a-3200d, the user 2500 can get a view of the correct colors without taking the samples 3200a-3200d out of the pockets 3102a-3102d. In this regard, the user 2500 can see the reflections 3202a-3202c of the target areas 3204a-3204c, similar to as described above (and also can see a reflection of a piece provided "in front of" the first sample 3200a, such as the back outer surface 100e). Because the samples 3200a-3200d can be viewed at substantially the same time, comparisons can become easier in this accordion-type configuration.

In certain example embodiments, a simple, smaller folder-style sample sleeve may be provided. The sleeve may be arranged for a single small sample (e.g., a 4" by 4" sample), or multiple samples (e.g., with two rows and 2-6 columns, or the like). This example would be small and easy to carry. In a first form, a transportation configuration resemble FIG. 1. A second form may involve a foldout configuration similar to that shown in FIG. 2. Simple back flaps or other kickstand like members may help hold the viewer in this configuration. A third form may involve a foldout configuration similar to that shown in FIG. 9. Simple front flaps or other kickstand like members may help hold the viewer in this configuration. It will be appreciated that this example embodiment may include either or both of the second and third forms, in addition to the first form.

Although certain example embodiments have been described as being provided in connection with a box, different example embodiments may be provided in connection with different viewer types. For instance, a viewer may be provided in connection with a wall, free-standing wall mockup, or other more static structure. Other structures may be movable, such as carts on wheels, and may include movable hoods that function in a manner similar to the viewers disclosed herein, such that they are suitable for indoor and/or outdoor use.

As is known, an IG unit typically includes first and second substrates that are in substantially parallel, spaced apart relation to one another. A spacer system is provided around peripheral edges thereof, and a gap or cavity is defined between the substrates. Coatings, including solar control coatings such as low-emissivity coatings and antireflective coatings, may be provided on one or more surfaces of the substrates. Typically, the gap or cavity is backfilled with a mix of air and a noble gas such as argon, krypton, xenon, and/or the like. Triple IG units include an additional substrate separated from the above by another spacer forming another gap or cavity that may be backfilled as discussed.

Also as is known, a VIG unit also typically includes first and second substrates that are in substantially parallel, spaced apart relation to one another. Support spacers or pillars are provided across the surfaces of the substrate, and a peripheral edge seal typically formed from frit material, is provided. The gap or cavity is evacuated to a pressure less than atmospheric via a pump-out port (e.g., a pump-out tube provided in the substrate, frit, and/or the like) that is capped. The edge seal provides hermetic sealing for the VIG unit.

Laminated products typically include two or more substrates laminated together with a material such as PVB, EVA, PET, PU, and/or the like. Laminated products include glass substrates laminated to IG units, VIG units, etc.

Certain example embodiments have been described in connection with monolithic products, IG units, VIG units, laminated products, etc., that include at least one glass substrate. However, it will be appreciated that the technology disclosed herein has applicability to any kind of product that is at least partially transparent, regardless of the material. Such products may include glass, plastics, and/or other transparent materials.

The sample products usable with the example viewers described herein may be full size or miniature versions of these and/or other products.

In certain example embodiments, an insulated glass (IG) unit viewing kit is provided. The kit includes at least one sample IG unit, with each said sample IG unit comprising:

first and second substantially parallel, spaced apart glass substrates; a spacer system provided around peripheral edges of the first and second substrates, a gap or cavity being defined between the first and second substrates; and a sample viewer comprising one or more sample-receiving slots, the number of sample-receiving slots being greater than or equal to the number of same IG units provided in the kit. The sample viewer is transformable into at least two of first, second, and third configurations, the first configuration being an outdoor viewing configuration, the second configuration being an indoor viewing configuration, and the third configuration being packaged and adapted for transport with the at least one sample IG unit therein.

In addition to the features of the previous paragraph, in certain example embodiments, the sample viewer may comprise corrugated cardboard.

In addition to the features of either of the two previous paragraphs, in certain example embodiments, the sample viewer may be transformable between the first and second configurations, and/or between the second and third configurations.

The kit of any of the three previous paragraphs may include the sample viewer of any of the next 15 paragraphs, for example.

In certain example embodiments, a sample viewer comprises one or more sample-receiving slots, the number of sample-receiving slots being greater than or equal to a number of transparent-panel inclusive samples receivable in the sample viewer, the sample viewer being transformable into at least two of first, second, and third configurations, the first configuration being an outdoor viewing configuration, the second configuration being an indoor viewing configuration, and the third configuration being packaged and adapted for transport with the at least one sample IG unit therein.

In addition to the features of the previous paragraph, in certain example embodiments, at least two sample-receiving slots may be provided.

In addition to the features of either of the two previous paragraphs, in certain example embodiments, the sample viewer may be transformable between the first and second configurations, and/or between the first and third configurations.

In addition to the features of any of the three previous paragraphs, in certain example embodiments, the sample viewer may further comprise: an inner sleeve in which the one or more sample-receiving slots are defined; first and second outer shell members; at least one first support provided to the first outer shell member; at least one second support provided to the second outer shell member; and an inner member provided to the second outer shell member.

In addition to the features of the previous paragraph, in certain example embodiments, the sample viewer may be transformable into the first, second, and third configurations, e.g., with the first and second outer shell members constituting outer major faces of the sample viewer when the sample viewer is arranged in the third configuration.

In addition to the features of either of the two previous paragraphs, in certain example embodiments, a first set of one or more slots may be arranged to receive element(s) of the at least one first support and a second set of one or more slots may be arranged to receive element(s) of the at least one second support.

In addition to the features of any of the four previous paragraphs, in certain example embodiments, the sample viewer may be transformable into at least the first configuration, e.g., where, in the first configuration: the second set of one or more slots may receive the element(s) of the at least one second support such that the inner sleeve is supported by the at least one second support, the inner member, and the second outer shell member; the first set of one or more slots may not receive the element(s) of the first at least one support; the inner member may extend generally downward from an upper portion of the inner sleeve towards where it meets with the second outer shell member; the second outer shell member may extend generally forward from where it meets with the inner member towards a lower portion of the inner sleeve; and the first outer shell member may extend generally forward from the lower portion of the inner sleeve such than an obtuse angle is formed between an upward facing surface of the first outer shell member and a forward facing surface of the inner sleeve.

In addition to the features of any of the five previous paragraphs, in certain example embodiments, the sample viewer may be transformable into at least the second configuration, and may further comprise at least two first supports and at least two second supports, e.g., where surfaces of second supports that face one another when the sample viewer is in the first configuration, and surfaces of the inner member and second outer shell member that are behind the forward facing surface of the inner sleeve when the sample viewer is in the first configuration, may be darker than a surface of the first outer shell member that faces upwards when the sample viewer is in the second configuration.

In addition to the features of any of the eight previous paragraphs, in certain example embodiments, aesthetics of sample(s) provided to the viewer may be discernable by having the sample viewer outside and viewing reflection in the sample(s) of a target that is adjacent a light source, when the sample viewer is in the first configuration.

In addition to the features of any of the six previous paragraphs, in certain example embodiments, the sample viewer may be transformable into at least the second configuration, e.g., where, in the second configuration: the second set of one or more slots may receive the element(s) of the at least one second support; the first set of one or more slots may receive the element(s) of the at least one first support such that the inner sleeve is supported by the at least one first support and the first outer shell member; the upper portion of the inner sleeve may be forward of the lower portion of the inner sleeve; and the first outer shell member may extend generally forward from the lower portion of the inner sleeve such than an acute angle is formed between the upward facing surface of the first outer shell member and the forward facing surface of the inner sleeve.

In addition to the features of any of the 10 previous paragraphs, in certain example embodiments, aesthetics of sample(s) provided to the viewer may be discernable by having the sample viewer inside and viewing reflection in the sample(s) of a target placed on the first outer shell member, when the sample viewer is in the second configuration and/or by having the sample viewer inside and viewing reflection in the sample(s) of the first outer shell member, when the sample viewer is in the second configuration.

In addition to the features of any of the 11 previous paragraphs, in certain example embodiments, the sample viewer may be transformable into at least the second configuration, e.g., where, in the second configuration: the second set of one or more slots may receive the element(s) of the at least one second support; the first set of one or more slots may receive the element(s) of the at least one first support such that the inner sleeve is supported by the at least one first support and the first outer shell member; an upper portion of the inner sleeve may be forward of a lower portion of the inner sleeve; and the first outer shell member may extends generally forward from the lower portion of the inner sleeve such than an acute angle is formed between an upward facing surface of the first outer shell member and a forward facing surface of the inner sleeve.

In addition to the features of any of the 12 previous paragraphs, in certain example embodiments, a plurality of sample-receiving slots may be provided, e.g., with each of the sample-receiving slots in the sample viewer having the same size and shape, with two having the same size and shape, and at least one having a different size and/or shape, etc.

In addition to the features of any of the 13 previous paragraphs, in certain example embodiments, an upper edge of each product-receiving slot may have outer widthwise portions that are higher than central widthwise portions thereof.

In addition to the features of any of the 14 previous paragraphs, in certain example embodiments, the sample viewer may further comprise: an inner sleeve in which the one or more sample-receiving slots are defined; first and second outer shell members; the sample viewer being transformable into at least the first and second configurations. In the first configuration, for example: the inner member may extend generally downward from an upper portion of the inner sleeve towards where it meets with the second outer shell member; the second outer shell member may extend generally forward from where it meets with the inner member towards a lower portion of the inner sleeve; and the first outer shell member may extend generally forward from the lower portion of the inner sleeve such than an obtuse angle is formed between an upward facing surface of the first outer shell member and a forward facing surface of the inner sleeve. In the second configuration, for example: the upper portion of the inner sleeve may be forward of the lower portion of the inner sleeve, and the first outer shell member may extend generally forward from the lower portion of the inner sleeve such than an acute angle is formed between the upward facing surface of the first outer shell member and the forward facing surface of the inner sleeve.

In certain example embodiments, there is provided a method of using the sample viewer of any of the 15 previous paragraphs. The method may comprise having the sample viewer in the first configuration; and transforming the sample viewer from (a) the third configuration into either the first or second configuration, and/or (b) the first configuration into the second configuration.

In addition to the features of the previous paragraph, in certain example embodiments, the method may further comprise transforming the sample viewer from the first configuration into the third configuration, and/or from the third configuration into the first configuration.

In addition to the features of either of the two previous paragraphs, in certain example embodiments, the method may further comprise observing aesthetic properties of one or more samples provided to the sample viewer when in the first and/or second configuration.

In certain example embodiments, there is provided a method of making the sample viewer provided or used in any of the 18 previous paragraphs. For instance, in certain example embodiments, a method of making a sample viewer is provided. The method comprises: having a first template from which an inner sleeve is formable; having a second template from which other portions of the sample viewer are formable, the other portions including first and second outer shell members, first and second supports, and an inner member provided to the second outer shell member; forming an inner sleeve portion from the first template; and forming an outer clamshell portion from the second template. The inner sleeve portion and the outer clamshell portion may be forwarded (e.g., to an architect, designer, sample manufacturer, or other party) for creation of first and second intermediate products, respectively, with the first and second intermediate products being connectable to one another in making the sample viewer, such that the inner sleeve portion when assembled comprises one or more sample-receiving slots, the number of sample-receiving slots being greater than or equal to a number of transparent-panel inclusive samples receivable in the sample viewer, the sample viewer being manufactured so as to be transformable into at least two of first, second, and third configurations, the first configuration being an outdoor viewing configuration, the second configuration being an indoor viewing configuration, and the third configuration being packaged and adapted for transport with the at least one sample IG unit therein. In other cases, this may be done on-site prior to forwarding for insertion of samples into the viewer. In other cases, a kit comprising an assembled or to-be assembled sample viewer may be provided, e.g., with or without the glass sample(s) to be used therewith. In cases where the to-be-assembled sample viewer is provided as a part of a kit, flat packs to be assembled may be provided and may be forwarded for assembly.

In addition to the features of the previous paragraph, in certain example embodiments, the forming of the inner sleeve portion may include forming an inner sleeve flat pack formed from the first template; and the forming of outer clamshell portion may include forming an outer clamshell flat pack formed from the second template.

While the invention has been described in connection with what is presently considered to be the most practical and preferred embodiments, it is to be understood that the invention is not to be limited to the disclosed embodiment and/or deposition techniques, but on the contrary, is intended to cover various modifications and equivalent arrangements included within the spirit and scope of the appended claims.

What is claimed is:

1. An insulated glass (IG) unit viewing kit, comprising:
   at least one sample IG unit, each said sample IG unit comprising:
   first and second substantially parallel, spaced apart glass substrates;
   a spacer system provided around peripheral edges of the first and second substrates, wherein the spacer system comprises a gap or cavity being defined between the first and second substrates; and
   a sample viewer comprising one or more sample-receiving slots;
   an inner sleeve in which the one or more sample-receiving slots are defined;
   first and second outer shell members;
   at least one first support provided to the first outer shell member;
   at least one second support provided to the second outer shell member; and
   an inner member provided to the second outer shell member;
   wherein the sample viewer is transformable into at least two configurations, wherein the at least two configurations are selected from the group consisting of a first configuration being an outdoor viewing configuration, a second configuration being an indoor viewing configuration, a third configuration being packaged and adapted for transport with the at least one sample IG unit therein, and combinations thereof.

2. The kit of claim 1, wherein the sample viewer comprises corrugated cardboard.

3. The kit of claim 1, wherein the sample viewer is transformable between the first and second configurations, and between the second and third configurations.

4. A sample viewer comprising:
one or more sample-receiving slots,
an inner sleeve in which the one or more sample-receiving slots are defined;
first and second outer shell members;
at least one first support provided to the first outer shell member;
at least one second support provided to the second outer shell member; and
an inner member provided to the second outer shell member,
wherein the sample viewer being transformable into at least two of first, second, and third configurations, the first configuration being an outdoor viewing configuration, the second configuration being an indoor viewing configuration, and the third configuration being packaged and adapted for transport with a at least one sample insulated glass (IG) unit therein.

5. The sample viewer of claim 4, comprising at least two sample-receiving slots.

6. The sample viewer of claim 4, being transformable between the first and second configurations, and between the first and third configurations.

7. The sample viewer of claim 4, being transformable into the first, second, and third configurations, wherein the first and second outer shell members constitute outer major faces of the sample viewer when the sample viewer is arranged in the third configuration.

8. The sample viewer of claim 4, further comprising a first set of one or more slots arranged to receive element(s) of the at least one first support and a second set of one or more slots arranged to receive element(s) of the at least one second support.

9. The sample viewer of claim 8, being transformable into at least the first configuration, wherein, in the first configuration:
the second set of one or more slots receives the element(s) of the at least one second support such that the inner sleeve is supported by the at least one second support, the inner member, and the second outer shell member;
the first set of one or more slots do not receive the element(s) of the first at least one support;
the inner member extends generally downward from an upper portion of the inner sleeve towards where it meets with the second outer shell member;
the second outer shell member extends generally forward from where it meets with the inner member towards a lower portion of the inner sleeve; and
the first outer shell member extends generally forward from the lower portion of the inner sleeve such than an obtuse angle is formed between an upward facing surface of the first outer shell member and a forward facing surface of the inner sleeve.

10. The sample viewer of claim 9, being transformable into at least the second configuration, and further comprising at least two first supports and at least two second supports, wherein surfaces of second supports that face one another when the sample viewer is in the first configuration, and surfaces of the inner member and second outer shell member that are behind the forward facing surface of the inner sleeve when the sample viewer is in the first configuration, are darker than a surface of the first outer shell member that faces upwards when the sample viewer is in the second configuration.

11. The sample viewer of claim 10, wherein aesthetics of sample(s) provided to the viewer are discernable by having the sample viewer outside and viewing reflection in the sample(s) of a target that is adjacent a light source, when the sample viewer is in the first configuration.

12. The sample viewer of claim 9, being transformable into at least the second configuration, wherein, in the second configuration:
the second set of one or more slots receive the element(s) of the at least one second support;
the first set of one or more slots receive the element(s) of the at least one first support such that the inner sleeve is supported by the at least one first support and the first outer shell member;
the upper portion of the inner sleeve is forward of the lower portion of the inner sleeve; and
the first outer shell member extends generally forward from the lower portion of the inner sleeve such than an acute angle is formed between the upward facing surface of the first outer shell member and the forward facing surface of the inner sleeve.

13. The sample viewer of claim 12, wherein aesthetics of sample(s) provided to the viewer are discernable by having the sample viewer inside and viewing reflection in the sample(s) of a target placed on the first outer shell member, when the sample viewer is in the second configuration.

14. The sample viewer of claim 12, wherein aesthetics of sample(s) provided to the viewer are discernable by having the sample viewer inside and viewing reflection in the sample(s) of the first outer shell member, when the sample viewer is in the second configuration.

15. The sample viewer of claim 8, being transformable into at least the second configuration, wherein, in the second configuration:
the second set of one or more slots receive the element(s) of the at least one second support;
the first set of one or more slots receive the element(s) of the at least one first support such that the inner sleeve is supported by the at least one first support and the first outer shell member;
an upper portion of the inner sleeve is forward of a lower portion of the inner sleeve; and
the first outer shell member extends generally forward from the lower portion of the inner sleeve such than an acute angle is formed between an upward facing surface of the first outer shell member and a forward facing surface of the inner sleeve.

16. The sample viewer of claim 4, comprising a plurality of sample-receiving slots, each of the sample-receiving slots in the sample viewer having the same size and shape.

17. The sample viewer of claim 4, comprising a plurality of sample-receiving slots, wherein two have the same size and shape, and at least one has a different size and/or shape.

18. The sample viewer of claim 4, wherein an upper edge of each product-receiving slot has outer widthwise portions that are higher than central widthwise portions thereof.

19. The sample viewer of claim 4, further comprising:
an inner sleeve in which the one or more sample-receiving slots are defined; first and second outer shell members;
the sample viewer being transformable into at least the first and second configurations, wherein:

in the first configuration:
- the inner member extends generally downward from an upper portion of the inner sleeve towards where it meets with the second outer shell member;
- the second outer shell member extends generally forward from where it meets with the inner member towards a lower portion of the inner sleeve; and
- the first outer shell member extends generally forward from the lower portion of the inner sleeve such than an obtuse angle is formed between an upward facing surface of the first outer shell member and a forward facing surface of the inner sleeve; and in the second configuration:
- the upper portion of the inner sleeve is forward of the lower portion of the inner sleeve, and
- the first outer shell member extends generally forward from the lower portion of the inner sleeve such than an acute angle is formed between the upward facing surface of the first outer shell member and the forward facing surface of the inner sleeve.

20. A method of using the sample viewer of claim 4, the method comprising:
- having the sample viewer in the first configuration; and
- transforming the sample viewer from (a) the third configuration into either the first or second configuration, and/or (b) the first configuration into the second configuration.

21. The method of claim 20, further comprising transforming the sample viewer from the first configuration into the third configuration, and/or from the third configuration into the first configuration.

22. The method of claim 21, further comprising observing aesthetic properties of one or more samples provided to the sample viewer when in the first and/or second configuration.

\* \* \* \* \*